US006289284B1

(12) United States Patent
Yamamoto

(10) Patent No.: US 6,289,284 B1
(45) Date of Patent: *Sep. 11, 2001

(54) METHOD OF IMAGING THE PERMEABILITY AND FLUID CONTENT STRUCTURE WITHIN SEDIMENT

(75) Inventor: Tokuo Yamamoto, Miami, FL (US)

(73) Assignees: Yamamoto Engineering Corporation, FL (US); Kawasaki Steel Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/259,952

(22) Filed: Mar. 1, 1999

Related U.S. Application Data

(63) Continuation-in-part of application No. 09/107,675, filed on Jun. 30, 1998, now Pat. No. 6,061,300.

(51) Int. Cl.[7] .................................................. G01V 1/00

(52) U.S. Cl. ................................ 702/14; 367/57; 367/39; 181/102; 181/112

(58) Field of Search ................................ 367/57, 25, 39; 181/102, 112; 702/14

(56) References Cited

U.S. PATENT DOCUMENTS

| 5,142,500 | 8/1992 | Yamamoto et al. . |
| 5,406,530 | 4/1995 | Yamamoto . |
| 6,061,300 | * 5/2000 | Yamamoto ............................. 367/57 |

OTHER PUBLICATIONS

Anselmetti, F.S., Salis, G.A. von, Cunningham, K.J., and Eberli, G.P., "Acoustic properties of Neogene carbonate Neogene Carbonates and Siliciclastics from the subsurface of the Florida Keys: implications for seismic reflectivity," Marine Geology, vol. 144, (1997), pp. 9–31.

Biot, M.A., "Theory of Propagation of Elastic Waves in a Fluid–Saturated Porous Solid. I. Low–Frequency Range," *J. Acoust. Soc. Am.*, vol. 28, No. 2, Mar. 1956, pp. 168–178.

Biot, M.A., "Theory of Propagation of Elastic Waves in a Fluid–Saturated Porous Solid. II. Higher–Frequency Range," *J. Acoust. Soc. Am.*, vol 28, No. 2, Mar. 1956, pp. 179–191.

Bregman, N.D., Bailey, R.C., and Chapman, C.H., "Crosshole seismic tomography," *Geophysics*, vol. 54, No. 2, (Feb. 1989), pp. 200–127, 11 Figs.

Bregman, N.D., Chapman, C.H., and Bailey, R.C., "Travel Time and Amplitude Analysis in Seismic Tomography," *J. Geoph. Res.*, vol.4, No. B6, Jun. 10, 1989, pp. 7577–7587.

Dvorkin, J., and Nur, A., "Dynamic porelasticity: A unified model with the squirt and the Biot mechanism," *Geophysics*, vol. 58, No. 4, (Apr. 1993), pp. 524–532, 6 Figs.

Jones, Terry D., "Pore fluids and frequency–dependent wave propagation in rocks," Geophysics, vol. 51, No. 10 (Oct. 1986) pp.1939–1953, 18 Figs., 2 Tables.

(List continued on next page.)

*Primary Examiner*—Hezron Williams
*Assistant Examiner*—Anthony Jolly
(74) *Attorney, Agent, or Firm*—Schnader Harrison Segal & Lewis LLP

(57) ABSTRACT

A non-destructive method of measuring physical characteristics of a medium, such as uncemented sediment, sandstone, or limestone. A pseudo-random code is generated and is used to generate a pseudo-random acoustic signal. This signal is transmitted into the medium to be measured through the use of a transducer, such as a piezoelectric element, and is received by a plurality of hydrophones. The received signal is then processed to obtain an image of its velocity and attenuation. A universal geoacoustic model of the medium for a given set of measured data is determined, and the model is solved to obtain a pair of permeability-porosity results for the medium. The one of this pair of permeability-porosity results which is correctly indicative of the physical characteristics of the medium is then determined.

27 Claims, 53 Drawing Sheets

(28 of 53 Drawing Sheet(s) Filed in Color)

OTHER PUBLICATIONS

Yamamoto, T., "Acoustic Imaging of Permeability of Limestone Formations by Crosswell Tomography," Geo–Acoustics Laboratory, RSMAS, University of Miami, Miami, Florida, 33149, USA, pp. 2 and 3 of 19.

Yamamoto, T., "Acoustic propagation in the ocean with a poro–elastic bottom," *J. Acoust. Soc. Am.*, 73(5), May 1983, pp. 1587–1596.

Yamamoto, T., "Acoustic scattering in the ocean from velocity and density fluctuations in the sediments, "Geo–Acoustics Laboratory, RSMAS, University of Miami, Miami, Florida, 33149, USA, Abstract, pp. 1–32, 1 Table, 12 Figs.

Yamamoto, T., "Imaging the permeability–porosity structure within the near–surface sediments of Tokyo by acoustic crosswell tomography," Geo–Acoustics Laboratory, RSMAS, University of Miami, Miami, Florida, 33149, USA, pp. 1–5.

Yamamoto, T., "A Poro–Elastic Model of Extreamly Permeable Limestone for Permeability Imagining," Geo–Acoustics Laboratory, Applied Marine Physics Division, RSMAS, University of Miami, Miami, Florida, 33149, USA, pp. 1–18, 3 Tables, 6 Figs.

Yamamoto, T., Nye, T., and Kuru, M., "Imaging the permeability structure of a limestone aquifer by crosswell acoustic tomography," *Geophysics,* vol. 60, No. 6 (Nov.–Dec. 1995), pp. 1634–1645, 12 Figs., 1 Table.

Yamamoto, T., Nye, T., and Kuru, M., "Porosity, Permeability, Shear Strength: Cross–Well Tomography Below an Iron Foundry," Geo–Acoustics Laboratory, Applied Marine Physics Division, RSMAS, University of Miami, Florida, 33149, USA, pp. 1–31, 8 Figs.

Yamamoto, T., and Sakakibara, J., "Crosswell tomography imaging of the permeability structure within a sandstone oil field," Geo–Acoustics Laboratory, Applied Marine Physics Division, RSMAS, University of Miami, Florida, 33149, USA, pp. 5–9 of 19 (5 Figs.).

Yamamoto, T., Trevorrow, M., Badiey, M., and Turgut, A., "Determination of the seabed porosity and shear modulus proviles using a gravity wave inversion," *Geophys J, Int.* (1989) 98, pp. 173–182.

* cited by examiner

Well Names and Configuration
C-13 APT Site, Broward County

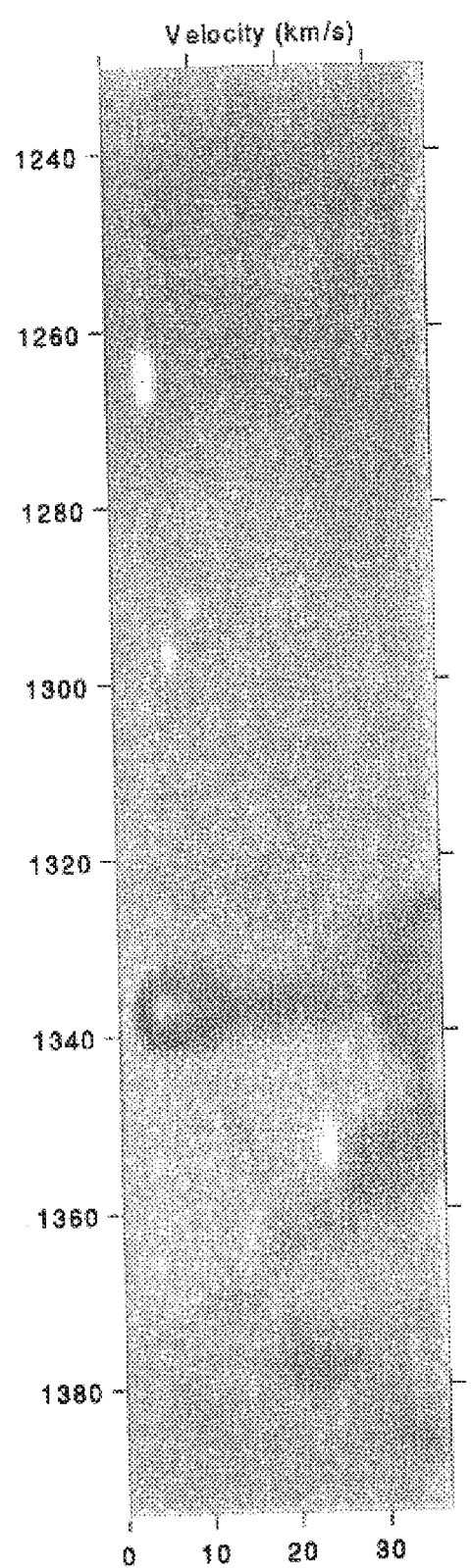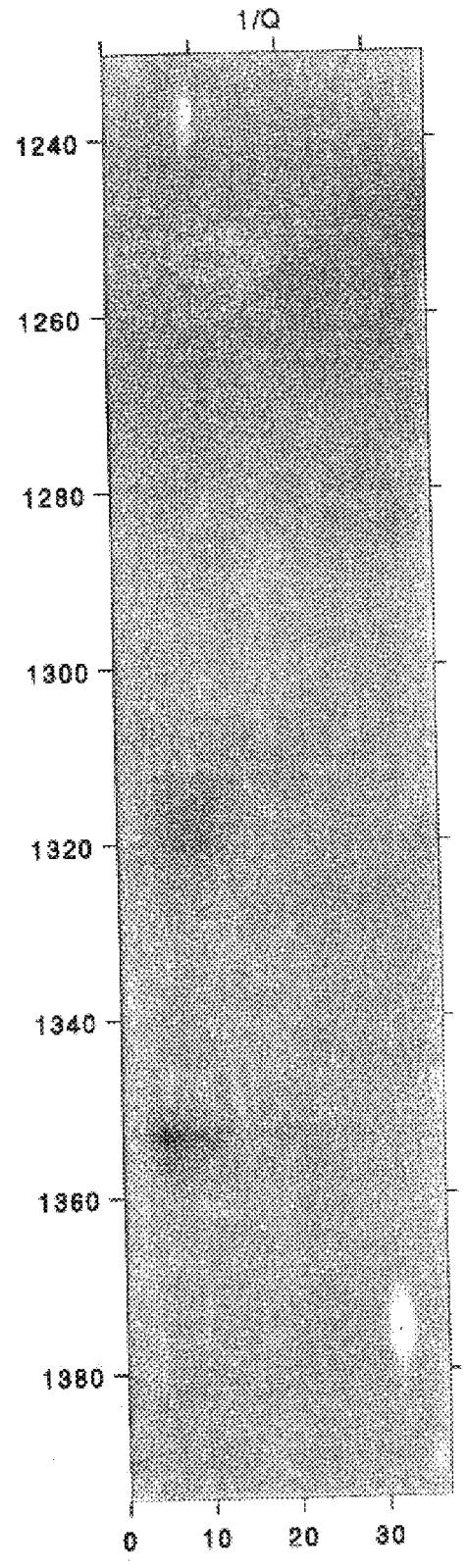
Fig. 6D

PERMEABILITY AND POROSITY COMPARISONS BETWEEN THE SUPER-K INVERSION
VS. PUMPING TESTS AND NEUTRON DENSITY LOGS

SFWMD TEST SITE: LIMESTONE FORMATION AT 1157 FEET DEPTH

Permeability by Pumping Tests: k=89.0 darcies (SFWMD, 1997)
Porosity by Neutron Logs: $\phi$ = .440+/−.050 (Shulumberge, 1993)

| Frequency (kHz) | $V_p$ (m/s) | $Q^{-1}$ | ACOUSTIC DATA $k_1$ (darcies) | $\phi_1$ | $k_2$ (darcies) | $\phi_2$ |
|---|---|---|---|---|---|---|
| 2 | 2718 | .0605 | 120.0 | .458 | 24.4 | .440 |
| 4 | 2814 | .0405 | 93.2 | .448 | 7.58 | .425 |
| 8 | 2880 | .0239 | 78.5 | .440 | 2.18 | .417 |
| 12 | 2862 | .0133 | 99.4 | .445 | 0.78 | .417 |
| Average (stand.dev.) | ---- | ---- | 97.8 (14.9) | .448 (.007) | 8.73 (9.39) | .427 (.009) |

Fig. 16A

PERMEABILITY AND POROSITY COMPARISONS BETWEEN THE SUPER-K INVERSION
VS. PUMPING TESTS AND NEUTRON DENSITY LOGS

SFWMD TEST SITE: LIMESTONE FORMATION AT 1514 FEET DEPTH

Permeability by Pumping Tests: k=33.2 darcies (SFWMD, 1997)
Porosity by Neutron Logs: $\phi$ =.390+/−.110 (Shulumberge, 1993)

| Frequency (kHz) | $V_p$ (m/s) | $Q^{-1}$ | ACOUSTIC DATA $k_1$ (darcies) | $\Phi_1$ | $k_2$ (darcies) | $\Phi_2$ |
|---|---|---|---|---|---|---|
| 2 | 3545 | .0712 | 33.7 | .342 | 125.0 | .357 |
| 4 | 3580 | .0553 | 33.7 | .345 | 22.7 | .342 |
| 8 | 3616 | .0323 | 35.0 | .357 | 4.75 | .352 |
| 12 | 3652 | .0204 | 35.7 | .342 | 1.77 | .326 |
| Average (stand.dev.) | ---- | ---- | 34.5 (0.90) | .347 (.006) | 38.5 (50.5) | .344 (.012) |

Fig. 16B

METHOD OF IMAGING THE PERMEABILITY AND FLUID CONTENT STRUCTURE WITHIN SEDIMENT

RELATED APPLICATION

This is a continuation-in-part of our application Ser. No. 09/107,675 filed Jun. 30, 1998, now U.S. Pat. No. 6,061,300.

FIELD OF THE INVENTION

The present invention relates to a method of imaging the permeability and fluid content structure within geological sediments, more particularly to the use of cross-well tomography to image geological structures, and more particularly to the use of cross-well tomography to image the porosity and shear strength in geological structures.

BACKGROUND OF THE INVENTION

Imaging the permeability structure within sediments has been a challenge to exploration geophysicists for many years. The results so far have been very limited.

In practice, perhaps the most reliable conventional method of measuring permeability within sedimental earth is through the use of a pumping test. This method requires at least two wells to pump water continuously out of one well at a constant rate and to observe the amount of change in the resulting water level of the other well. These two wells must also penetrate down to the layer of interest, and the well section above the layer of interest must be cased to isolate the layer. In such conventional systems, the two wells have to be separated by a horizontal distance of at least 500 ft.

However, this method has the significant disadvantage that it is very expensive and time-consuming, and only produces the measurement of an average permeability of the layer between the wells. This method also does not provide any information concerning the spatial distribution of permeability, known as the permeability image of the layer.

Cross-well seismic tomography has been widely used to image geological structures within the earth. Usually, the seismic velocity and attenuation information are inverted from measured arrival times and amplitudes of the seismic pulses received in a well, which pulses were originated from another well, the wells being separated at a certain horizontal distance. Two systems of conducting cross-well tomography are disclosed in U.S. Pat. Nos. 5,142,500 and 5,406,530, the contents of which are hereby incorporated by reference herein.

U.S. Pat. No. 5,142,500 discloses a method of measuring the permeability, porosity and shear strength of a geological structure. This patent also discloses how the average permeability of beach sand between a source and a receiver can be measured acoustically by measuring the sound velocity and attenuation at multiple frequencies and comparing the data to the theoretical values of velocity and attenuation at the same frequencies, as calculated using the Biot theory, which is discussed in detail in Biot, M.A., "The theory of propagation of elastic waves in a fluid-saturated porous solid, II high frequency range," J. Acoust. Soc. Am., Vol. 28, 179–191, 1956, the contents of which are incorporated by reference herein.

U.S. Pat. No. 5,406,530 discloses a non-destructive system of measuring the range, the accuracy, and the frequency resolution of acoustic cross-well tomography. It dramatically improves the measurement of these characteristics through the use of a pseudo-random binary sequence ("PRBS") method. The invention of PRBS analysis has enabled users of the system to obtain accurate and long distance images of sound velocity and attenuation within sediments.

However, while the PRBS method disclosed in U.S. Pat. No. 5,406,530 provides significant advantages in the accuracy of long distance imaging of sound velocity, it produces only the average permeability between a source and receiver by repeating acoustic transmission at multiple PRBS frequencies. No spatial distribution or imaging of the permeability structure within the sediments was obtained from that invention, and sound velocity and attenuation still had to be measured at multiple frequencies.

The methods disclosed in the aforementioned patents provide significant advantages over the more conventional methods, such as pumping tests, which are very expensive and time-consuming, and only measure an average permeability of the layer between the wells. Great advantage would be achieved in the use of a cross-well tomography system which needs to use only a single PRBS signal to create a spatial distribution measurement of permeability throughout a geological structure.

OBJECTS OF THE INVENTION

Accordingly, it is an object of the present invention to provide a highly accurate non-destructive method of measuring physical characteristics of sediments and, particularly to obtain accurate cross-sectional spatial distributions of porosity and permeability values and variations, and to obtain accurate and clear measurement even when the method is practiced in a noisy environment.

It is another object of the invention to practice the method at great distances between cross wells, such as a mile or more.

It is still another object of the invention to provide such a novel and highly accurate non-destructive method of measurement at high frequencies not heretofore possible.

Further, is an object of the invention to obtain accurate evaluations of porosity and permeability through the use of limited acoustic frequencies.

Other important objects and advantages of the present invention will be apparent to those of skill in the art based upon the following disclosure, drawings, and claims.

BRIEF DESCRIPTION OF THE DRAWINGS

This application contains at least one drawing executed in color.

FIGS. 16(a) and 16(b) are tables illustrating permeability and porosity comparisons between the second preferred embodiment of the invention and pumping tests and density logs.

DESCRIPTION OF THE INVENTION

Figure 1:
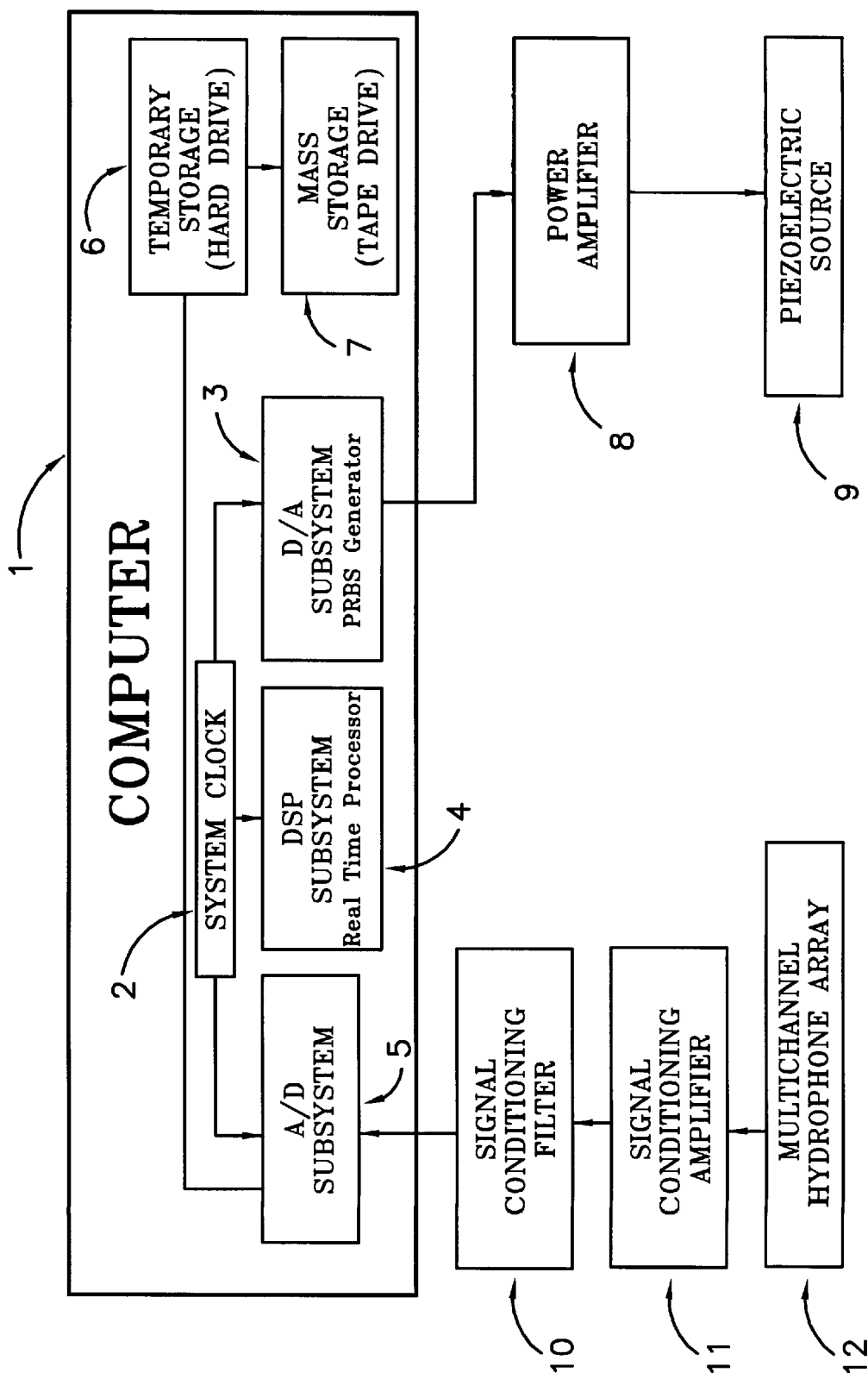
FIG. 1 is a schematic view illustrating a preferred embodiment of the invention.

It will be appreciated that the following description is intended to refer to the specific embodiments of the invention selected for illustration in the drawings and is not intended to define or limit the invention, other than as in the appended claims.

In accordance with the present invention, an image of the permeability structure within earth sediments is transformed from sound velocity and attenuation images within the sediments, which all may be measured by cross-well tomography using only a single pseudo random binary system (PRBS) frequency.

This may be accomplished by electro-acoustically measuring a pair of sound velocity-attenuation images within the sediments and then empirically transforming the velocity-attenuation image pair into a corresponding permeability-porosity image pair. This transformation procedure produces the permeability image from a measured velocity-attenuation image pair.

This can be accomplished by generating a PRBS signal of a desired frequency, transmitting it from a transducer to and through a medium to be measured, receiving and processing the transmitted signal, and averaging or cross correlating the received PRBS signals with the input PRBS signal in real time. By monitoring the received PRBS signal in real time, the system of the present invention is capable of controlling the quality of data at virtually any desired level of signal-to-noise ratio. This ensures the accuracy of measurement of the velocity and attenuation images that can be accurately inverted from the time wave form data.

FIG. 1 illustrates a preferred embodiment of apparatus useful in practicing the invention utilizing a computer. Of course, the method of the present invention is not limited to the use of a computer, but can incorporate any configuration of electrical and mechanical signal generating, receiving, and processing equipment capable of completing the image inversion in the manner of the present invention, as described in more detail hereinafter.

As shown in FIG. 1, computer 1 may include system clock 2, which is connected in a conventional matter to PRBS generator 3, real time processor 4 and analog/digital (A/D) subsystem 5. These components may be configured in any number of ways known to those of ordinary skill the art, such as the through use of integrated chip technology or discrete logic circuits.

A/D subsystem 5 is connected in a conventional manner to temporary storage 6 which is in turn connected to mass storage 7. Temporary storage 6 and mass storage 7 may comprise any number of conventional electromagnetic or electro-optical storage media, such as ferromagnetic disk drives, ferromagnetic tape systems, or read-writable CD-ROM technology.

PRBS generator 3 is connected to power amplifier 8 which is in turn connected to piezoelectric source 9. A/D subsystem 5 is connected to signal conditioning filter 10 which is in turn connected to signal conditioning amplifier 11 and multi-channel hydrophone array 12.

PRBS generator 3 generates an electrical signal of a selected frequency which is transmitted to power amplifier 8 in a conventional matter. PRBS generator 3 may comprise any number of fixed or variable oscillating sources known to those of ordinary skill the art, such as crystal oscillator and associated circuitry. The generation of the signal from PRBS generator 3 is controlled by a real time processor 4 in a programmed manner. For example, real time processor 4 may contain computer programming code, stored in memory therein in a conventional manner, which sets forth the specific operational steps to be taken by a computer 1 in selecting, generating and processing the transmitted and received signal in accordance with the present invention, as described in more detail below.

Piezoelectric source 9 converts the electrical signal from PRBS generator 3, which is amplified by power amplifier 8, into an acoustical signal which is transmitted outwardly into and through the medium to be measured.

The reflected acoustical signal from the medium is received by multi-channel hydrophone array 12, which converts this acoustical signal back to an electrical signal for processing. The received signal is passed through signal conditioning amplifier 11 and signal conditioning filter 10 and passed to A/D subsystem 5. The received signal is then stored in temporary storage 6 and/or mass storage 7.

The received signal may then be processed by real time processor 4 and stored in a temporary storage 6 or mass storage 7 in accordance with the present invention.

Figure 2:
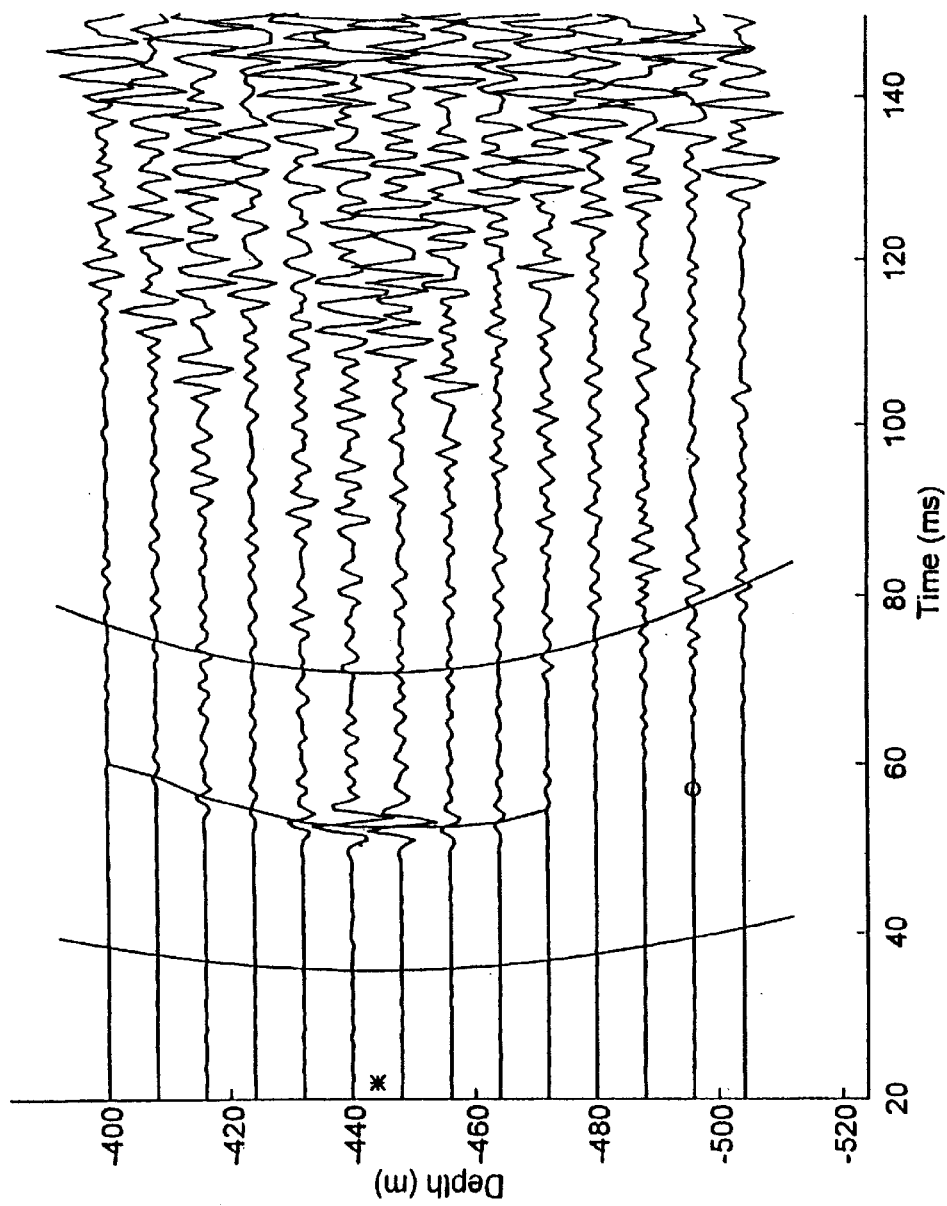
FIG. 2 is a graph of data obtained by the preferred embodiment of the invention.

An example of real data as received by multi-channel hydrophone array 12 is shown in FIG. 2. In this example, the cross-well distance was 107 m. The real time quality control achieved by the present invention is necessary for accurately imaging the permeability structure as well as imaging the fluid contents of pores within the sediments of the medium being measured.

The received signal data sent to real time processor 4 from A/D subsystem 5 is processed in accordance with a new inversion technique which explicitly converts a pair of sound velocity and attenuation images derived from the transmission and reception of a series of acoustical signals into a pair of permeability and porosity images. This inversion theory is discussed in detail in Yamamoto, T., "Acoustic propagation in the ocean with a port-elastic bottom," J. Acoust. Soc. Am., 73(5), 73(5), 1587–1596, May 1983, the contents of which are incorporated by reference herein.

Universal Sediment Model

A sound theoretical model, or an empirical model of elastic wave propagation through the sediment, is necessary for performing the permeability inversion. Particularly because of the large variability in the geothermal and geophysical properties of limestone, there has been no sound theoretical or empirical model of elastic wave propagation in limestone.

The limestone model used in accordance with the present invention is based upon the Biot theory of poroelasticity, the squirt flow mechanism in porous frame disclosed in Dvorkin, J, and Nur, A., "Dynamic porelasticity: A unified model with the squirt and the Biot mechanism," Geophysics, 58, 524–532, 1993, the contents of which are hereby incorporated by reference herein, and an elastic theory of limestone based on the laboratory ultrasonic measurements of compressional and shear waves through numerous limestone samples disclosed in Anselmetti, F. S., Salis, G. A. von, Cunningham, K. J., and Eberli, G. P., "Controls and Distribution of Sonic Velocity in Neogene Carbonates and Silliciclastics from the Subsurface of the Florida Keys: Implications for Seismic Reflectivity," Marine Geology, 144, 9–31 (1997), the contents of which are hereby incorporated by reference herein.

According to the Biot theory, discussed in Biot, M. A., "The Theory of Propagation of Elastic Waves in a Fluid-saturated Porous Solid, II. Higher Frequency Range," J. Acoust. Soc. Am., Vol. 28, No. 2, pp. 179–191, March 1956, the contents of which are incorporated by reference herein, two kinds of compressional waves can be propagated through a fluid filled porous medium. One is in the usual sound wave and the other is a diffuse wave which is seldom observed because of its high attenuation. The velocity, attenuation, and intrinsic attenuation of these waves and their interaction is represented mathematically by Biot.

In practice, only the compressional waves (the sound waves) are of interest. The Biot theory has been shown to be a good model for unlithified sediments. However, for lithified sediments, such as sandstone and limestone, other factors apply, including squirt flow which takes place in the frames of lithified sediments in addition to the basic Biot mechanisms.

Squirt flow is a flow of fluid which is squeezed in and out of small gaps between sediment grains in the vicinity of contact points, as the grains are pushed together or pulled away from each other as a result of propagation of the compression waves. The effects of the squirt flow mechanism can be and have been accommodated into the Biot mechanism.

Biot's theory can be used to create a universal geoacoustic model for various types of materials, such as sandstone and limestone. The universal geoacoustic model can model many kinds of sediments.

In this model, the input sediment properties are:

$K_s$=bulk modulus of solid phase,
$K_f$=bulk modulus of pore-fluid,
K=bulk modulus of sediment frame in dry condition,
N=shear modulus of sediment frame,
$\rho_s$=density of solid frame,
$\rho_f$=density of pore-fluid,
$C_a$=added mass coefficient of frame,
$\mu$=viscosity of pore-fluid,
k=permeability,
$\phi$=porosity,
$C_h$=squirt flow length to pore size ratio.

The frame elastic module K and N are functions of porosity and the in site effective stress. The values of model parameters are difficult to estimate theoretically. However, empirical relations are readily found by making laboratory ultrasonic measurements on core samples. Compressional wave velocity and shear wave velocity are measured on many rock samples from laboratory ultrasonic tests as functions of porosity and other parameters. Then the elastic module are extracted by comparing the ultrasonic data with rock models.

The empirical relation between the shear modulus N, porosity $\phi$, and the effective confining stress $\sigma$ is given as:

$$N=1.835e+5\{(1-\phi)/\phi\}^{1.12}\sigma^{1/2}, \{\text{units in Pa}\}.$$

The confining effective stress at a given depth of burial z in the sediment strata under normal consolidation is given as:

$$\sigma=g\int_0^z((1+2\chi)/3)(\rho_s-\rho_f)(1-\phi)dz,$$

where g is the acceleration of gravity and $\chi$ is the coefficient of earth pressure at rest and related to the internal friction angle $\theta_0$ by $\chi=1-\sin\theta_0$. Since $\theta_0$ in natural sediments is about 30°, $\chi$ is about 0.5.

The bulk modulus K of the sediment frame may be reasonably estimated from the shear modulus N and the Poison ratio of frame $\upsilon$ as:

$$K=N(2+2\upsilon)/(3-6\upsilon).$$

If there are no available data for $\upsilon$, one may assume $\upsilon=0.3$. A resulting small error in K is found not to be very critical in velocity calculations because the bulk modulus of a frame of an uncemented sediment K is usually much smaller than $K_f$ and $K_s$.

$V_p$ and $V_s$ are given as:

$$V_p=A_0-A_f\phi-A_3c, \quad V_s=B_0-B_f\phi-B_2c$$

where c is the clay content, and $A_j$ and $B_j$ (j=0, 1, 2) are empirical constants. These empirical constants are given for confining stresses of 50, 100, 200, 300 and 400 bars. These constants are only slightly affected by the confining stress. For a confining stress of 100 bars, they are:

$$A_0=5.39, A_f=7.08, A_2=2.02; B_0=3.29, B_f=4.73, B_2=1.74[\text{km/s}].$$

The median of c for the 75 samples is 0.10. Therefore, if no data are available for c, one may assume c=0.10 for velocity calculations.

The model elastic coefficients are given as follows. The shear modulus of the sediment frame is given by:

$$N=\rho V_s^2$$

where $\rho$ is bulk density of sediment given by:

$$\rho=(1-\phi)\rho_s+\phi\rho_f$$

Note that $N_s$ is given by N for $\phi=0$. For c=0.1, $N_s=2.57\text{e}10\text{Pa}$. Likewise, the bulk modulus of the solid phase $K_s$ for c=0.1, is given by:

$$K_s=\rho_s V_p^2-4N_s/3=2650\times(5.39-0.1\times2.02)^2-1.333\times2.57\text{e}10= 3.71\text{e}10\text{Pa}.$$

The bulk modulus of sediment frame K is given from the relation of a dry sample test and a wet sample test as:

$$K=N[(V_p/V_s)-U]^2,$$

where U is the difference between the wet velocity ratio and the dry velocity ratio, and is given as:

$$U=0.018+0.3\phi+0.47c.$$

For the median clay content c=0.1, U=0.065.

The elastic constants of limestone are much less well known, as compared to sandstone. Only very recently, some $V_p$ and $V_s$ data from ultrasonic measurements have been made. The effect of burial depth or confining stress on the elastic constants of limestone is negligible as compared to that of sandstone. On the other hand, the pore geometry and frame chemical composition are very widely varied in limestone as compared to sandstone. By fitting the limestone BISQ model to ultrasonic compression and shear wave velocity data, the following semi-empirical equations for limestone frame module are derived.

The shear modulus of the sediment frame is given by:

$$N=N_s(1-\phi)^n$$

where $N_s$ is the shear modulus of the solid phase, and is 3.86e10 Pa for calcite and 5.12e10 Pa for dolomite. The porosity power law exponent n may also vary. For the data set used, n=3.80. The frame bulk modulus does not follow the power law. Instead, we found that the Poisson's ratio of the frame is constant, $\upsilon=0.286$. Thus, the bulk modulus K of the limestone frame is given by:

$$K=N(2+2\upsilon)/(3-6\upsilon)=2.07N.$$

When used as a forward model, one can first select uncemented sediments, sandstone, or limestone. For any of these three cases a set of six index physical constants [$K_s$, $K_f$, $\rho_s$, $\rho_f$, ca, $\mu$]; frame elasticity parameters: [v, x, z] for uncemented sediments, [$A_j$, $B_j$ (j=0,1,2), c, $C_h$] for sandstone, or [$N_s$, v, n] for limestone; pore properties [k, $\phi$, $C_h$]; and frequency had to be given as a model parameters. Except for pore properties k and $\phi$, all of the other model parameters are physical constants. For the given set of model parameters, the forward model calculates the velocity and attenuation of the compressional and shear waves [$V_p$, $V_s$, $1/Q_p$, $1/Q_s$].

Because the shear wave attenuates much more than the compressional wave at a given frequency, only the compressional wave is recognizable in the recorded seismograms. Therefore, only the velocity and attenuation of the compressional wave are used in the permeability imaging, and are simply expressed as V and 1/Q.

When the universal geoacoustic model is used as an inversion model for a given set of measured data (such as compression wave velocity, attenuation, and wave frequency [V, 1/Q, f]), solutions of the model for a given set of data yield a pair of permeability and porosity results [k, $\phi$]. These results usually comprise two, sometimes more, possible solution pairs [$k_1$, $\phi_1$] and [$k_2$, $\phi_2$], where $k_1<k_2$ and $\phi_1<\phi_2$.

Thus, for a given pair of measured velocity and attenuation images, the model finds two possible solution pairs of permeability and porosity images. The correct pair of permeability-porosity images can easily be determined by a determination test in which the two permeability-porosity pairs are measured at two or more different frequencies from the repeated transmission of the PRBS signal at selected depths. Moreover, the correct permeability-porosity image solution pair can be selected through experienced practice or a priori information, such as borehole porosity logs, permeability data from a sample core, or even from the average permeability at a given depth interval determined by conventional pumping testing.

In another embodiment of the present invention, an exact solution formula based upon the numerical model discussed above may be utilized to develop the permeability and porosity images of the sediment being tested. This solution, known as the "super-k model" is a special case of the Biot model when the pore fluid undergoes no elastic restoring force when excited by acoustic waves. The super-k model gives the permeability and porosity images as the inverses of the acoustic velocity and attenuation at a given frequency in a closed analytical form.

The analytical super-k model allows for exact calculation of a measured pair of velocity and attenuation results at a given frequency. Two pairs of permeability and velocity images are transformed from a pair of acoustic velocity and attenuation images measured at a single frequency. The correct pair of permeability-porosity images can then be determined by measuring the velocity and attenuation at a second frequency, or at even a third or greater plurality of frequencies.

A study of the Biot mechanism and squirt flow phenomenon reveals that there is a solution regime where only the Biot mechanism dominates over the squirt flow mechanism, where the stiffness of the pore fluid F is negligibly small as compared to stiffness of the skeletal frame K. This condition arises when the permeability of a porous rock is extremely high—such as that in South Florida limestone formations which have permeability of the order of 10 to 100 darcies. In this case (k tends to be toward $\infty$), the stiffness of the pore fluid $F_{sq}$ tends to be toward 0.

Physically, this means that the permeability is so high that the skeletal frame of the rock is always relaxed through squirt flow. The characteristic equation of the super-k model solution is obtained after substitution of the following equation:

$$u=U \; esp[1(jx+\omega t)] \text{ and } w=W \; exp[i(jx-\omega t)]$$

Into the following derived density equations:

$$\rho_1 u_{tt} + \rho_2 w_{tt} = Mu_{xx} - \beta p_x$$

and $$\rho_2 w_{tt} - \rho_a(u_{tt}-w_{tt}) - (\mu \phi^2/k)(u_t-w_t) = -\phi p_x$$

where $\rho_{1=}(1-\phi)\rho_s$; $\rho_2=\rho_f$; $\rho_a=c_a(1-\phi)\rho_f$; t and x represent $\partial/\partial t$ and $\partial/\partial x$, p is the pore pressure; and M is a Biot elastic coefficient for the porous rock.

The incremental pore pressure is considered to be zero, p=0. The dispersion relation of the super-k model is then given as:

$$s^2 = \frac{(\rho_1\rho_2 = \rho_a\rho) + i\rho\rho_f\Phi}{M(\rho 2 + \rho_a + i\rho_f\Phi)}$$

where the dimensionless frequency-permeability parameter $\Phi$ is given as:

$$\Phi = \frac{\mu\phi^2}{\rho_{fk}\omega} = \frac{\omega_0}{\omega}$$

The super-k model can then be solved for a direct and analytical inverse solution for the permeability for a given acoustic data. First, the porosity inverse is calculated from the real part of the above equation. The density factors $\rho_1$, $\rho_2$, $\rho$ and $\rho_a$ are functions only of porosity $\phi$ with a constant value of added mass coefficient $C_a$. Then the permeability inverse is given through the imaginary part of the equation. For a given attenuation $Q^{-1}$ measured at a given frequency, two possible values of permeability are given by the two roots of the following parabolic equation of the dimensionless frequency-permeability parameter $\Phi$:

$$\Phi^2 - \rho_2^2/(\rho\rho_f Q^{-1})\Phi + (\rho_2+\rho_a)(\rho_1\rho_2+\rho_a\rho)/(\rho_f^2\rho) = 0$$

The correct inverse is found by repeating the inversion for $Q^{-1}$ measured at one or more different frequencies. The correct inverse is found as an invariant which is independent of frequency. Then, the correct permeability is found through the parabolic equation.

FIG. 16(a) is based upon extensive testing and compares the measured values of permeability and porosity inverted from each of the acoustic data of 2, 4, 8, and 12 kHz for a limestone formation at depth 1157 feet through the super-k inversion equation above. At the bottom of the table, the mean and the standard deviations of the two sets of permeability and porosity pairs are given. As can been seen, the first permeability-porosity pairs inverted from the four different frequencies are independent of the frequency within the range of experimental error having very small standard deviations, indicating that this pair is the correct answer; permeability k=97.8 darcies and the porosity is 0.448.

The second permeability-porosity pair changes greatly with the frequency, indicating that this pair is not the correct answer. The acoustically inverted permeability agrees excellently with the permeability value of 89.0 darcies measured from the pumping test by SFWMD (1997).

The acoustically inverted permeability and porosity for the limestone formation at 1514 are given in FIG. 16(b). This formation is found to have a smaller permeability and porosity; 34.5 darcies and 0.347, respectively, from the acoustic inversion. These values also agree excellently with the SFWMD pumping test permeability of 33.2 darcies and the downhole log porosity of 0.39.

PRBS Cross-Well Tomography Test

Figure 3:
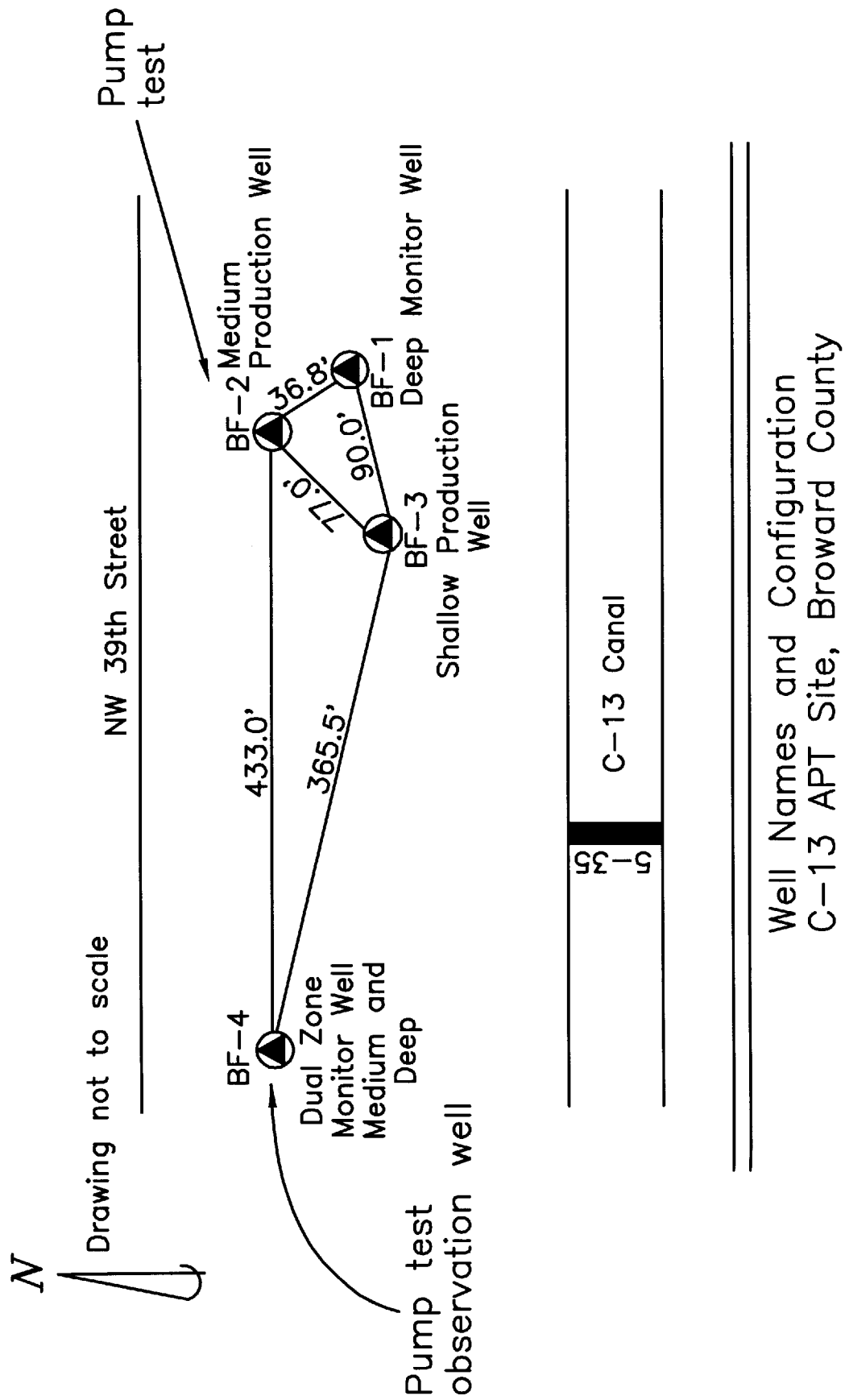
FIG. 3 is a geographic map showing the location of the PRBS Cross-Well Tomography Test site for testing of the present invention.

The method of the present invention and the significant advantages achieved thereby can be better understood through the description of actual test results using the system of the present invention. Such a test was conducted during the period between Mar. 3–12, 1997 using wells BF-1 and BF-2 of the South Florida Water Management District (SFWMD) in Fort Lauderdale, Flor. The exact locations of the wells used in the test are shown in FIG. 3.

The test wells were separated by 37 feet. Both wells were steel cased. Core tests were performed prior to the casing, yielding some porosity information. In addition, pumping tests were performed by the SFWMD across wells BF-2 and BF-4, which were separated by 433 feet. These produced average permeability values at two depth intervals.

Packer tests were also performed in well BF-1 by SFWMD which produced average permeability values and two more depth intervals within the levels used in the PRBS Cross-Well Tomography Test, which were compared with the acoustically imaged permeability obtained with the system of the present invention.

The PRBS Cross-Well Tomography Test was conducted across wells BF-1 and BF-2. An acoustic source ITC Model No. 6121 was placed in well BF-2 while an 8-channel hydrophone array with a constant inter-element distance of 24 feet was placed in well BF-1. A 40 foot high standpoint was placed at the source wellhead to keep water from rushing out of the artesian well. Wellhead pulleys were placed at both wells to change the elevation of the source and the hydrophones. The deepest source depth was at 1600 feet, where the steel casing ended in well BF-2. Above the depth of 1600 feet, both the source and the centroid of the hydrophone array were moved every 1.5 feet up to the depth of 1500 feet and then every 6 feet up to the depth of 1000 feet.

Figure 4:
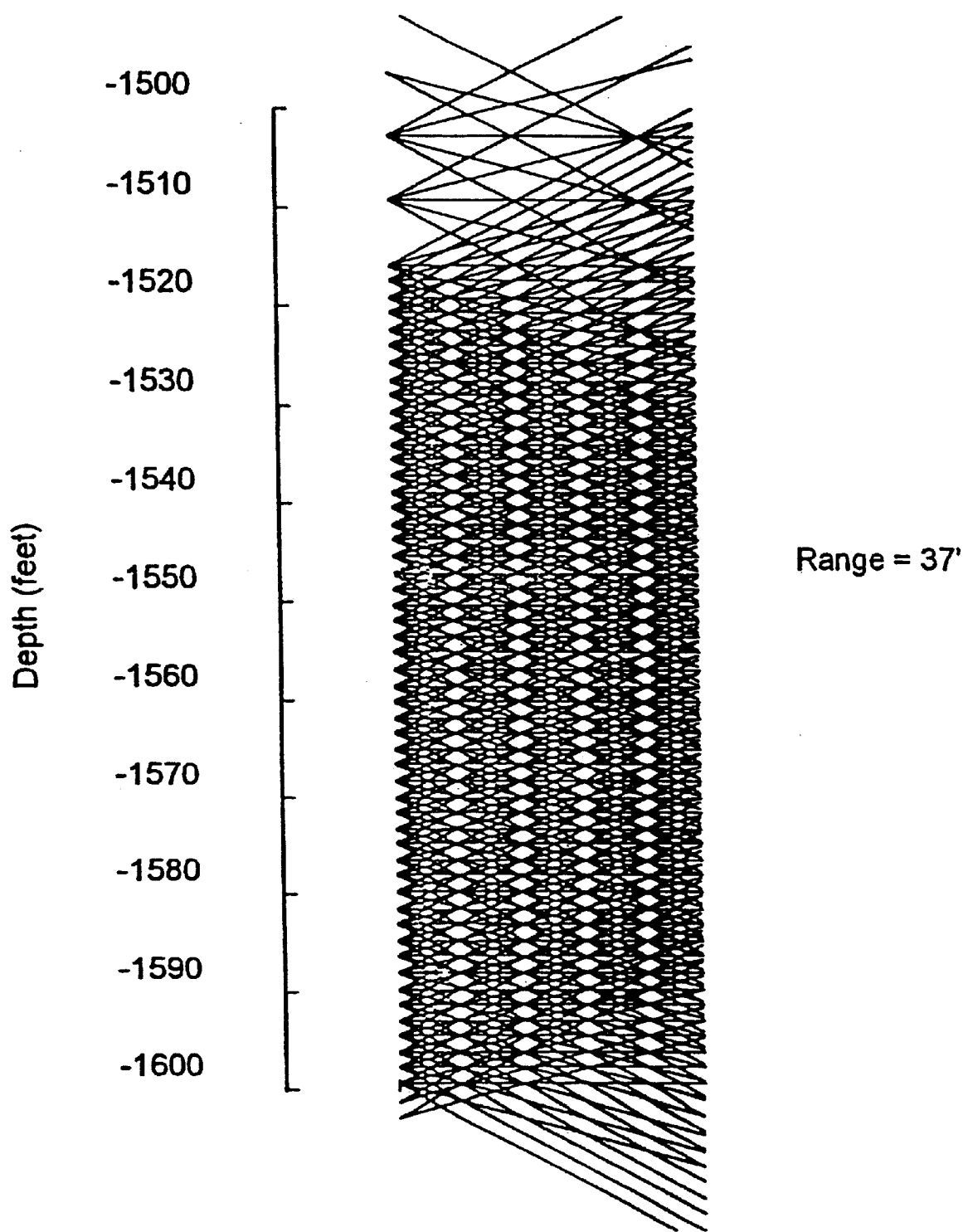
FIG. 4 is a graph showing the ray paths and inversion calculations used in the PRBS Cross-Well Tomography Test of the present invention.

The ray paths used during the test and the inversion calculations in the manner of the present invention are shown in FIG. 4. A 4 kHz PRBS pulse was used as the source signal. An average of 100 PRBS signals received by each hydrophone were recorded at each source depth by the computer in the manner as described above in connection with the embodiment shown in FIG. 1. In addition to this depth sweep, five PRBS frequencies of 1, 2, 4, 6 and 12 kHz were used at 20 depths at 30.5 feet intervals between depths 921 feet and 1482 feet in order to be used for selecting the correct pair of permeability-porosity images out of the two possible solution pairs.

Figure 5:
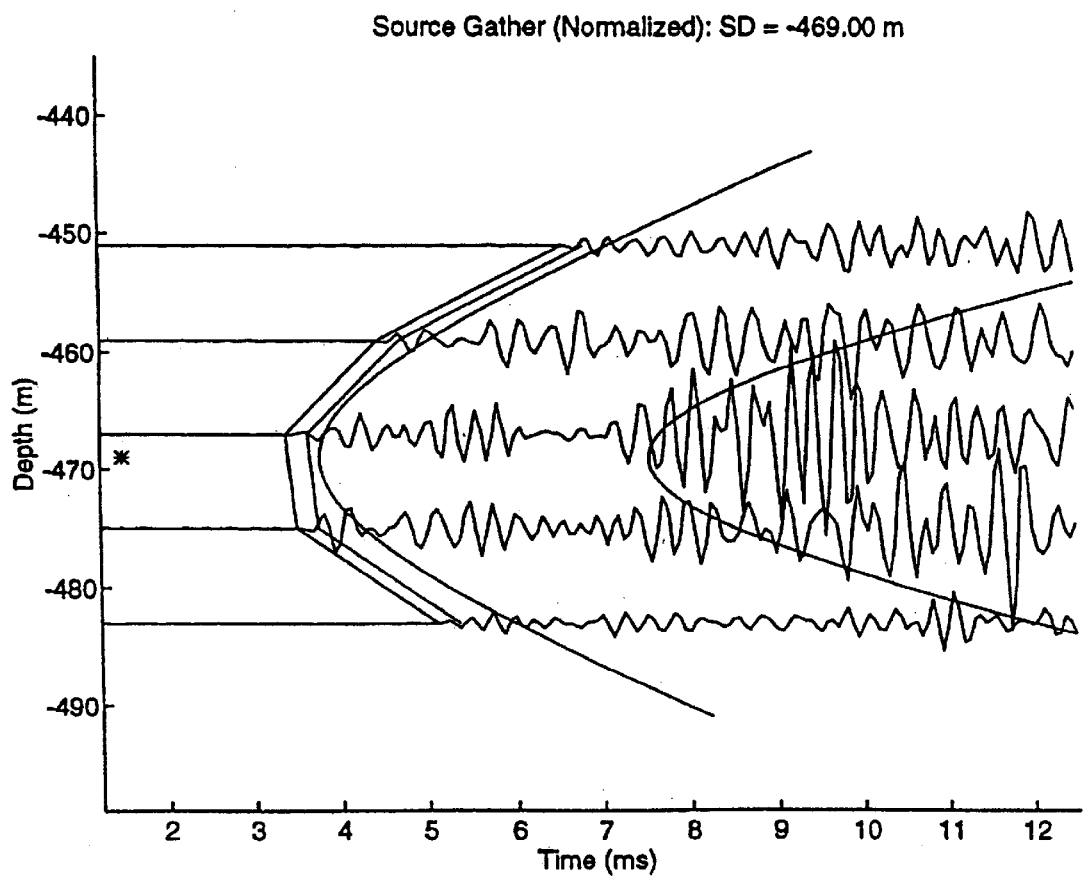
FIG. 5 is a graph showing the wave field measured by the hydrophone array used in the PRBS Cross-Well Tomography Test of the present invention.
Figure 6A:
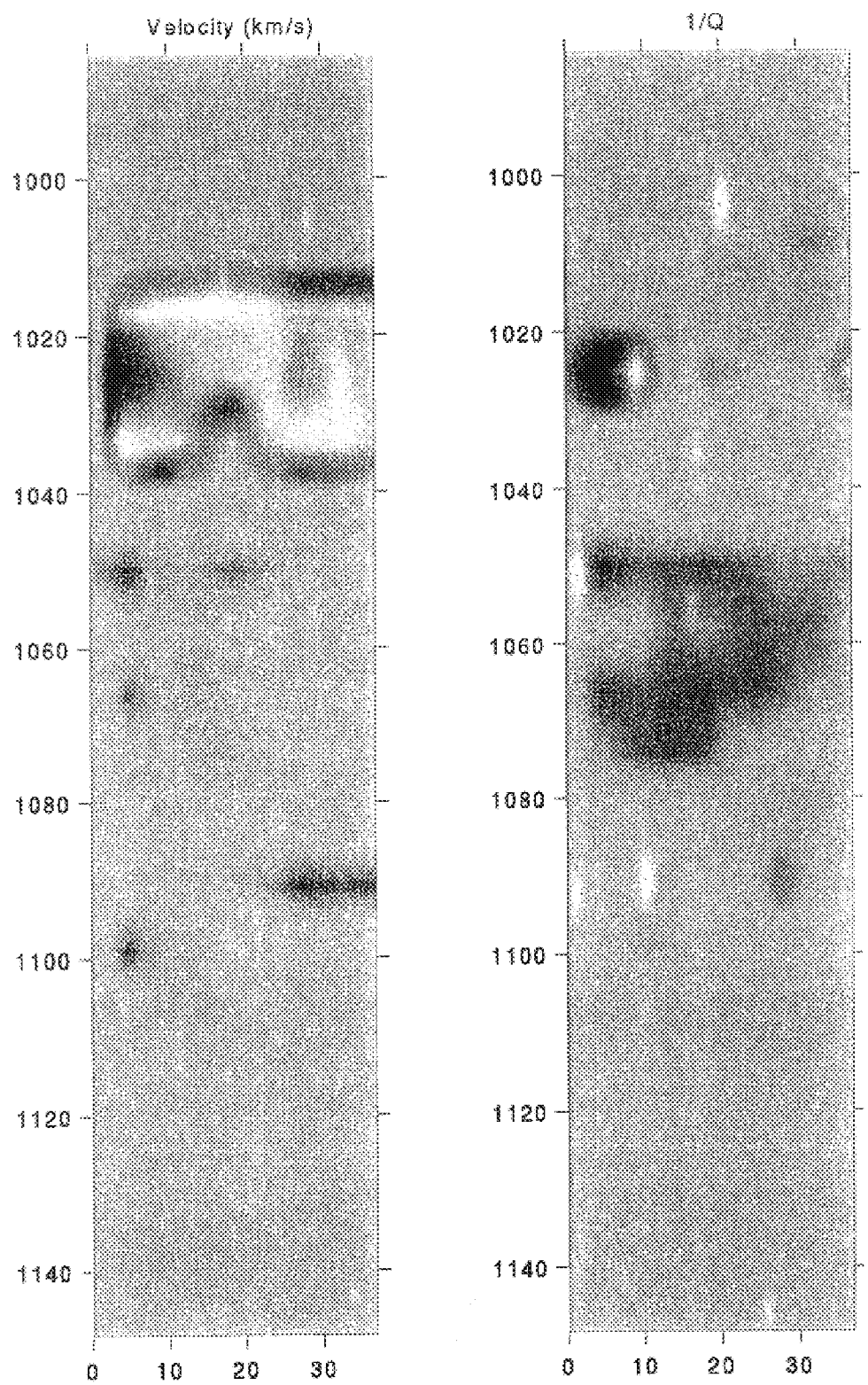
FIGS. 6($a$)–($i$) are a series of graphs showing the velocity and attenuation images of the PRBS Cross-Well Tomography Test of the present invention.
Figure 6B:
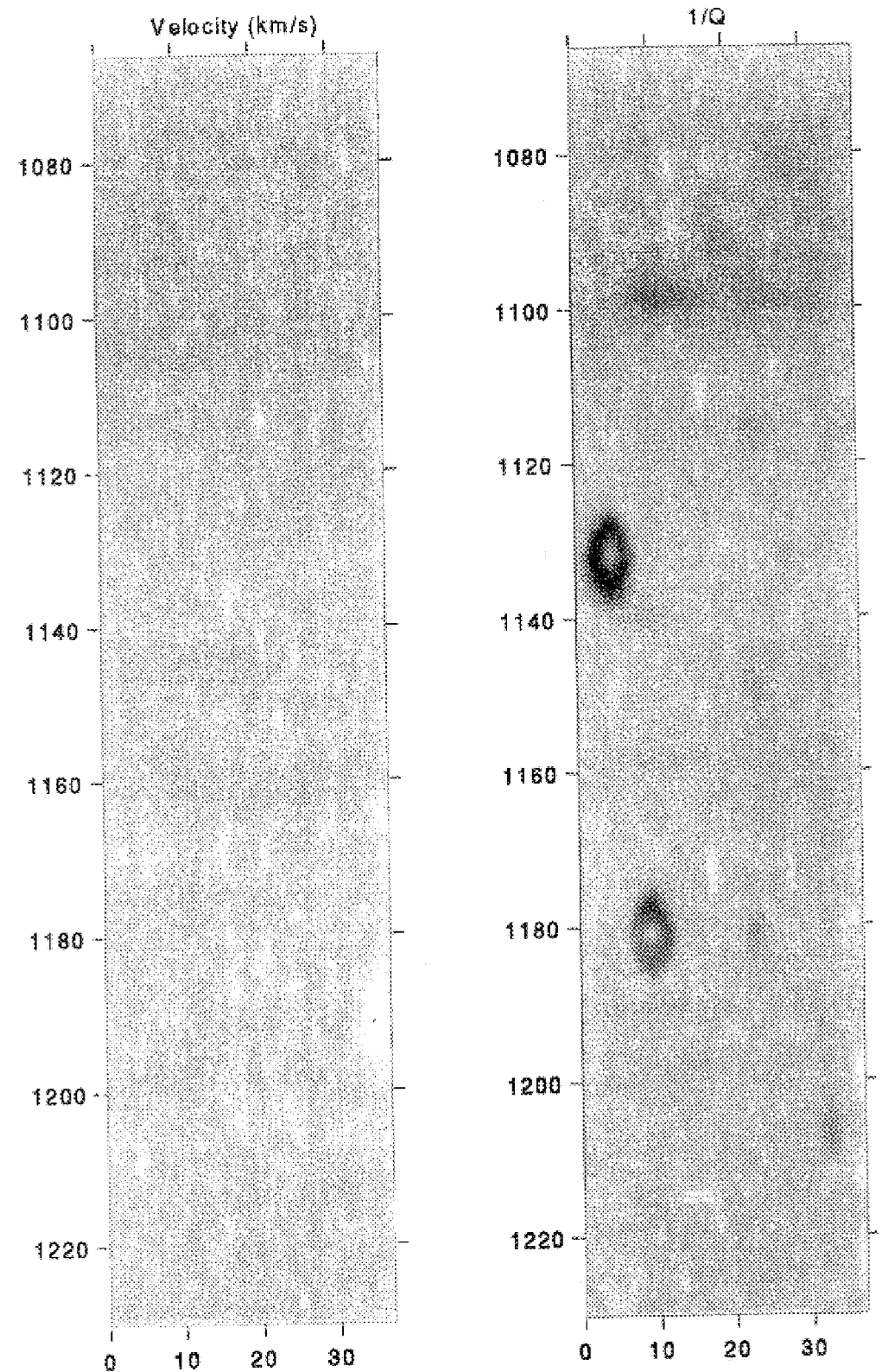
Figure 6C:
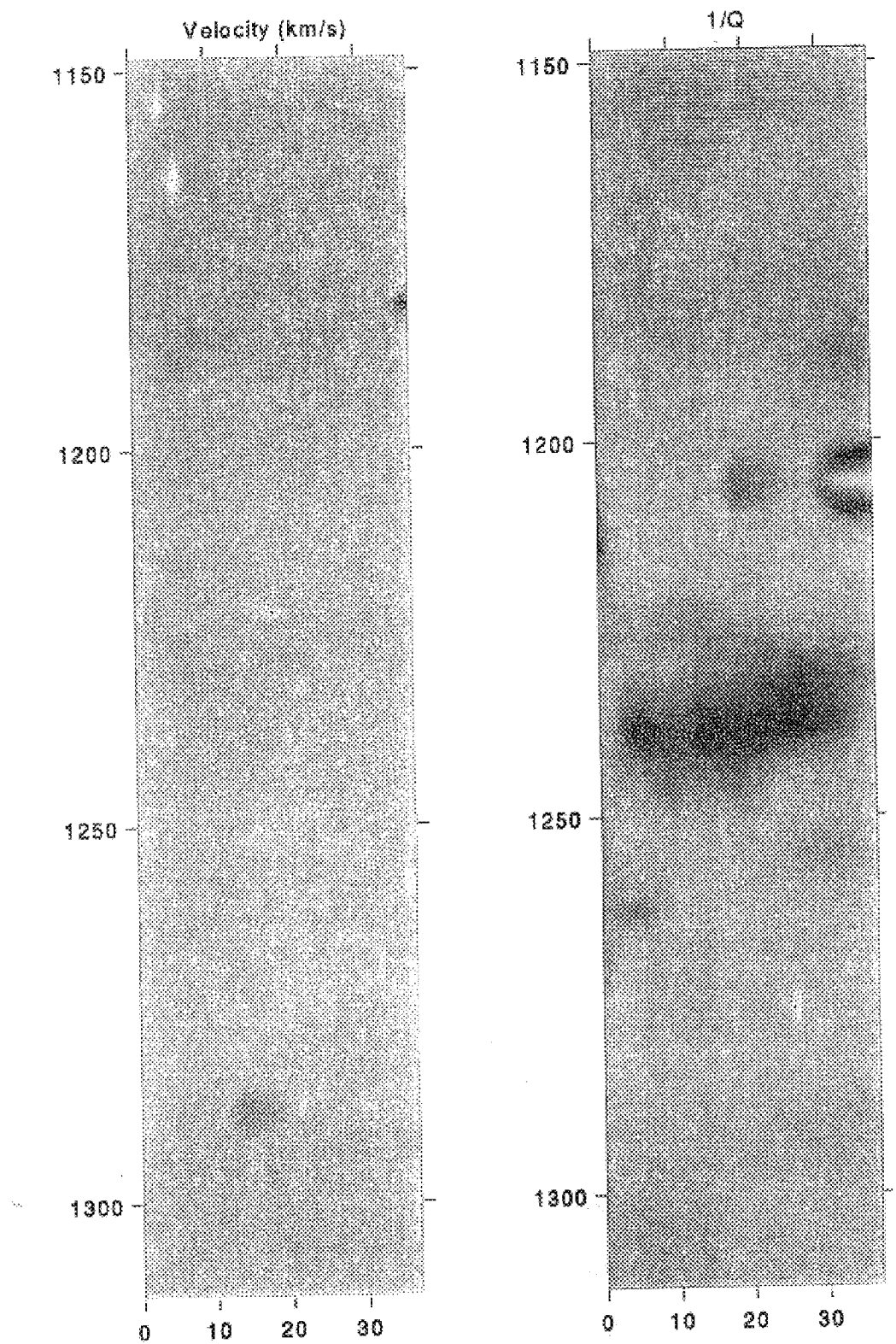
Figure 6E:
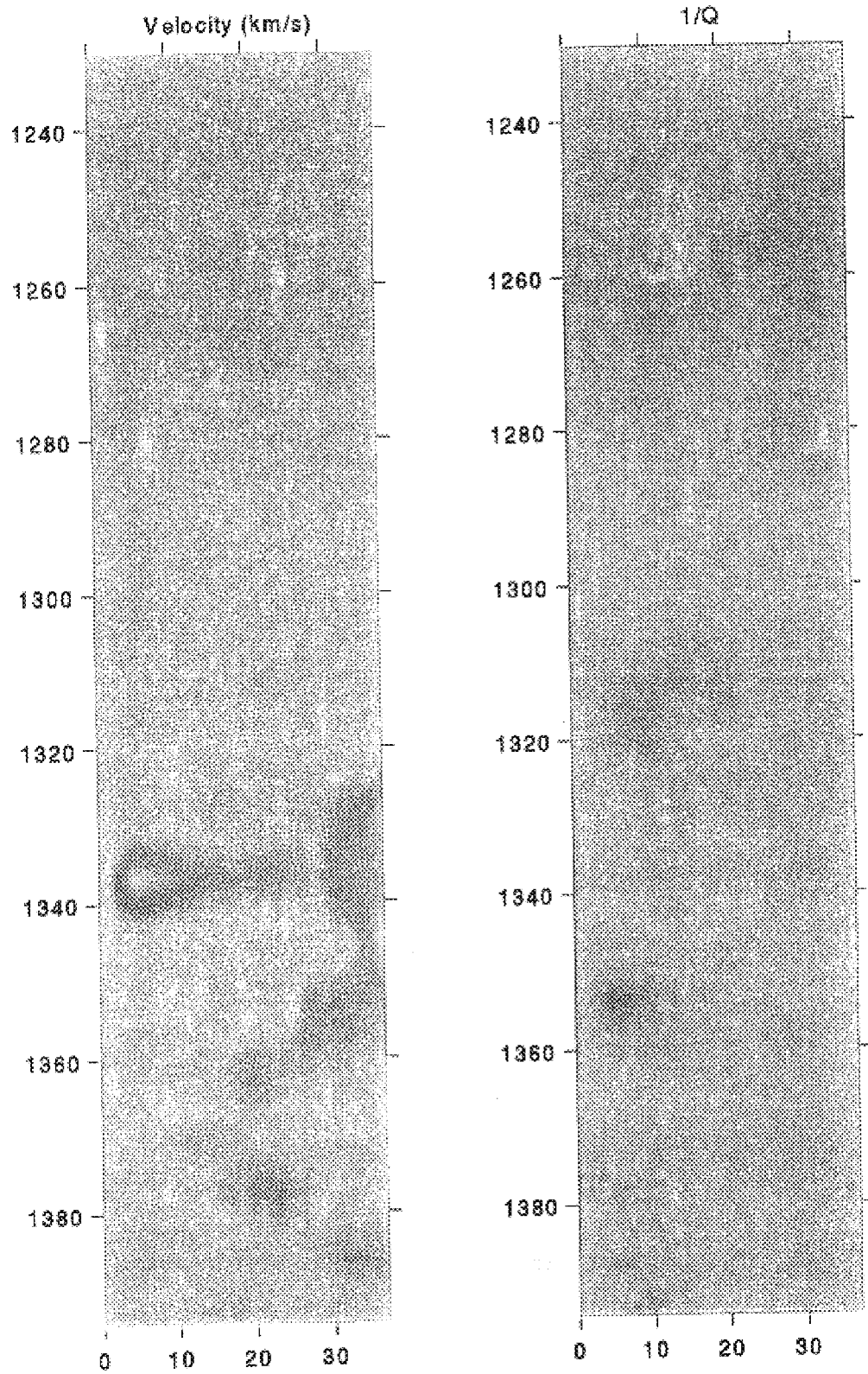
Figure 6F:
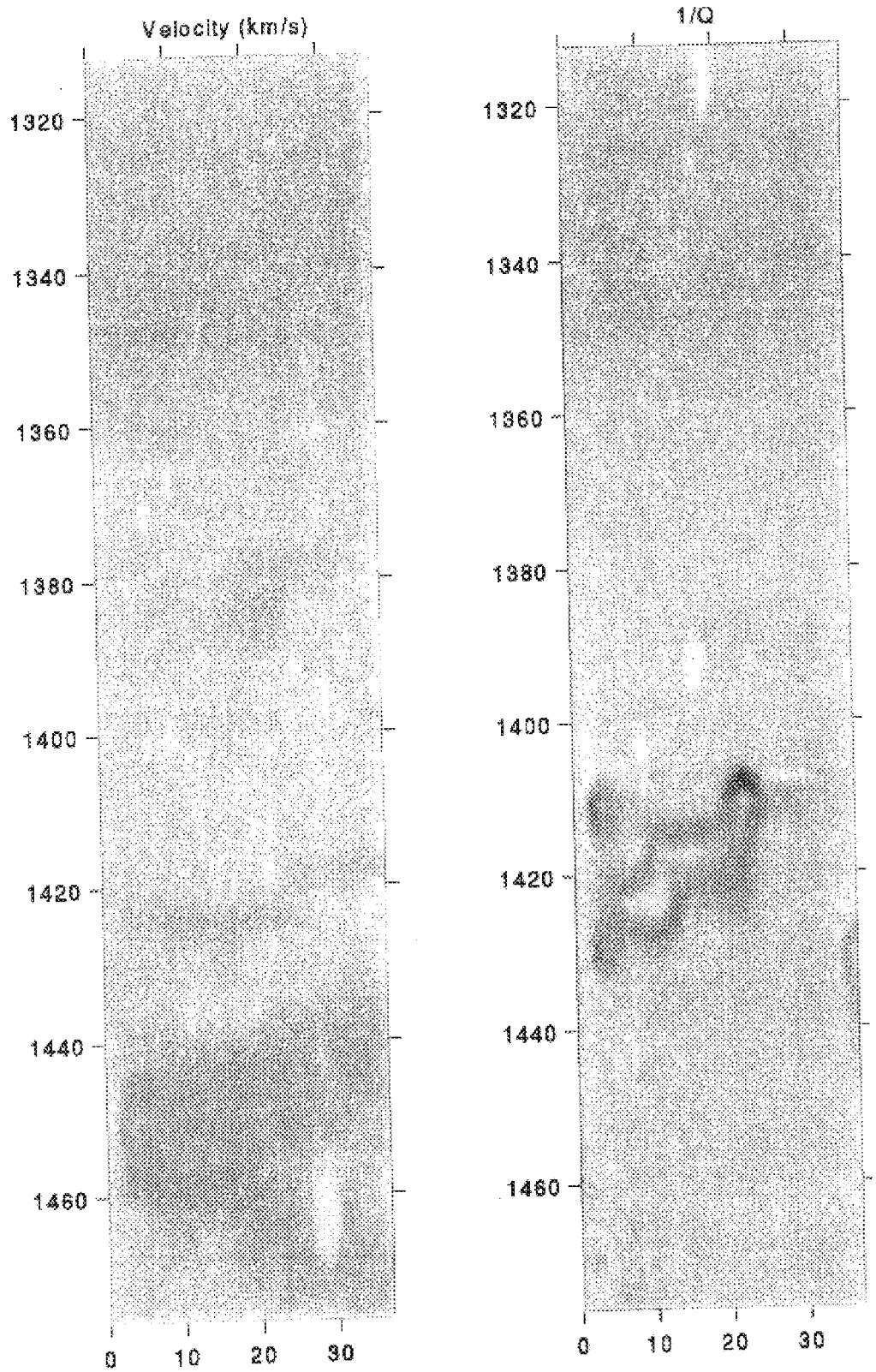
Figure 6G:
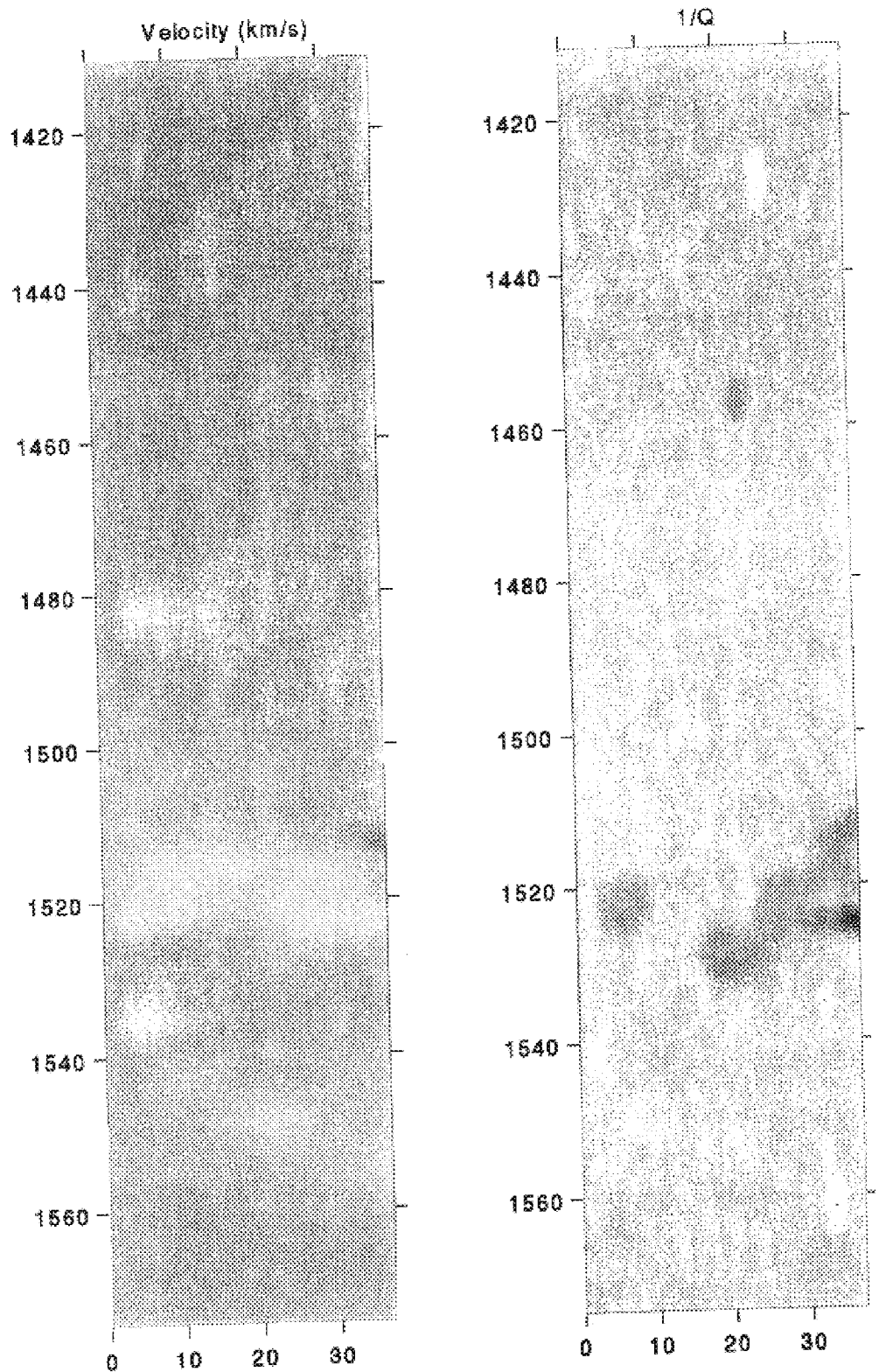
Figure 6H:
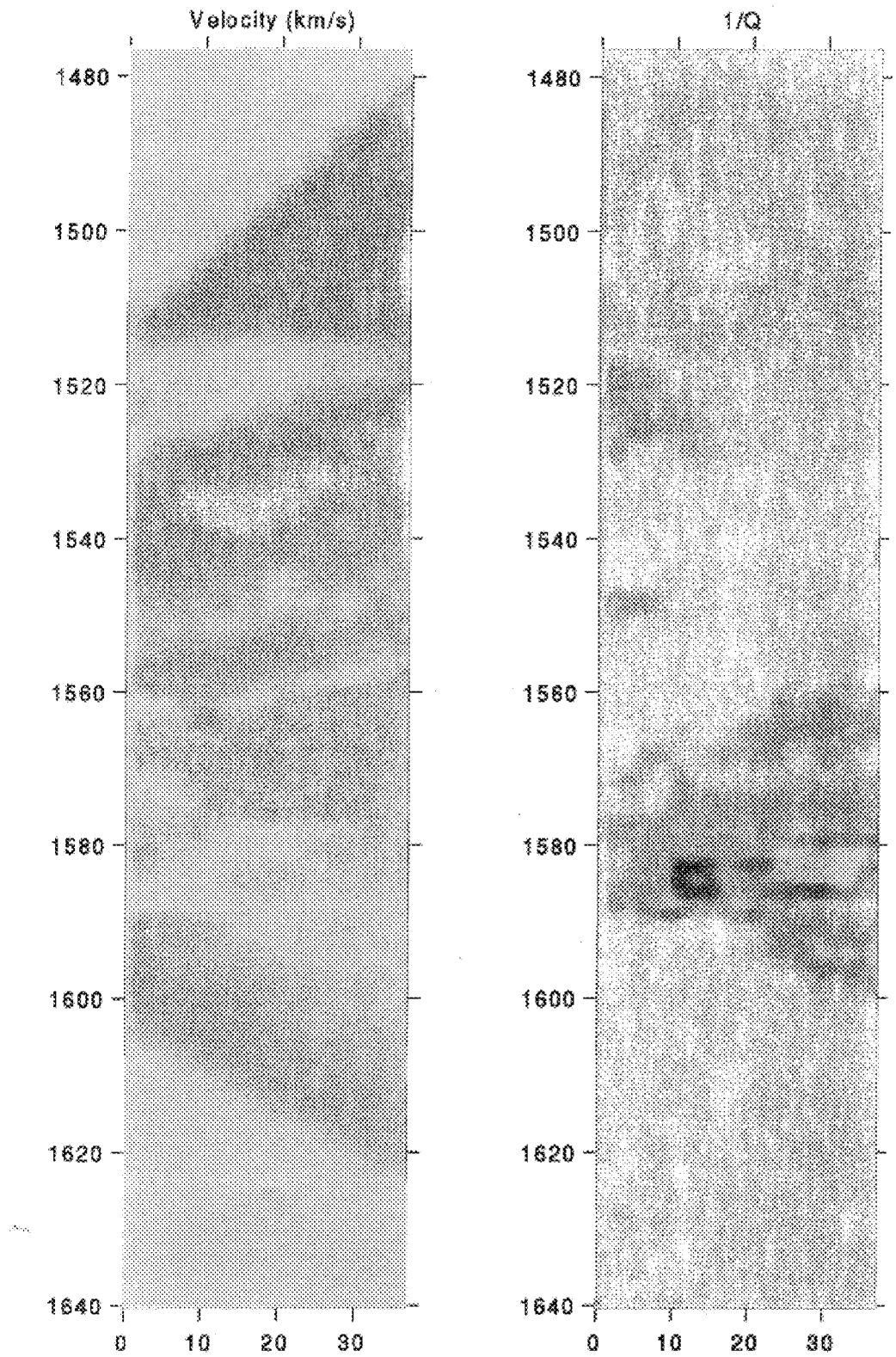
Figure 6I:
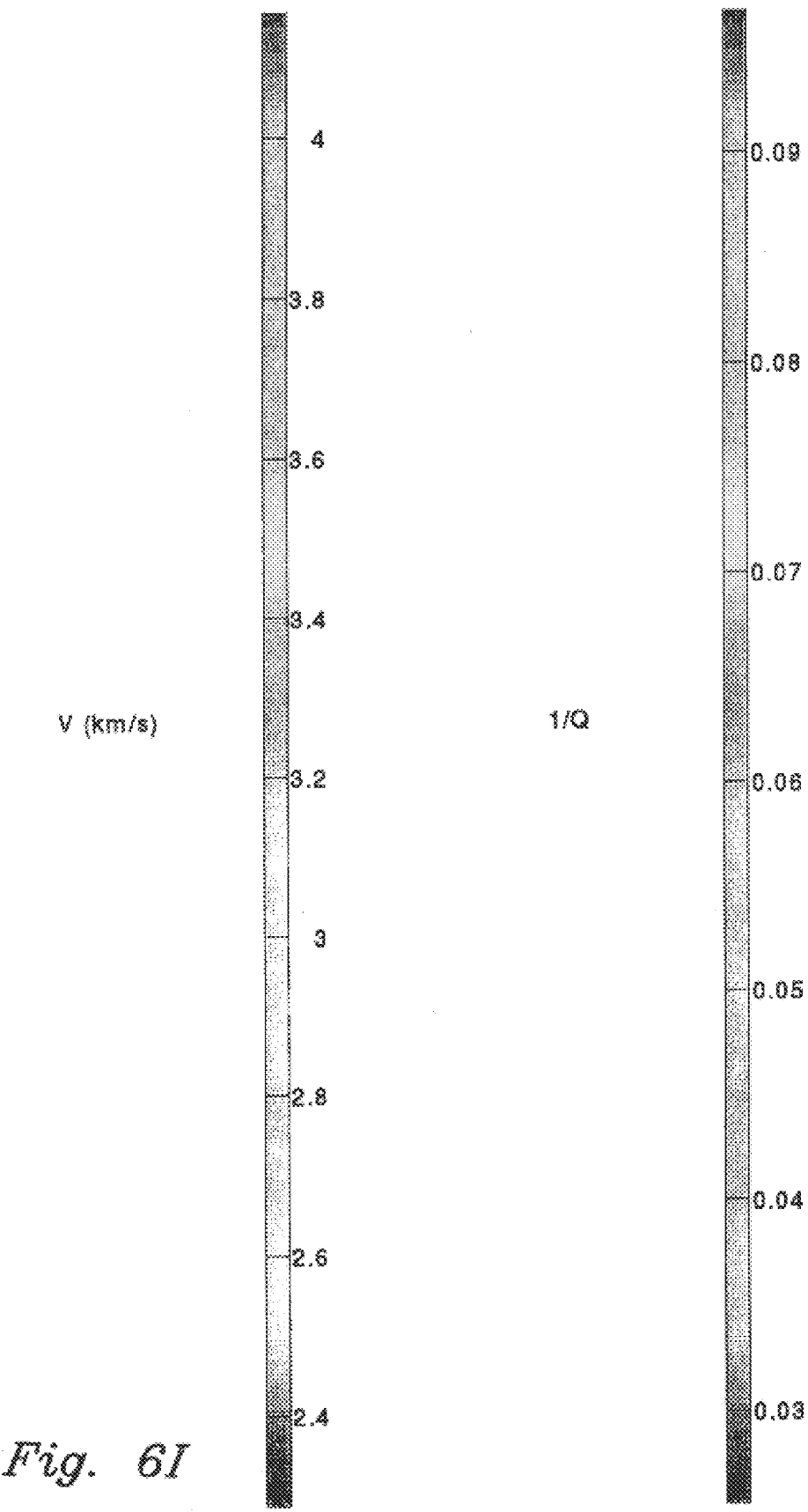
Figure 7A:
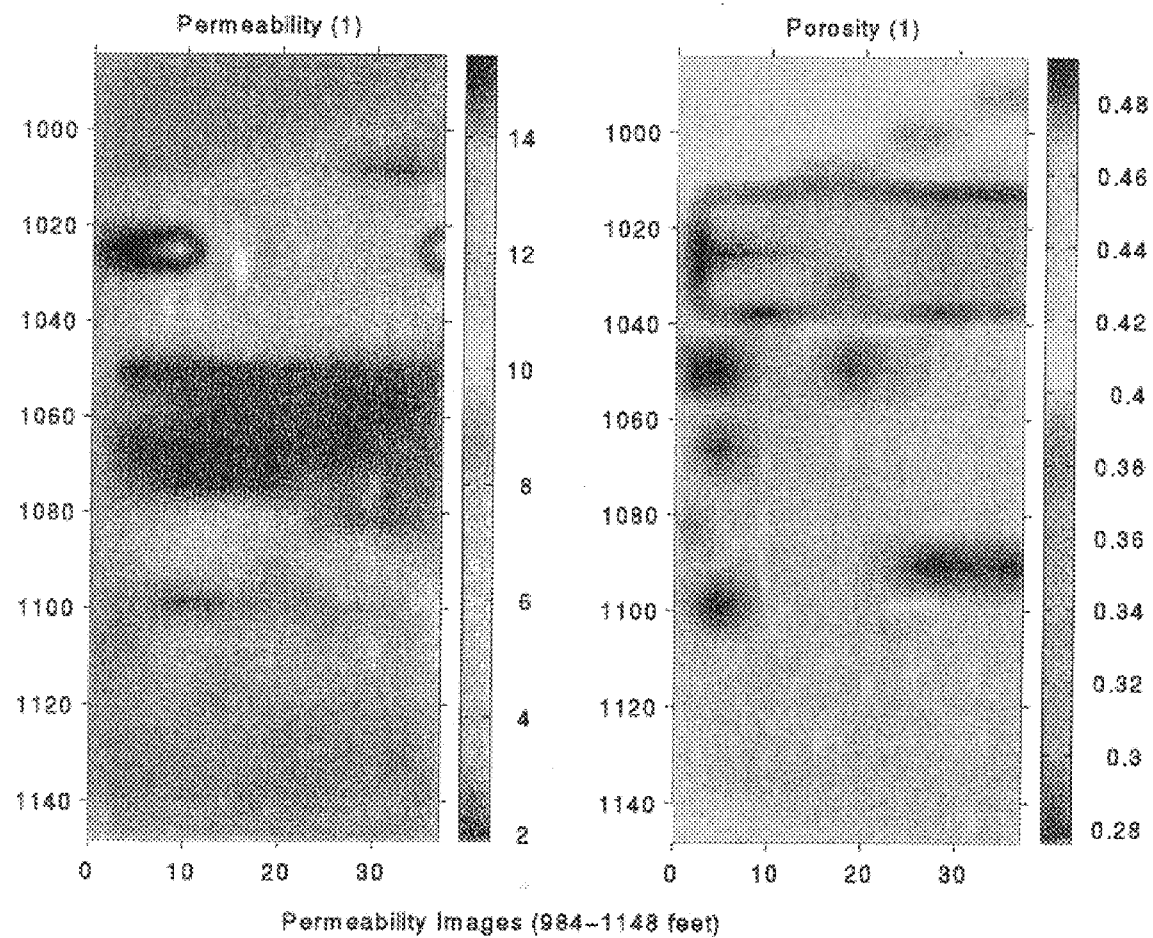
FIGS. 7($a$)–($f$) are graphs showing the first solution pair of the PRBS Cross-Well Tomography Test of the present invention.
Figure 7B:
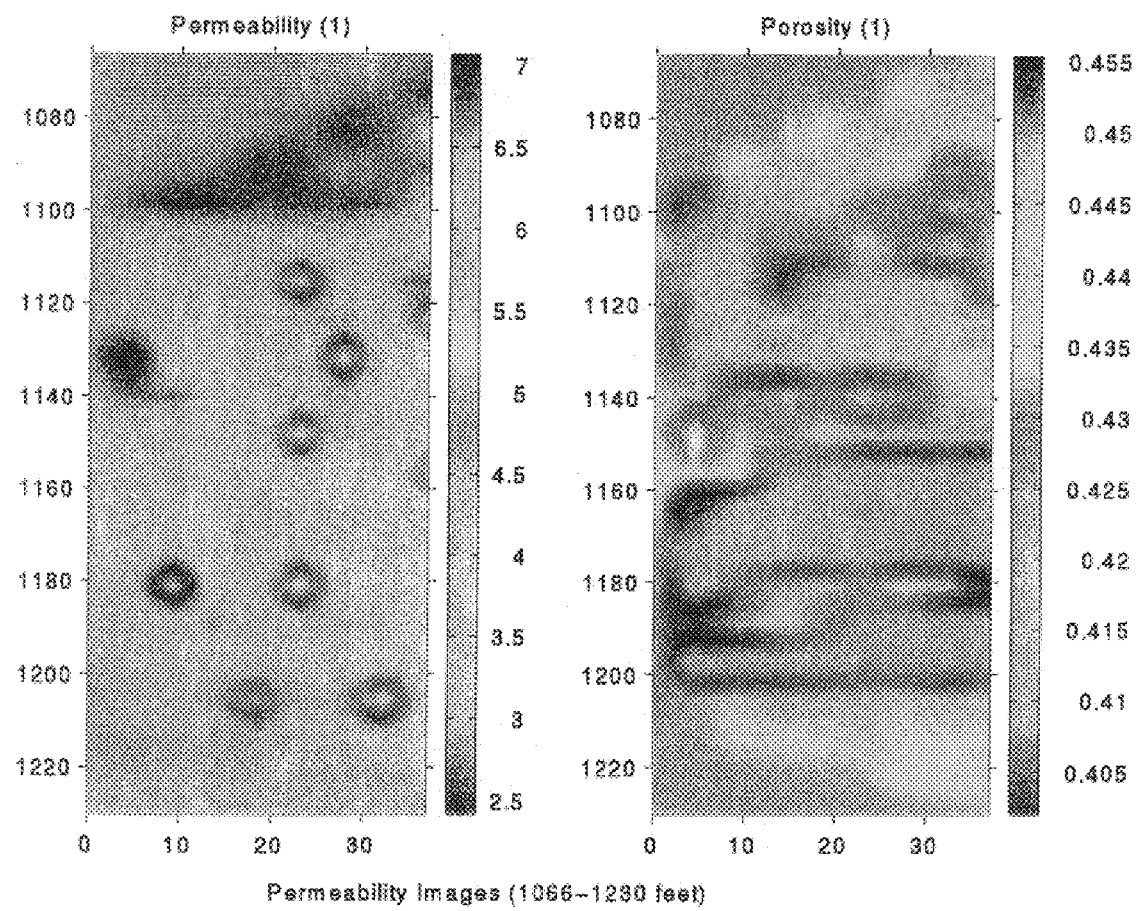
Figure 7C:
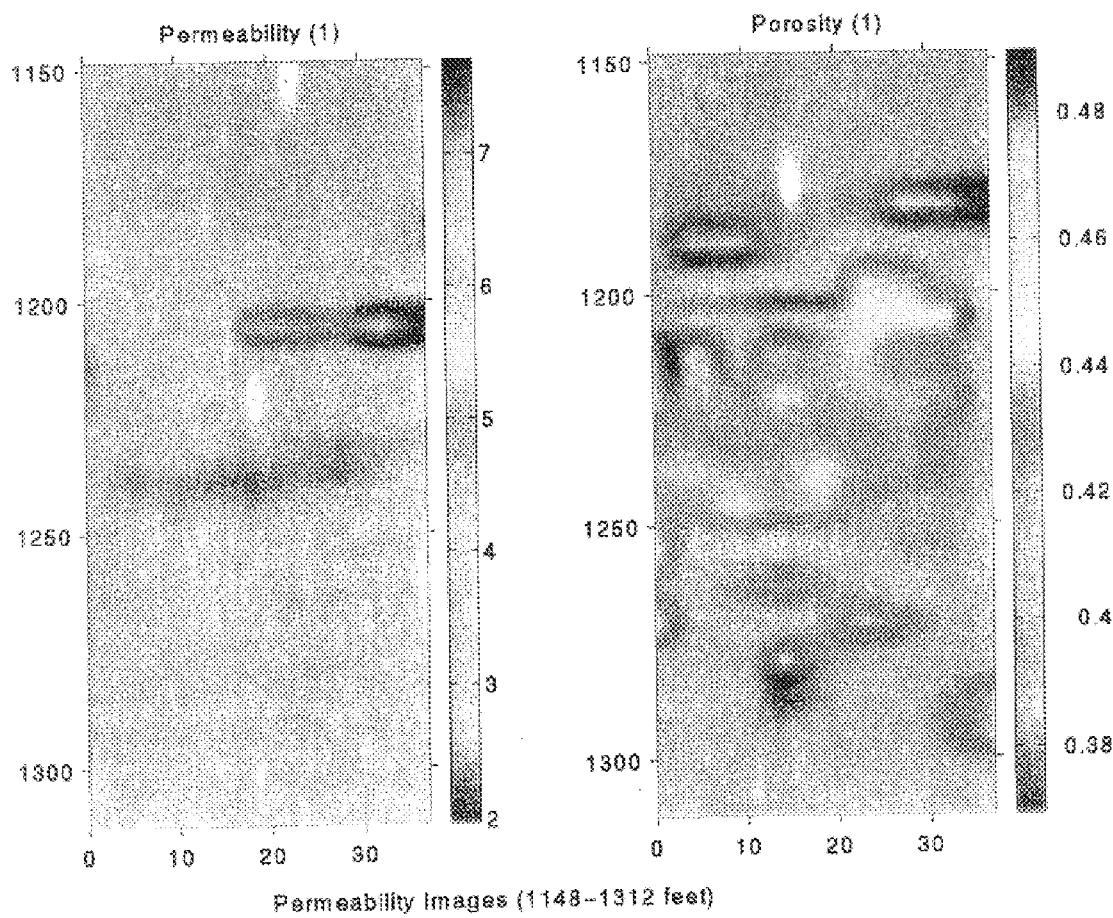
Figure 7D:
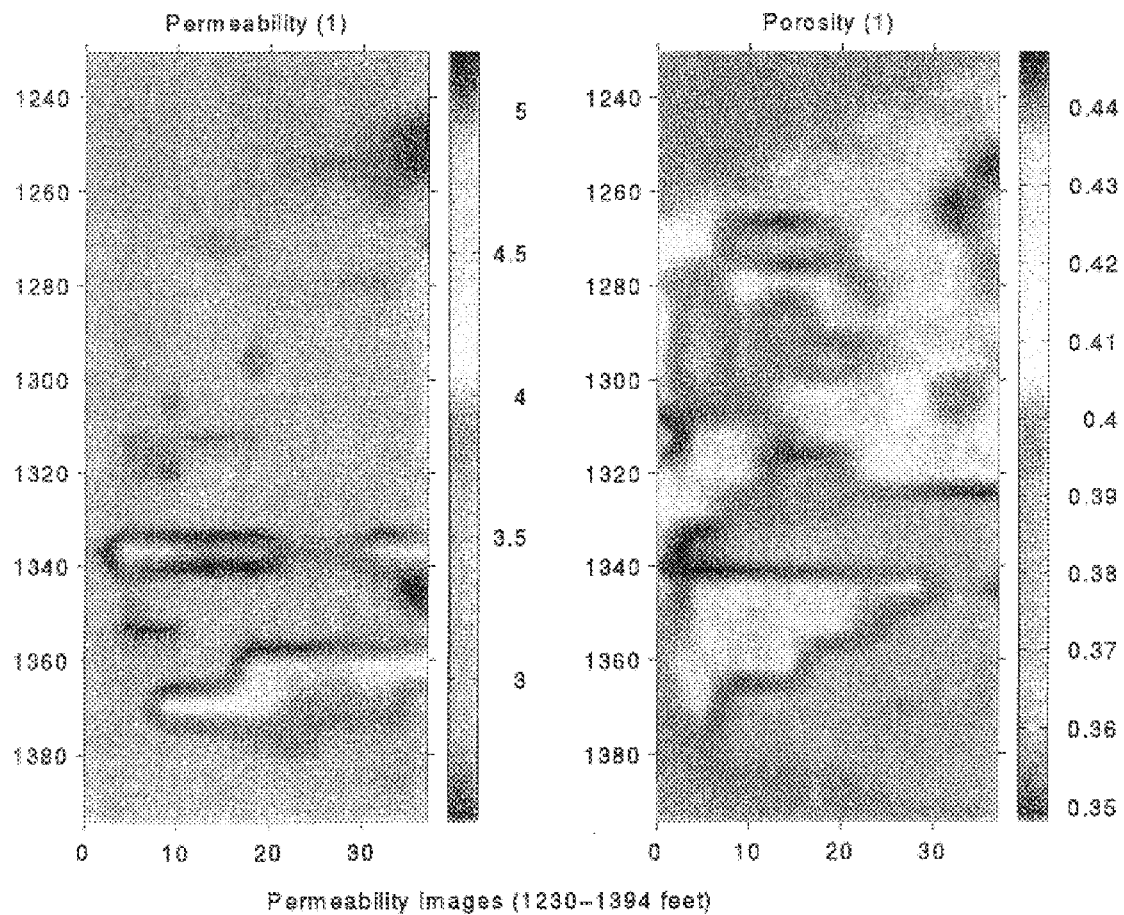
Figure 7E:
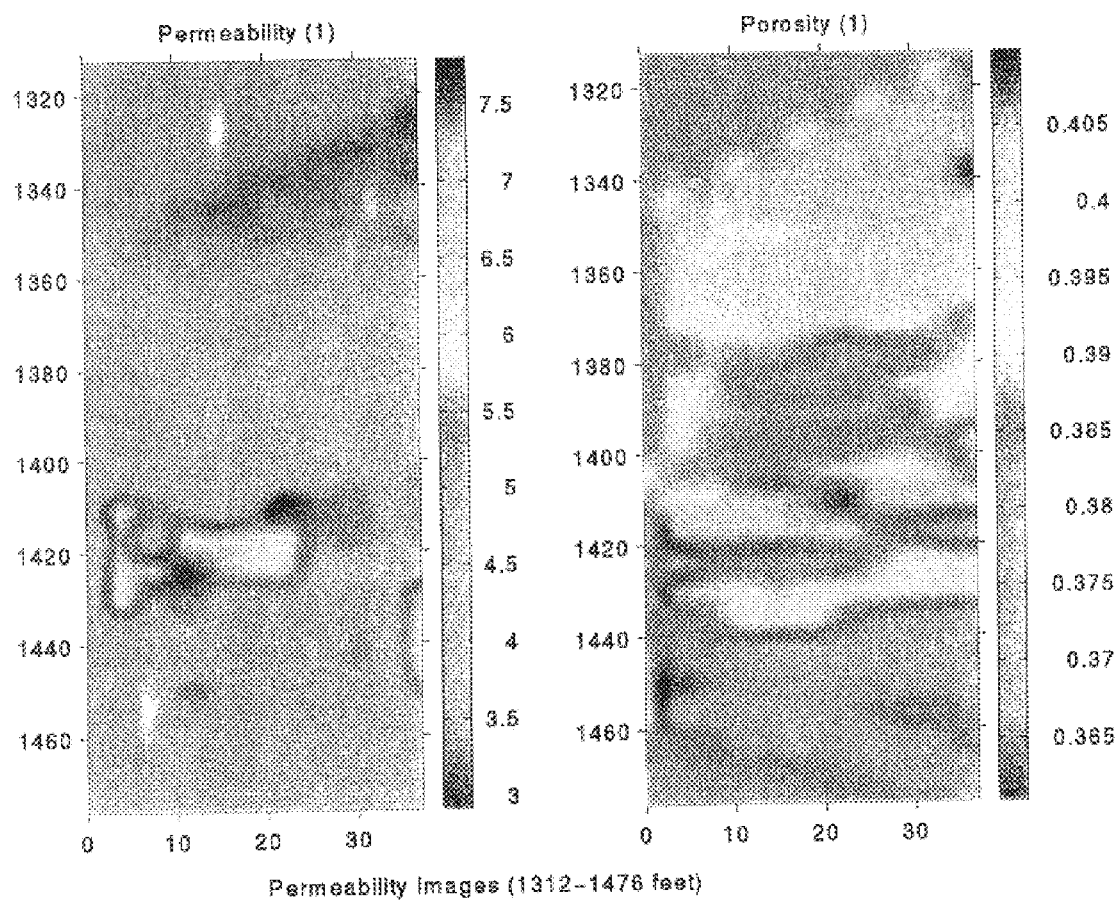
Figure 7F:
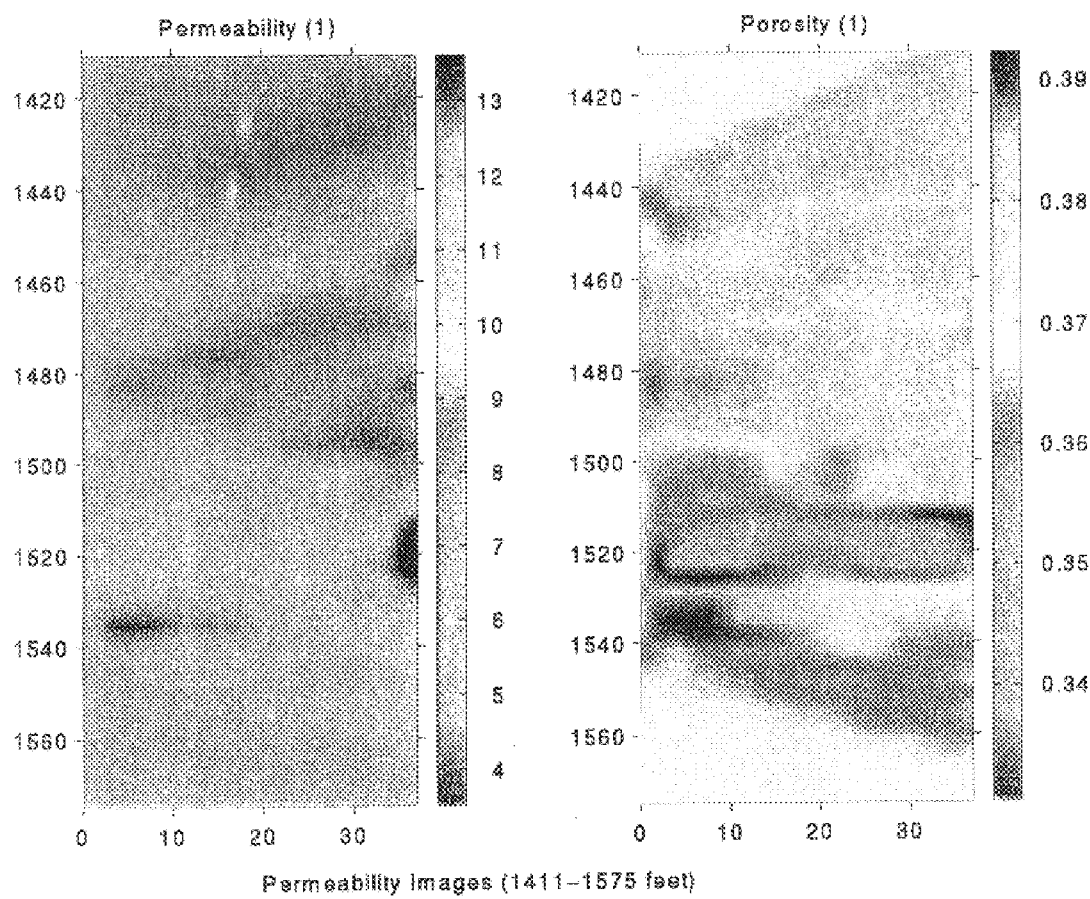
Figure 7G:
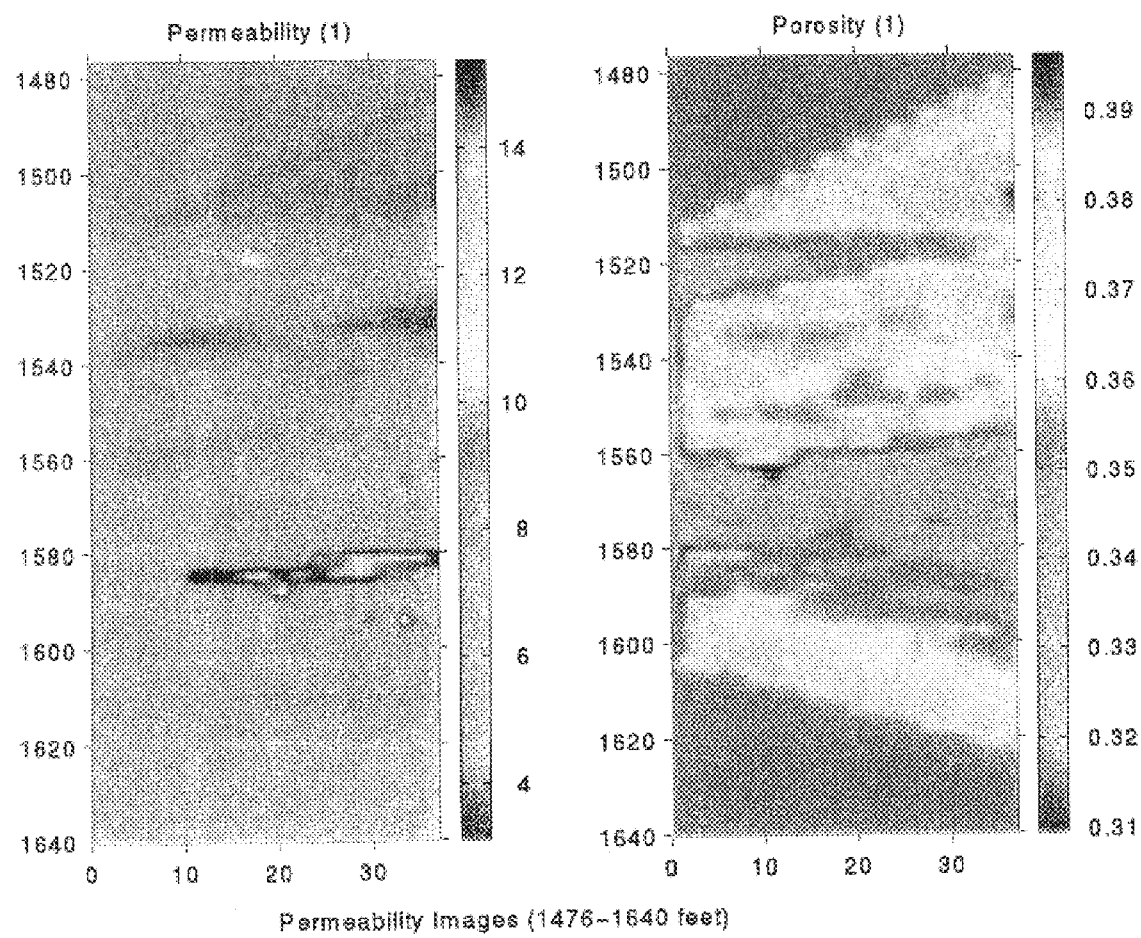
Figure 8A:
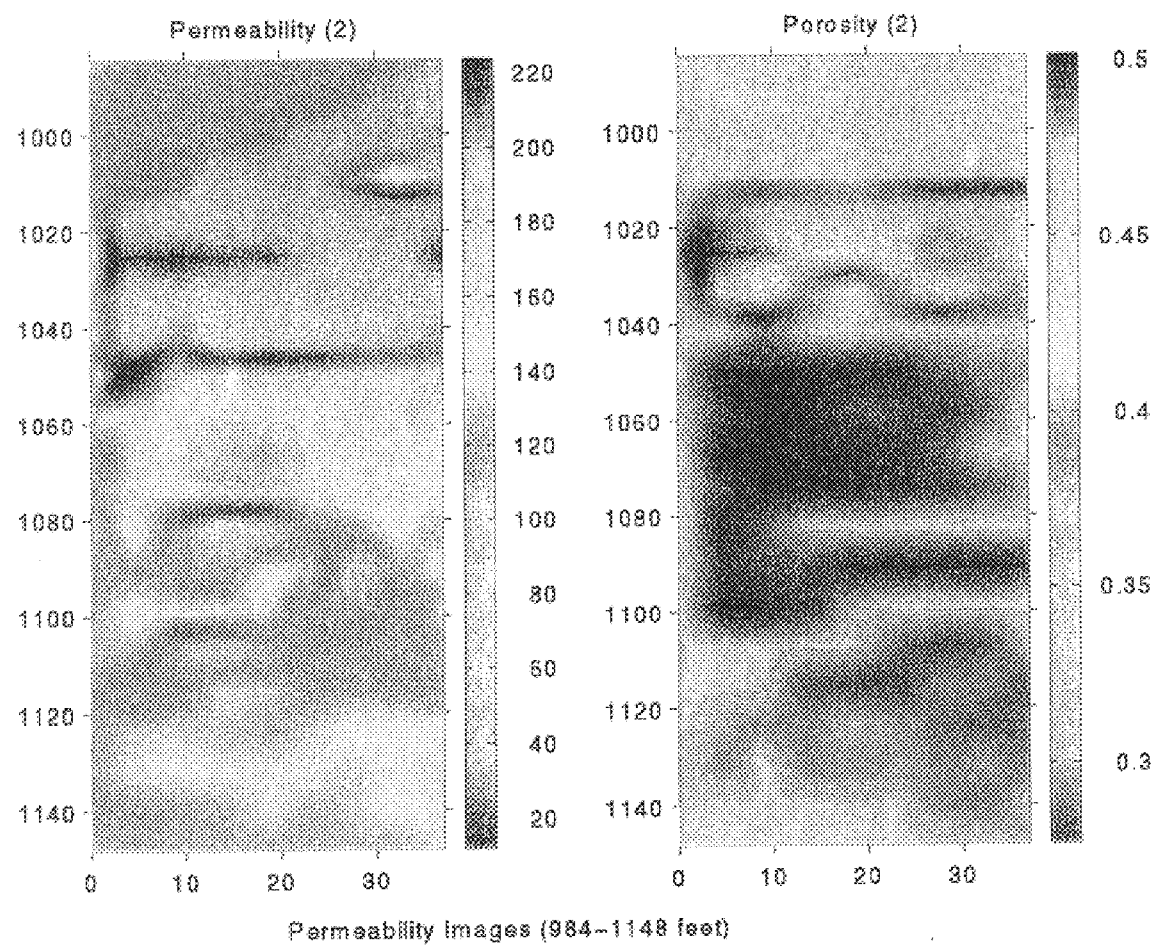
FIGS. 8(a)–(g) are graphs showing the second solution pair of the PRBS Cross-Well Tomography Test of the present invention.
Figure 8B:
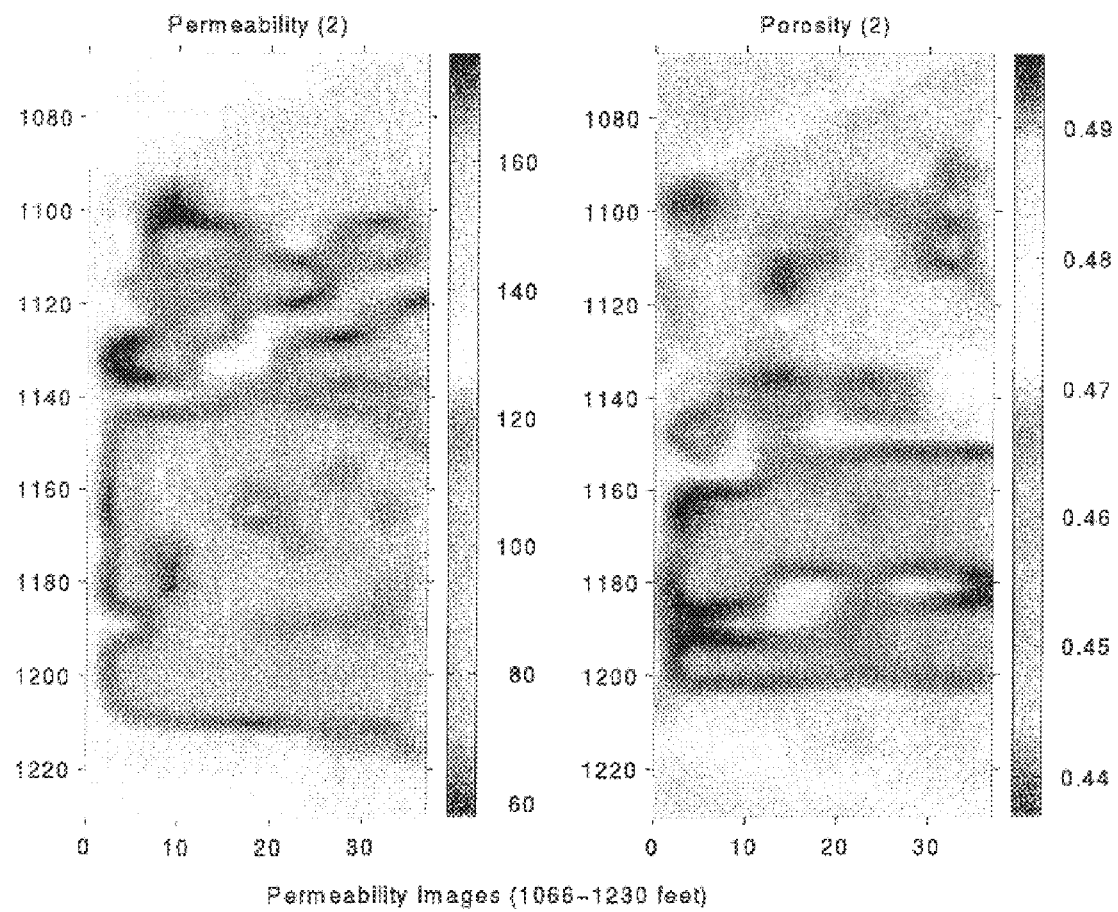
Figure 8C:
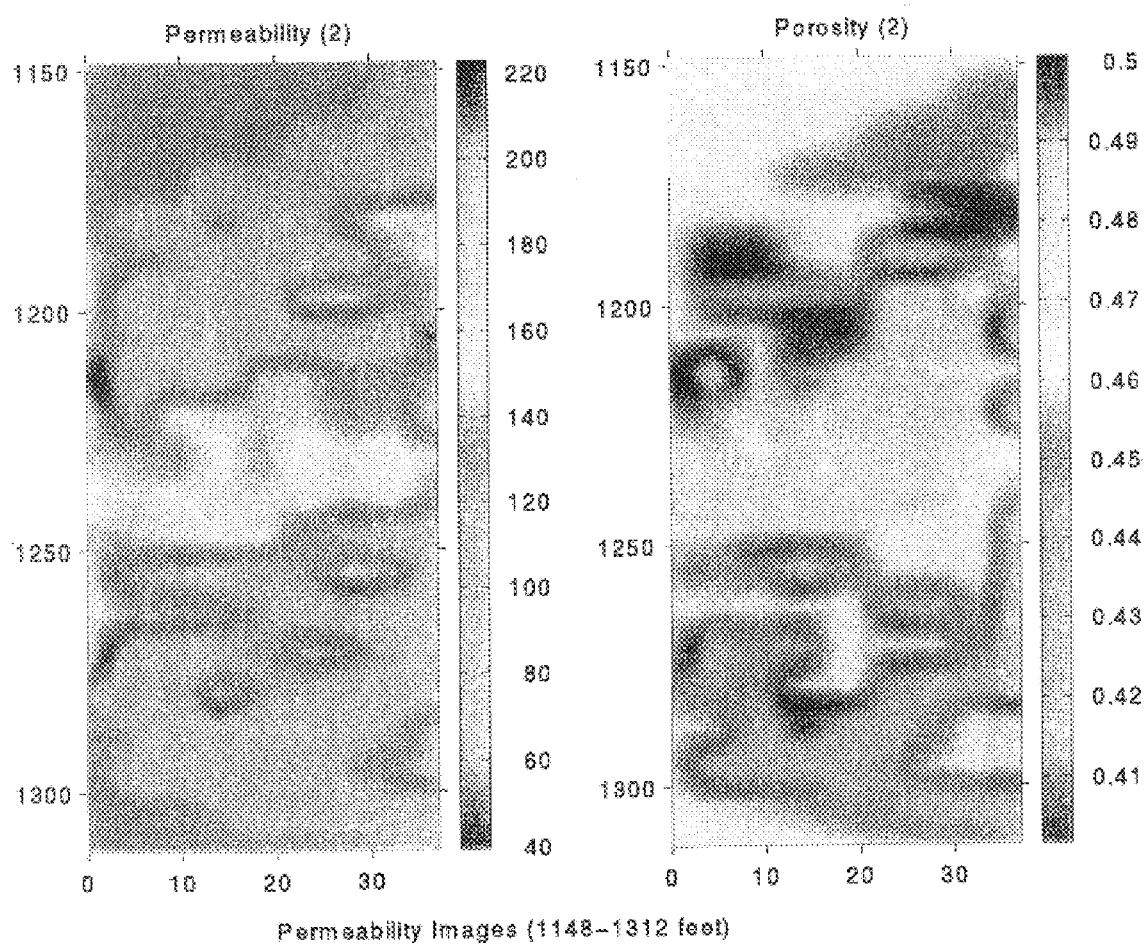
Figure 8D:
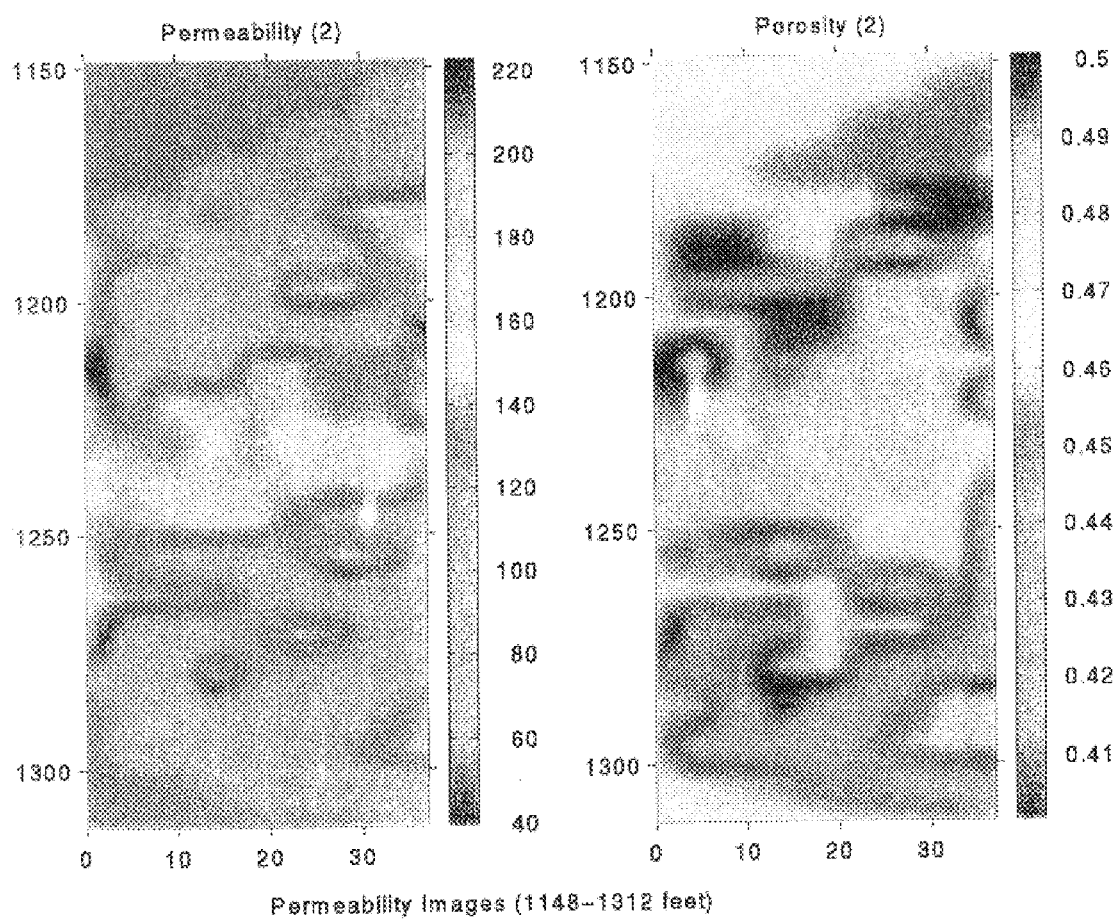
Figure 8E:
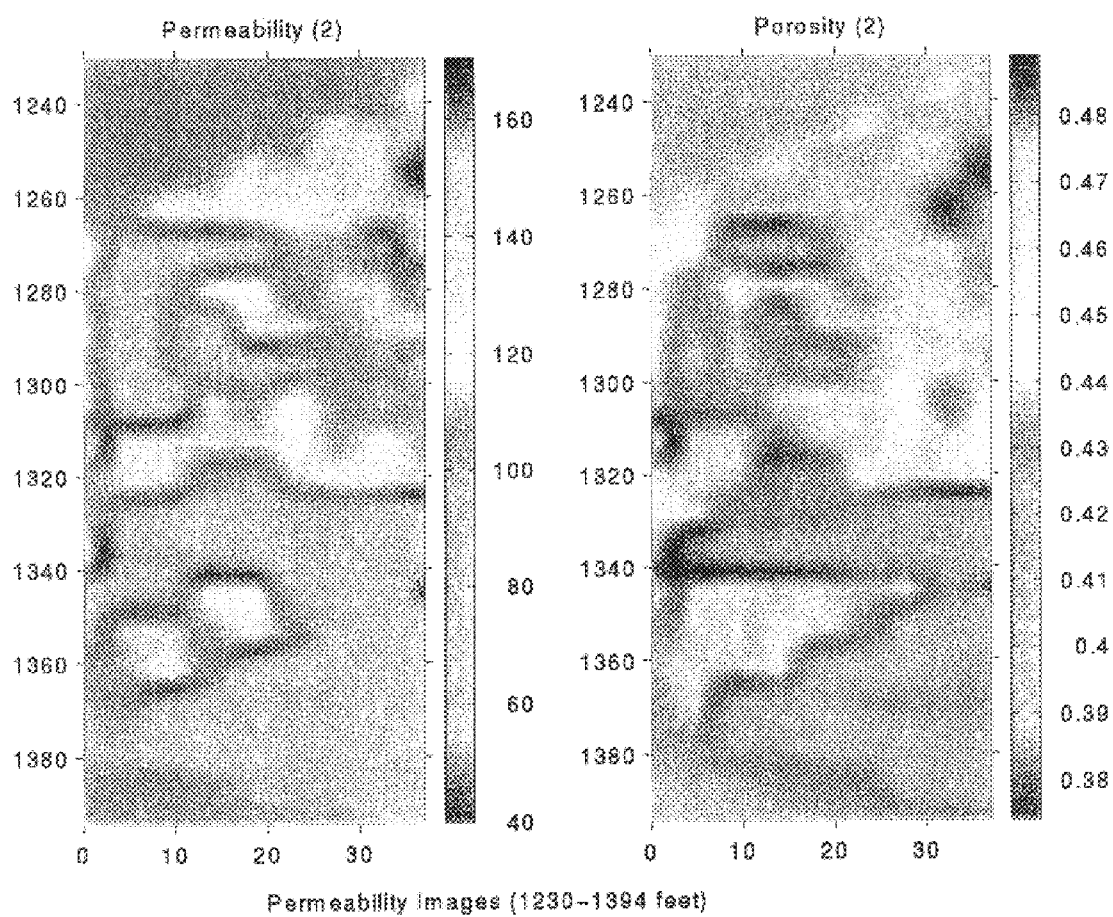
Figure 8F:
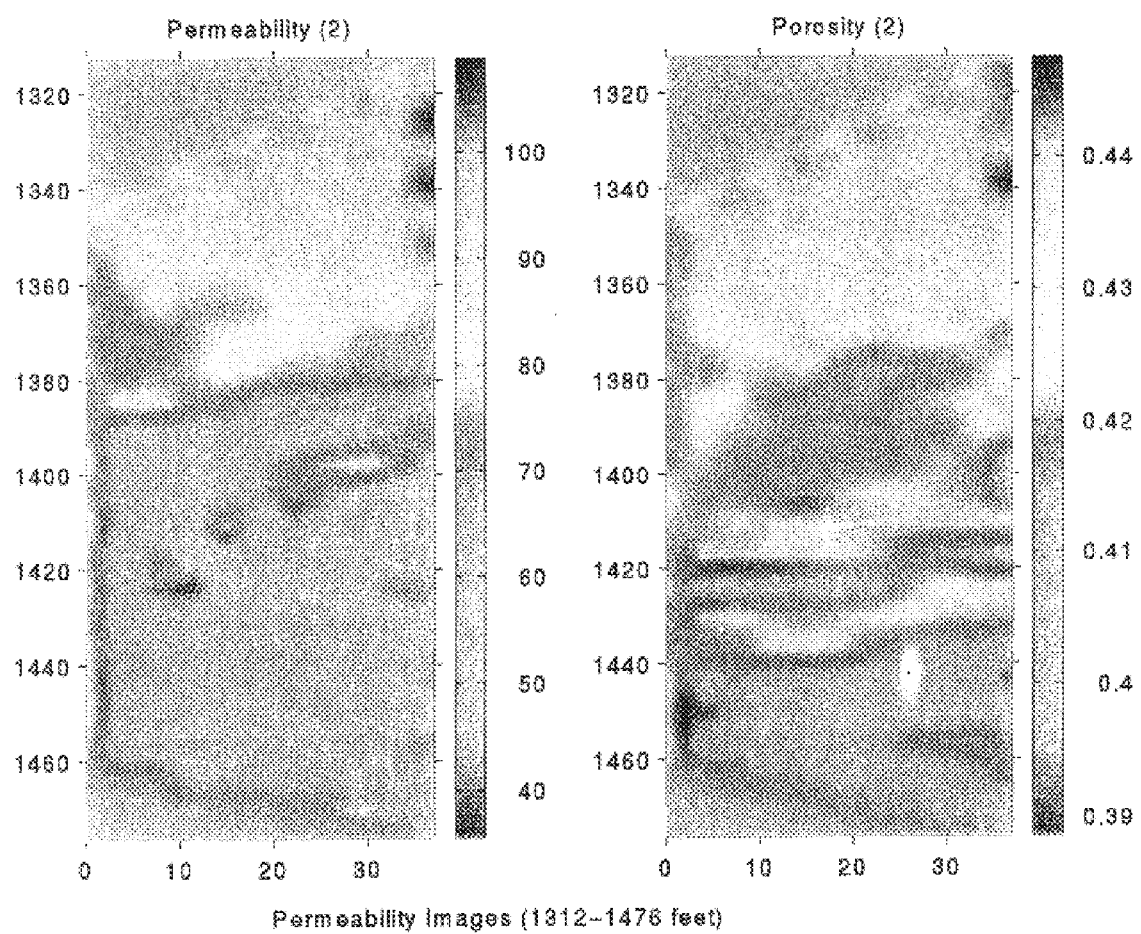
Figure 8G:
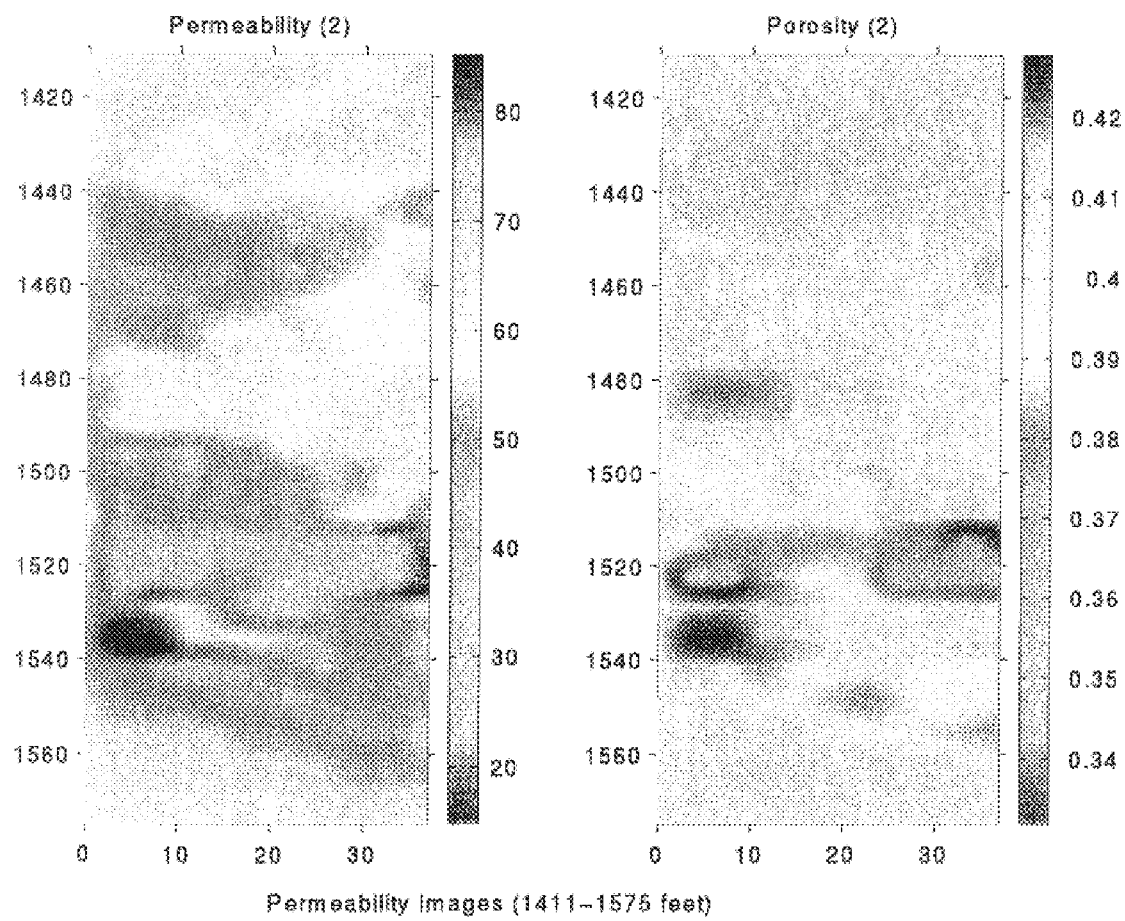
Figure 8H:
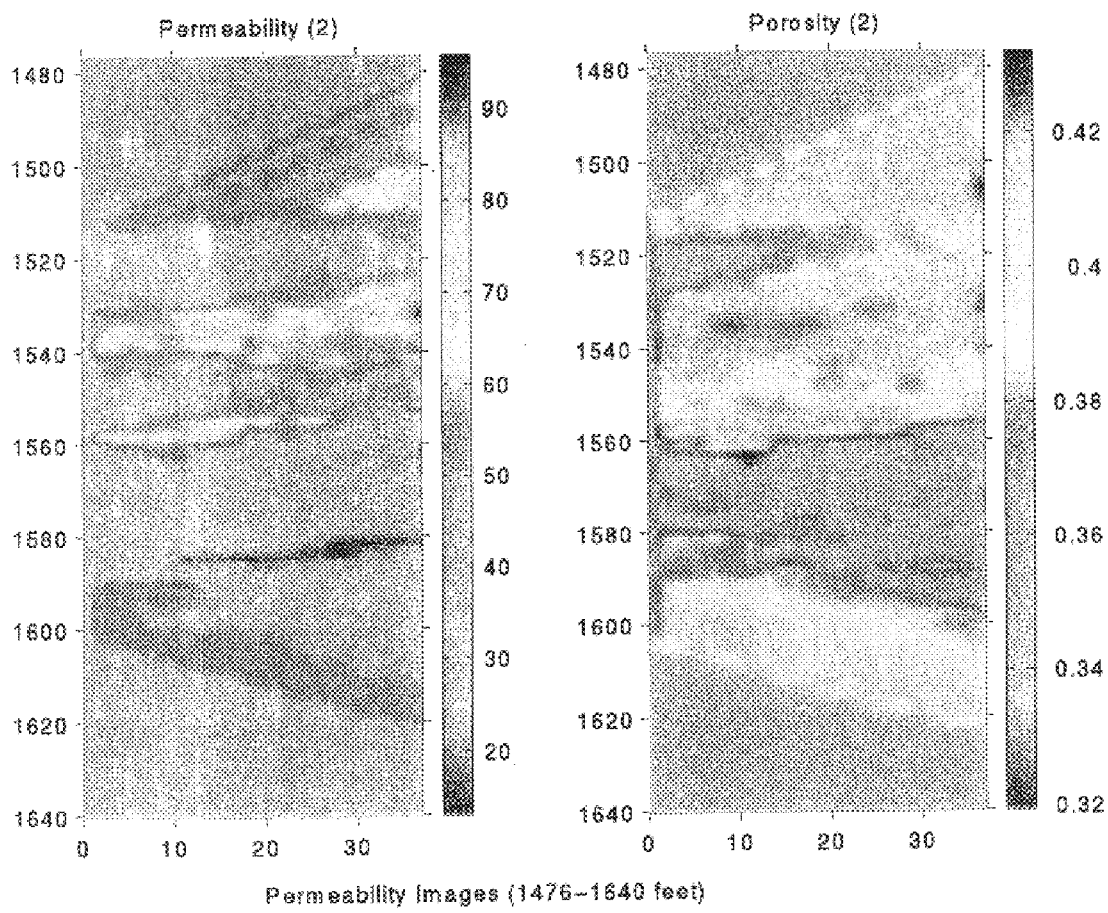

The PRBS signal data received by multi-channel hydrophone array 12 and stored by computer 1 were inverted for velocity end attenuation images in accordance with the inversion manipulation of the invention. In this regard, only the first arrival wave energy was used in the inversion. An example wave field measured by multi-channel hydrophone array 12 for a given source is shown in FIG. 5.

The quality of the data received was excellent. All of the attempted source-receiver ray paths were used in the version. Since it is very unusual to be able to use 100% of the measured ray paths (50% usage is considered very good), a high confidence level can be associated with the inverted images from this test.

The permeability imaging of the present invention was performed for a deep limestone layer having a depth between 1000 and 1600 feet using all of the source-receiver ray paths taken at the 4 kHz frequency. The resulting pair of velocity and attenuation images for the cross section between two wells, 33 feet wide at depths of 1000–1600 feet is shown in FIGS. 6(a)–(i). The damped least squares method disclosed in Bregman, N. D., Bailey, R. C., and Chapman, C. H., "Crosshole Seismic Tomography," Geophysics, 54(2), 200–215, 1989, and Bregman, N. D., Chapman, C. H., and Bailey, R. C., "Travel Time and Amplitude Analysis in Seismic Tomography," J. Geoph. Res., 94(6), 7577–7587, 1989, the contents of which are hereby incorporated by reference herein, was used for the inversions. The entire depth sections were imaged in seven subsections, each approximately 150 feet high. Due to the ray paths used in the inversion calculations, the top and bottom of each subsection, about 30 feet deep, have triangle-shaped shadows. These shadow areas can be ignored, however.

The cross section between depths 1500 and 1600 feet had a spatial resolution of 1.5 feet, while the rest of the cross section (between 1500 feet and 1000 feet) had a spatial resolution of 60—corresponding to the source and hydrophone spacing used during the test.

Next, the measured pair of velocity-attenuation images shown in FIGS. 6(a)–(i) were transformed into a pair of permeability-porosity images. The Biot theory universal geoacoustic model described above for the limestone model was used for this transformation. The two possible solution image pairs of this transformation are shown in FIGS. 7(a)–(f) and 8(a)–(g). These figures are made up of seven subsections to cover the entire depth interval from 1000 to 1600 feet. The differences between the $\phi_1$ and $\phi_2$ images is small, ranging from 0.30 to 0.48 as compared to 0.30 to 0.50. The difference between the $k_1$, and $k_2$ images are, however, quite large: ranging from 2 to 14 darcys (1 darcy=$10^{-12}$ m$^2$) and $k_2$ ranging from 10 to 200 darcys.

Acoustical determination tests were then conducted to select the correct image pair from these transformations. At 20 depths within the interval 1000 feet to 1600 feet, cross-well transmission of PRBS pulses were made at 1, 2, 4, 8 and 12 kHz, as noted above. All of the multiple frequency data clearly indicated that the larger of the two permeability image pairs is the correct one. Thus, the image pair shown in FIG. 8 was determined to be the correct one for this case.

Figure 9A:
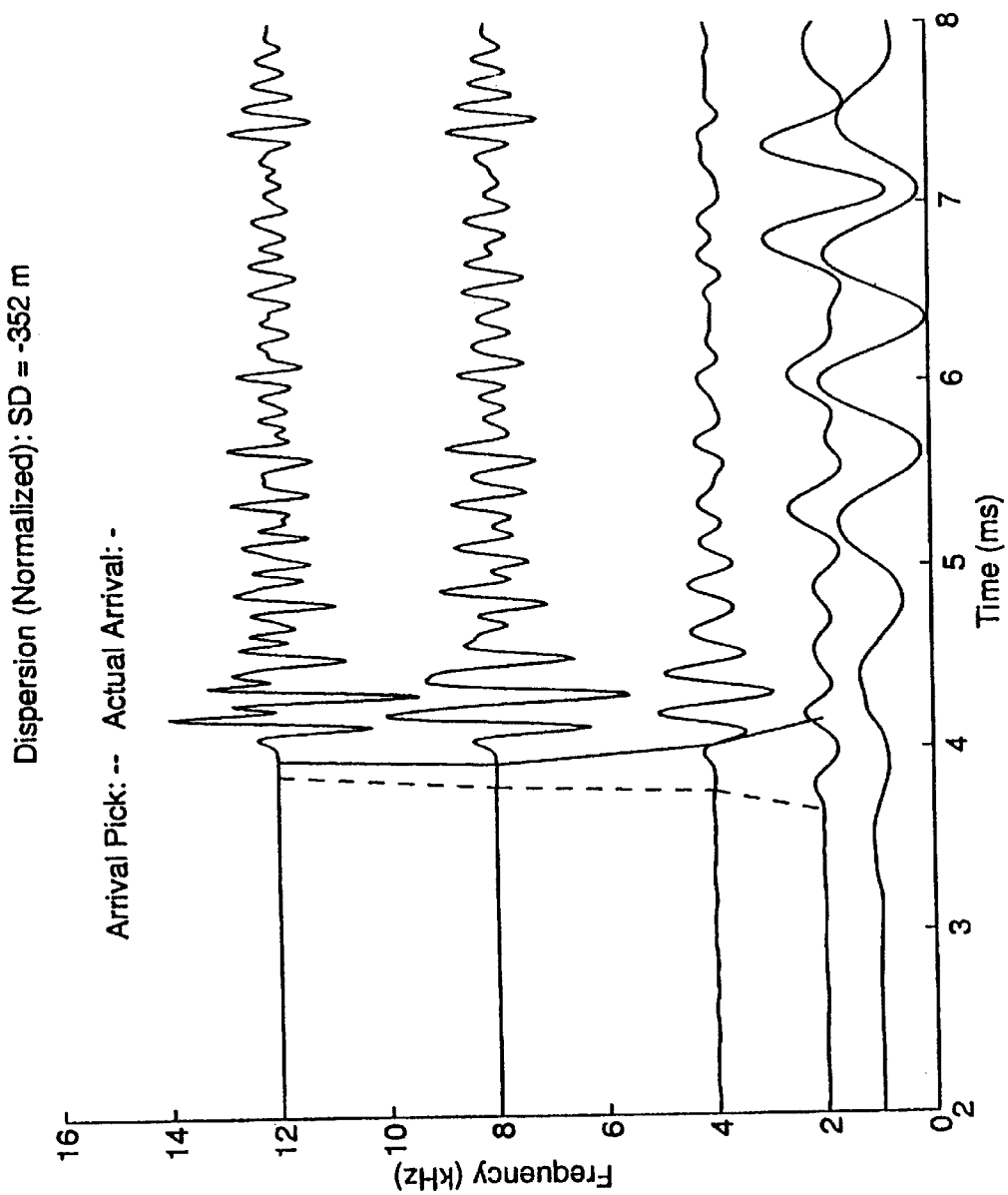
FIGS. 9(a)–(b) are graphs showing the dispersion of an acoustical signal at different frequencies during the PRBS Cross-Well Tomography Test of the present invention.
Figure 9B:
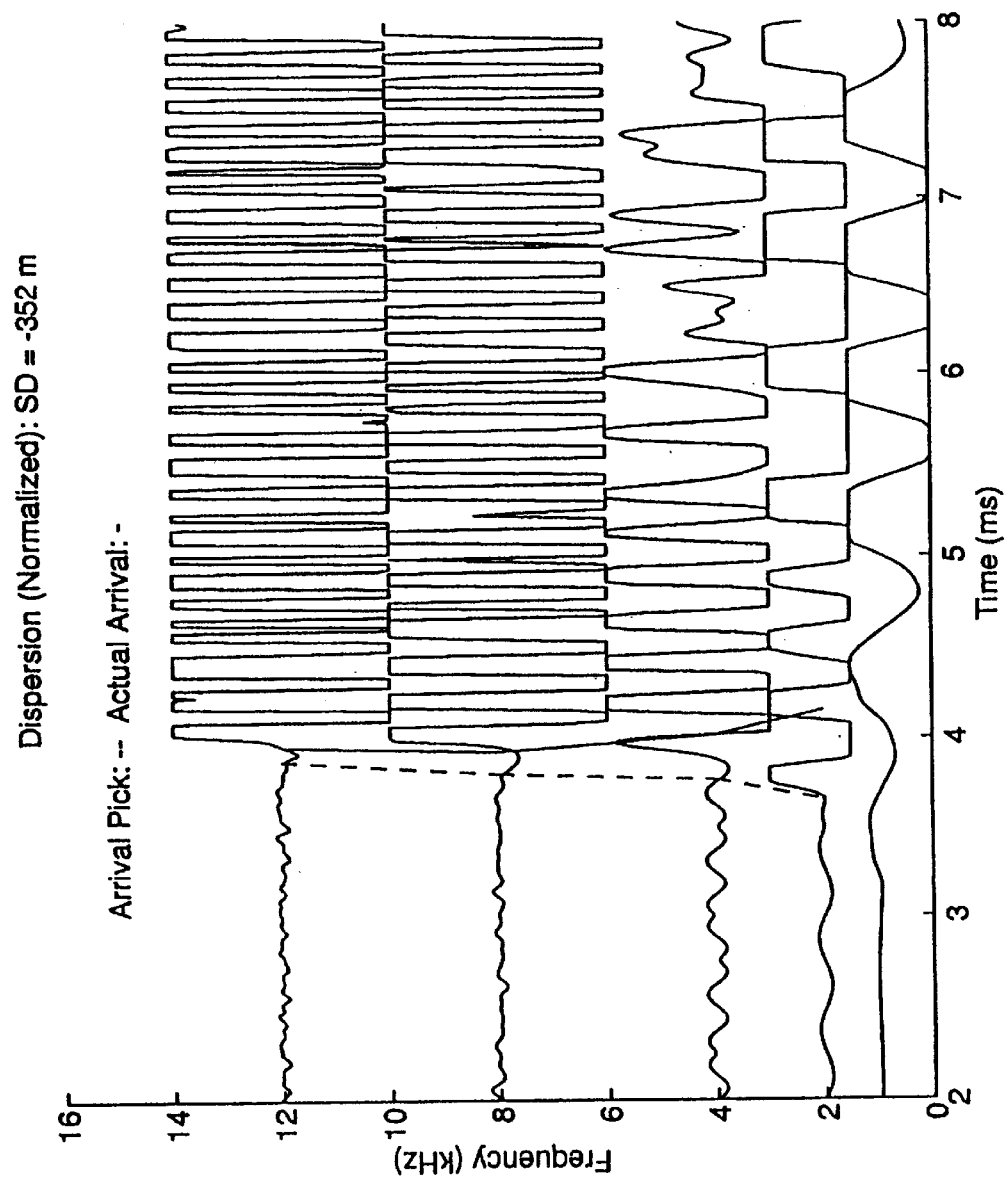

This was verified in the following matter. At depths z=1154 feet, the V and 1/Q data at PRBS frequencies 1, 2, 4, 8, and 12 kHz are: V=[2.862e+003, 2.88e+003 2.814e+003, 2.71e+003] m/s, and 1/Q=[1.33e−002, 2.394e−002, 4.05e−002, 6.47e−002]. The 1 kHz data were ignored because they were influenced by the near field effect, i.e., the wavelength of 3–4 m is not considered small compared to the source-receiver distance of 11 m. These data were extracted from the measured permeability as shown in FIGS. 9(a) and (b), which show a clear dispersion. The broken lines in the figures show the first breaks of the correlated PRBS time data and the solid lines show the actual first arrival time, which is 1/f later than the first break by definition.

Figure 10:
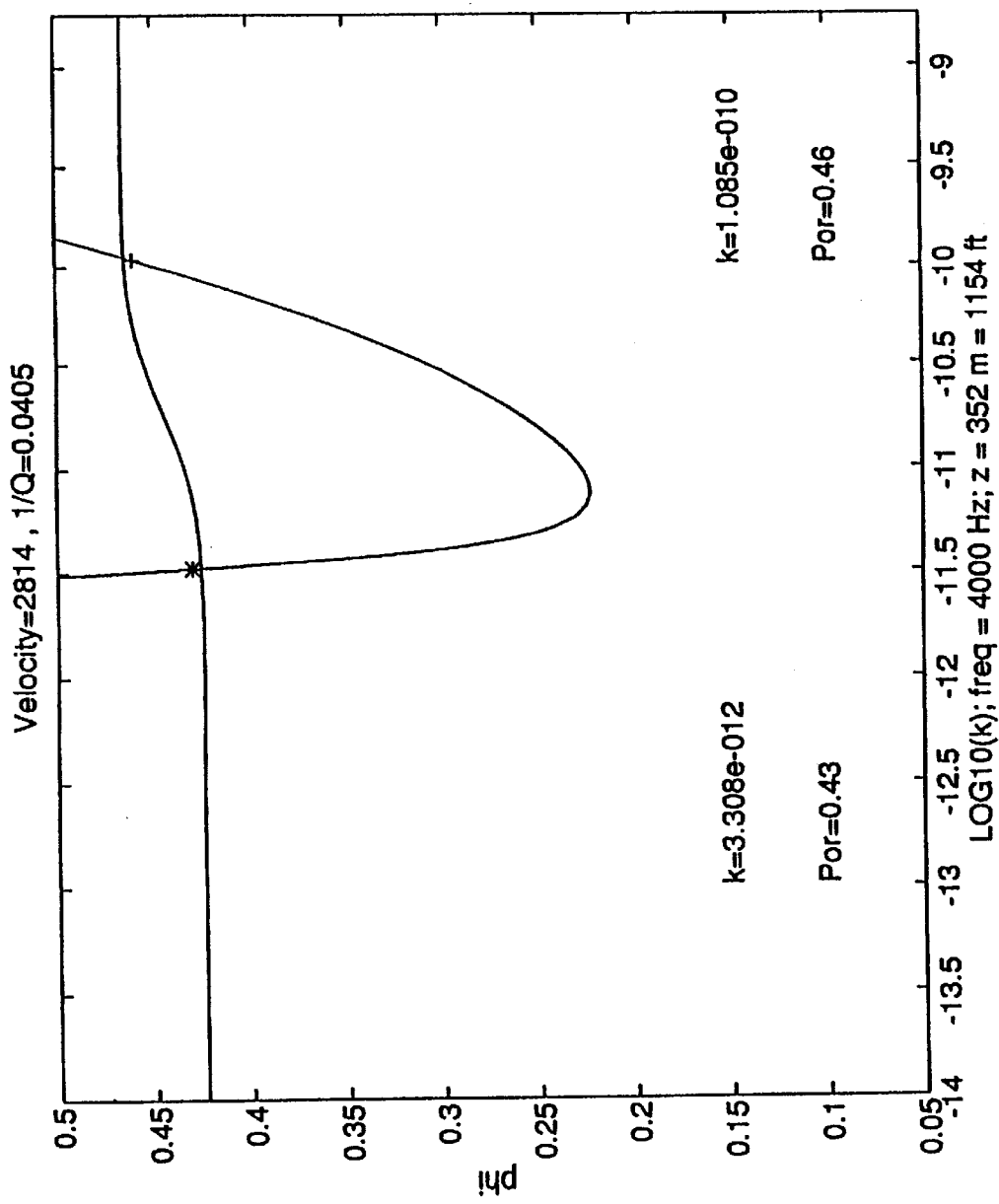
FIG. 10 is a graph showing velocity and attenuation solutions at a signal frequency of 4 kHz for the PRBS Cross-Well Tomography Test of the present invention.
Figure 11:
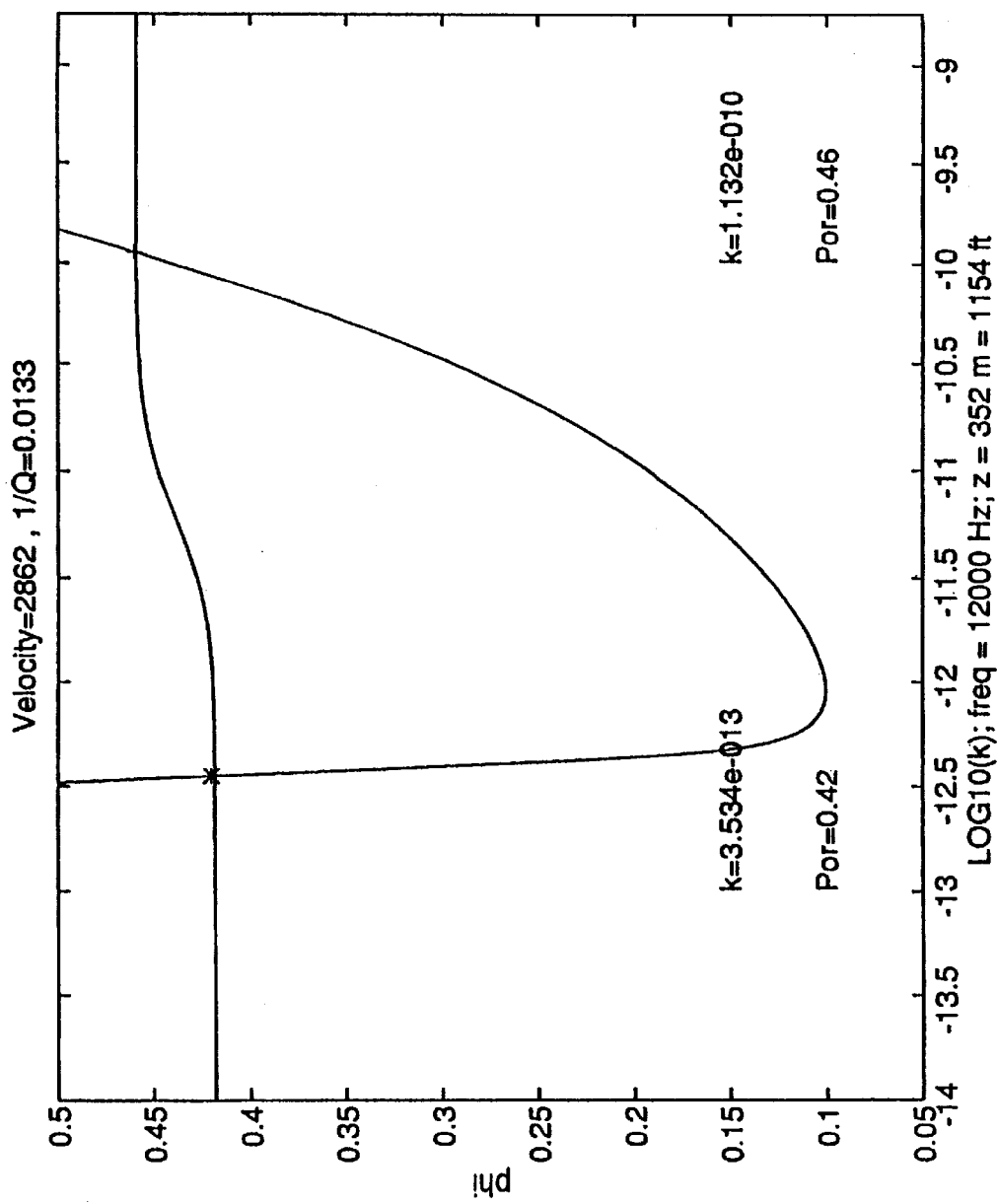
FIG. 11 is a graph showing velocity and attenuation solutions at a signal frequency of 12 kHz for the PRBS Cross-Well Tomography Test of the present invention.

From the 4 kHz data, the limestone model predicts the two possible [k, $\phi$] solutions, which are shown in FIG. 10. On the other hand, the 12 kHz data predicts the two possible [k, $\phi$] solutions shown in FIG. 11. Comparing the 4 kHz and 12 kHz solutions shows that the [$k_2$, $\phi_2$] solutions coincide with each other, within the small level of error introduced by acoustic measuring devices. In sharp contrast, the other solution pairs are more than one order of magnitude different from each other.

This verifies that the second pair of the 4 kHz solution [$k_2$, $\phi_2$] is the correct permeability and porosity at this depth. These values agree well with the permeability image and porosity images in FIGS. 8(a)–(g) at a depth of 1154 feet.

These results were even further verified by conducting pumping tests, Packer tests, and through comparison with the down-hole porosity logs, discussed below.

Pumping Test Verification

Figure 12:
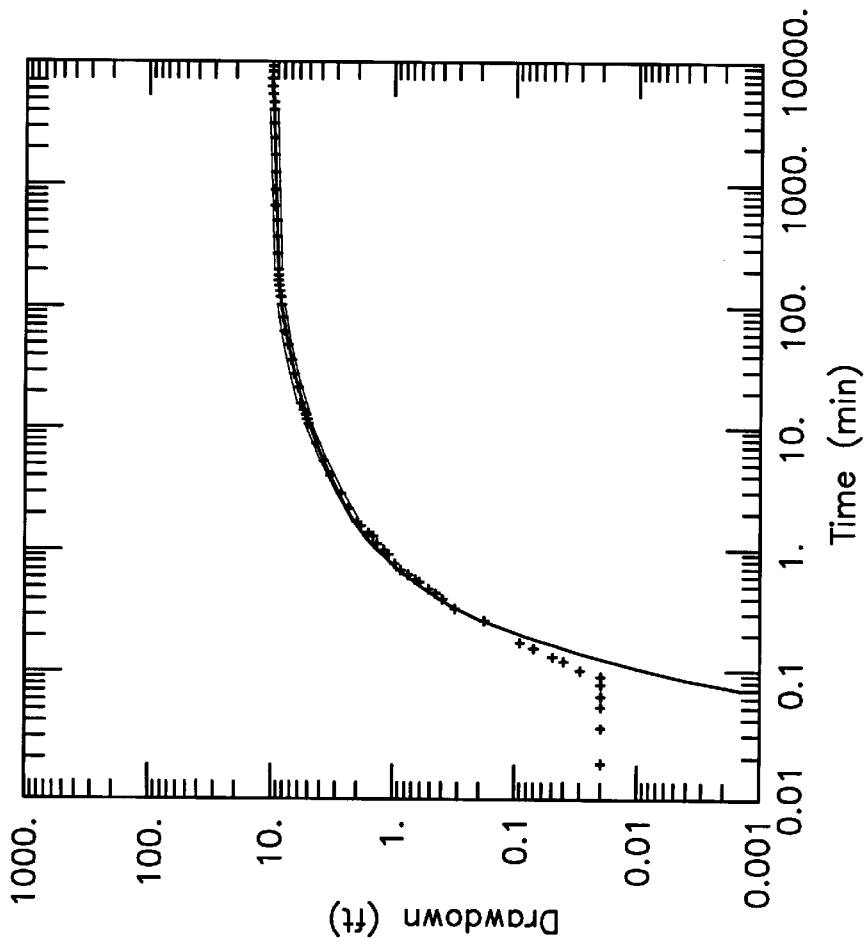
FIG. 12 is a graph showing pumping test data for verification of the PRBS Cross-Well Tomography Test of the present invention.

The pumping test is considered the most accurate method to measure the permeability of a sediment layer. Well BF-5 was used to pump out water at a constant rate from either of the two at intervals at a time for about a week while making water level observation at well BF-4. The pumping test data for the lower test interval located at depths 1500 to 1600 feet is shown in FIG. 12.

Figure 13:
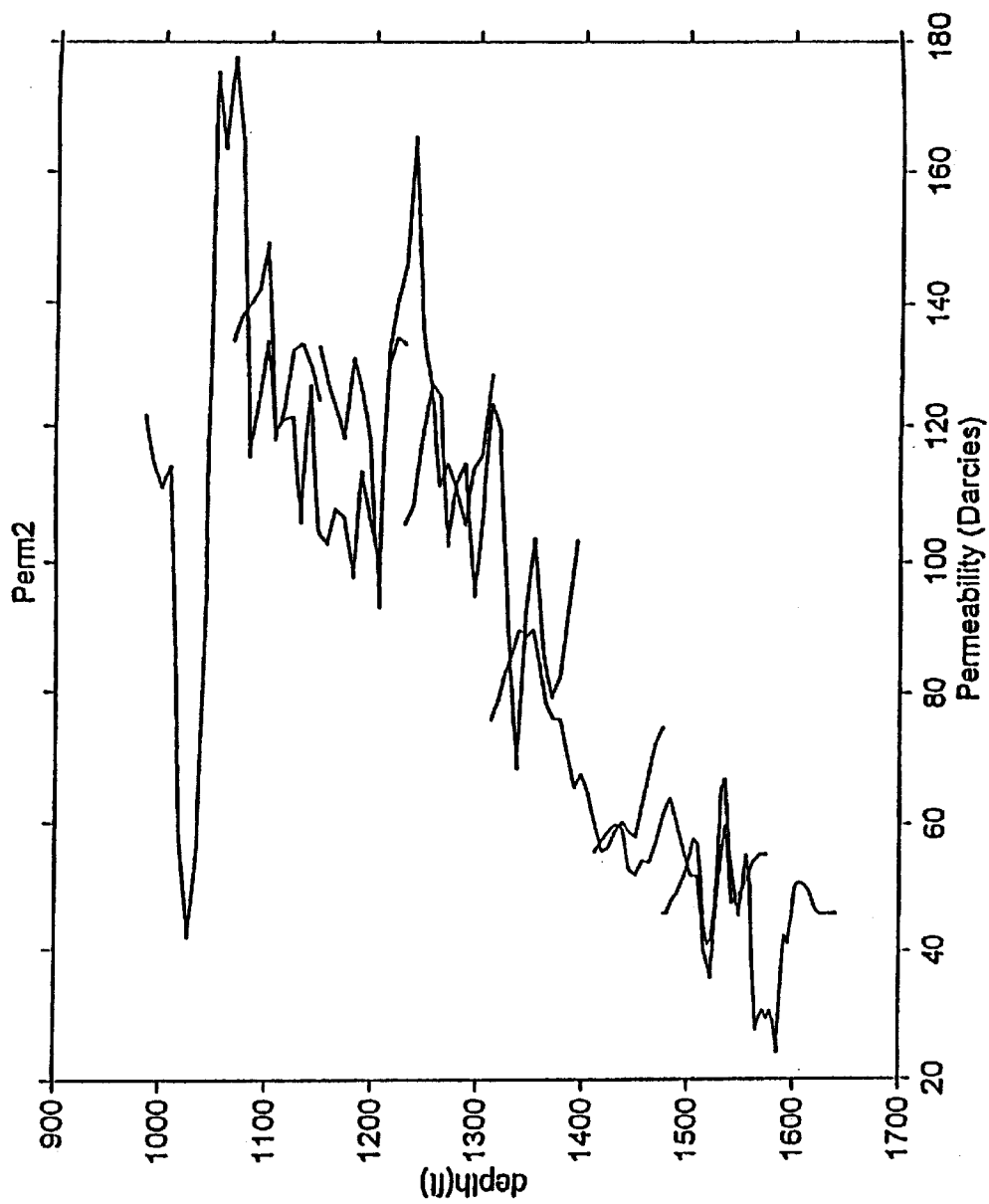
FIG. 13 is a graph showing the horizontally averaged permeability vs. depth calculated from the permeability image of the PRBS Cross-Well Tomography Test of the present invention.

The intrinsic permeability averaged over this depth interval is 33.2 darcys. Similarly, the pumping test made at the upper test layer at depth 1100 to 1168 feet measured the average permeability of 89.0 darcys. The permeability image obtained in the matter of the present invention, shown in FIG. 8, agreed well with the two values of the average permeability measured by the pumping tests. Moreover, the permeability image shows significant heterogeneity both horizontally as well as vertically. The permeability varies for about 2 to 60 darcys in the lower pumping test layer (1500 to 1600 feet) and from about 5 to 150 darcys in upper pumping test layer (1100 to 1168 feet) according to the physically imaged permeability structure shown in FIG. 8. The horizontally averaged permeability vs. depth was calculated from this permeability image is shown in FIG. 13 to aid in the verification.

The acoustically obtained permeability profile shows that the permeability varies from 22 to 60 darcys with an average of about 35 darcys at the lower pumping test layer. The acoustically obtained permeability logs shows that the permeability varies from 90 to 140 darcys with mean of about 105 darcys. These acoustically measured permeability profiles are in excellent agreement with the permeability values measured by the pumping test, indicating that the system of the present invention which determines the permeability image using a single frequency is very accurate.

Packer Test Verification

Packer tests were conducted at six depth levels in well BF-5 when it was drilled and before the steel casing was put in place. Two of the six Packer depth levels, 1000 to 1031 feet and 1494 to 1540 feet are within the PRBS cross-well tomography cross-section, providing additional comparisons to make with the physical image permeability structure achieved in the manner of the present invention (shown in FIG. 8).

The sl-called "packer" test was conducted by measuring the permeability of a layer of sediment isolated in the borehole by an upper and a lower inflatable rubber packer. The flow rate of water pumped through the packer-isolated sediment in the well is measured while maintaining the pack pressure at a constant level. During this process it is assumed that the injected water flow is contained within the horizontal layer without any invasion of the upper and lower layers.

However, in reality, some of the injected water would normally penetrate through the upper and lower layer. Therefore, the packer test is used as only a tentative test to measure permeability. Nonetheless, the permeability values for the two depth intervals tested correlated closely with the acoustic permeability structure achieved in accordance with the present invention.

The packer test measured a permeability value of 36.3 darcys for the depth interval 1494 to 1540 feet, and a permeability value of 244 darcys from 1000 to 1031 feet. The acoustically measured permeability image of the present invention shows the permeability varies in the range of 20 to 180 darcys within this depth level, with an average of about 60 darcys. This is about a quarter of the packer test value of 244 darcys.

It is interesting to note, however, that just below the packer test layer is a layer (1030 to 1080 feet) of very permeable limestone having an average permeability of about 200 darcys in the acoustical measured permeability image of the invention. It is possible that the injected water could have invaded through the very permeable layer during the packer test, resulting in an erroneously large permeability value of 244 darcys at the test level.

Down-Hole Test Verification

Figure 14:
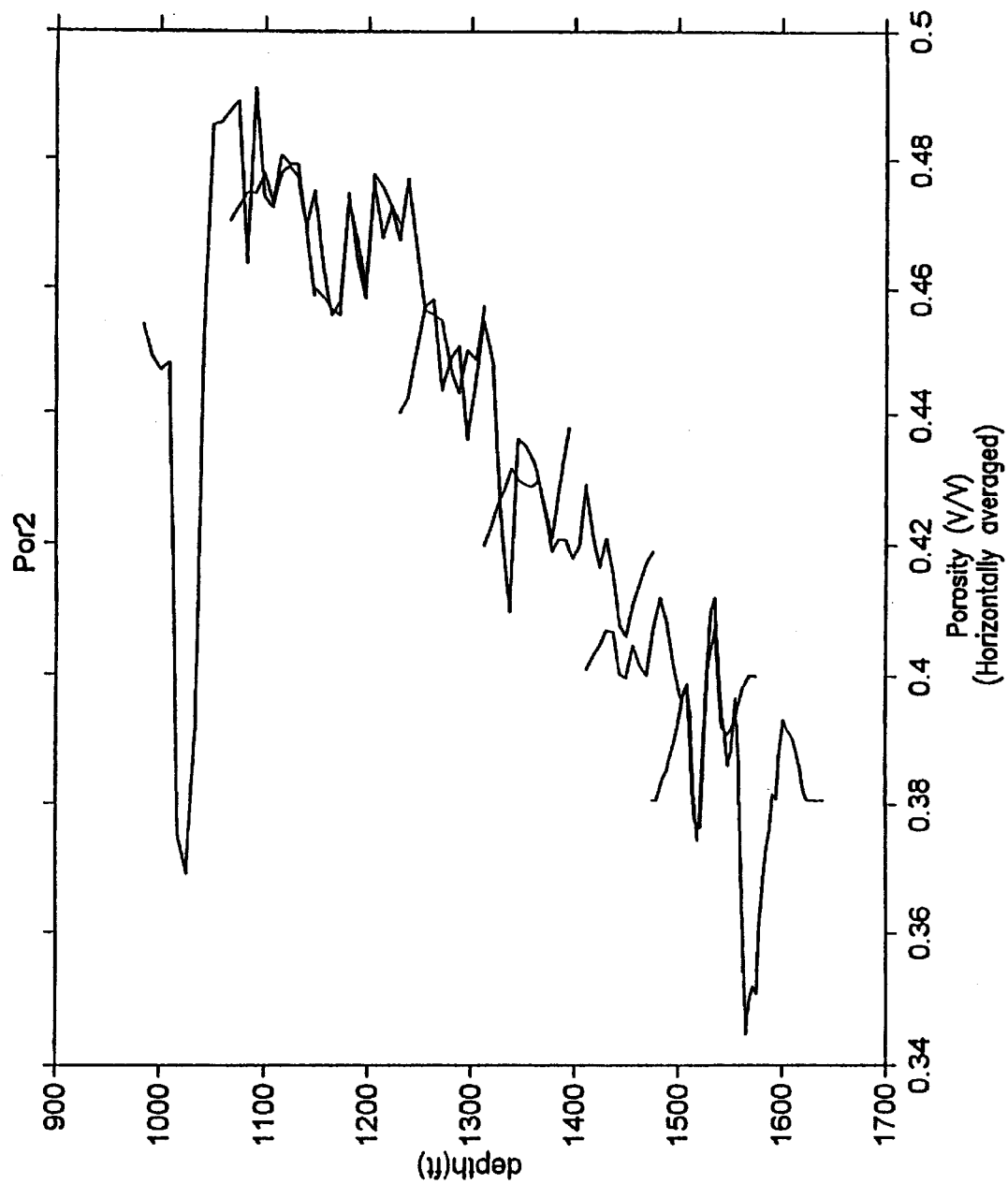
FIG. 14 is a graph showing the comparable horizontally averaged porosity vs. depth profile calculated from the porosity image of the PRBS Cross-Well Tomography Test of the present invention.

As previously noted, the method of the present invention provides a porosity image in addition to the permeability image. The horizontally averaged porosity vs. depth profile is shown in FIG. 14. The processing image shows strong heterogeneity horizontally and vertically, with the porosity value ranging from 0.32 to 0.50. The trend is that porosity decreases as the burial depth increases within the limestone formation for depths between 1000 to 1600 feet.

Figure 15:
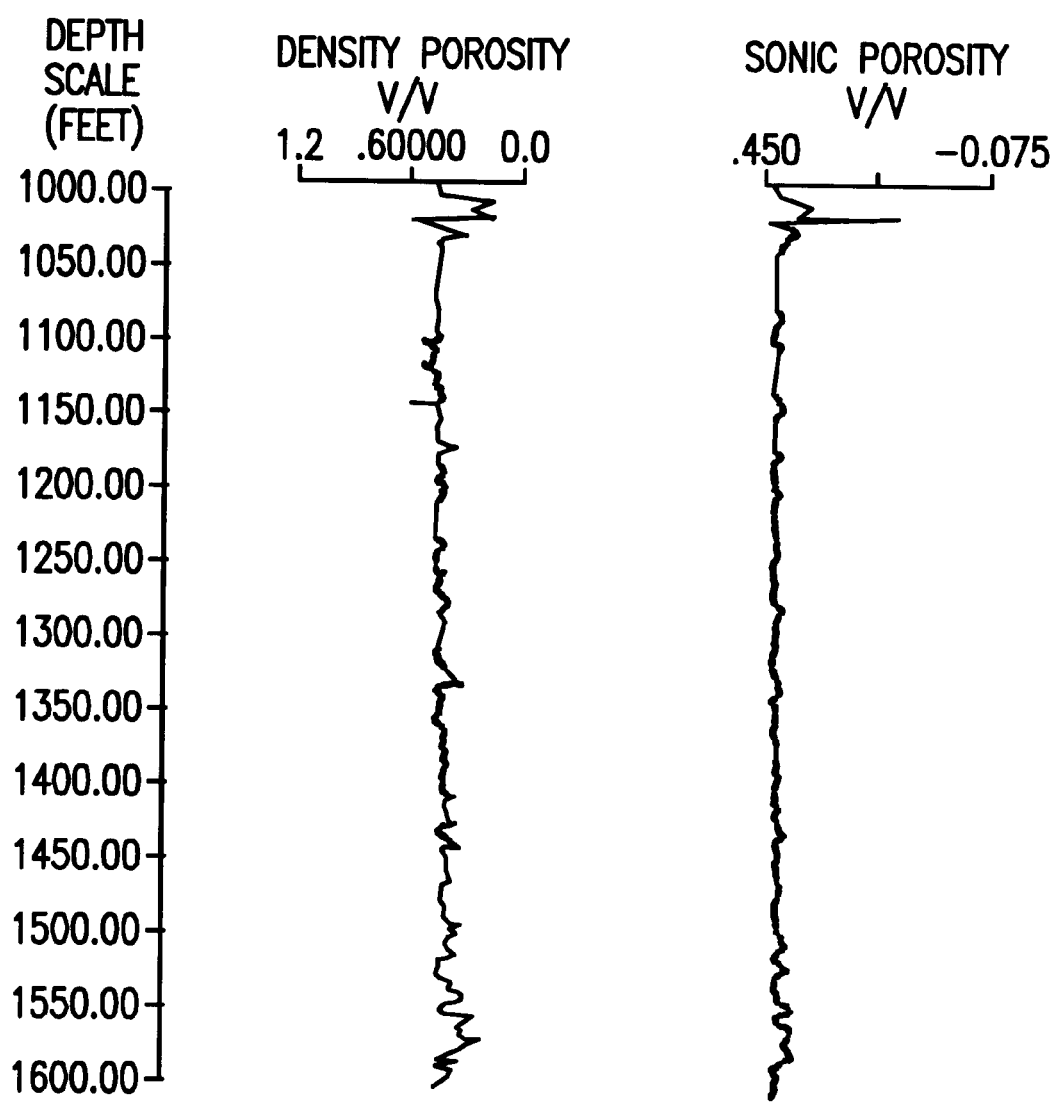
FIG. 15 is a graph showing the porosity profiles derived from the neutron density logging of the PRBS Cross-Well Tomography Test of the present invention.

Neutron density logging and sonic logging were conducted in the borehole of well BF-3 when it was drilled in 1993. This well is located about 85 feet to the West of the plane of the PRBS cross-well tomography across wells BF-1 and BF-2. The porosity profiles from this logging are shown in FIG. 15. As FIG. 15 indicates, the porosity measurements and the acoustically extracted porosity image obtained in the manner of the present invention, and the porosity profiles are closely correlated for the entire depth between 1000 to 1600 feet. Thus, this also independently confirms the accuracy of the system of the present invention.

As previously stated, FIGS. 16(a) and 16(b) indicate comparisons at various frequencies of permeability and porosity when using the Super-K inversion technique, as compared to pumping tests and neutron density logs, FIG. 16(a) at 1157 feet depth and FIG. 16(b) at 1514 feet depth, at the SFWMD test site.

Near-Surface Segments

The permeability-porosity structures of different media located within the near-surface sediments of the Tokyo, Japan area have been successfully imaged for the first time in accordance with the method of this invention by analytically inverting the acoustic wave velocity and attenuation fields. The acoustic fields had been previously measured by the patented Pseudo Random Binary Sequence (PRBS) based cross-well acoustic tomography device (Yamamoto et al., 1994). A quadratic equation of permeability derived from the Biot (1956) theory was used for the permeability-porosity inversion of the measured acoustic velocity-attenuation fields. The shear modulus image was also extracted from the acoustic velocity field using the newly derived quadratic dispersion equation and the Yamamoto (1989) shear modulus-porosity relation. The acoustically measured images of permeability, porosity and shear modulus were favorably compared with the engineering data from tests performed on the cores and boreholes.

The recent major earthquake in Kobe, Japan, was a reminder that a whole or partial liquefaction takes place in some near-surface sediments, causing major damage to buildings and infrastructures, resulting in catastrophic losses of human lives and wealth. Accurate imaging of the structure of liquefaction potential of near-surface sediments has not been attainable and is a major challenge to geophysicists and civil engineers. The liquefaction potential of a sediment element within the earth is determined by many physical properties of the sediments, including porosity, the permeability and shear strength. These images are also needed for managing and exploration of ground water resources. The method of this invention, adapted for obtaining relevant images of these sediment properties, and exemplary results will now be discussed in detail.

In previous tests we have shown that the porosity structure of reclaimed land can be imaged from acoustic velocity fields measured by cross-well tomography. Tests were conducted below reclaimed land in Tokyo Bay. The Gassmann equation was used to invert the porosity value from the velocity value. The value of permeability at a single point within a beach sand was successfully determined from the values of acoustic velocity and attenuation measured at twenty-five different frequencies between 1 and 25 kHz as compared with the Biot theory. However, the permeability structure within the sediments did not lend itself to being imaged. I determined the velocity images within the same cross-well section within a limestone formation which were measured by cross-well tomography using three frequencies (250, 1000, and 2000 Hz). The acoustic velocity of permeable layers was found to change significantly with frequency while the velocities of impermeable layers stay unchanged with frequency. Although this was a significant finding toward imaging of the permeability structure, imaging of the permeability structure within the sediments still remained to be accomplished at that time.

The first-ever image of the permeability structure within the earth was made in accordance with this invention from measurements of the velocity and attenuation fields at 4 kHz, measured by the PRBS cross-well tomography method used within limestone formations.

The permeability image within a sandstone oil field was successfully made in accordance with this invention. In this work, the method of acoustic imaging of the permeability, porosity, and shear modulus structures within the near-surface sediments was used. The acoustically imaged permeability, porosity, and shear strength structures were compared with engineering measurements on the boreholes and cores.

In this method, an explicit analytical equation of permeability is derived from the Biot theory. The Geertsma-Smit approximation to the Biot theory has been shown to be accurate for the case of acoustic wave propagation through saturated near surface sediments. An dispersion equation in this case is given by equation A:

$$s^2 = \frac{m\rho - \rho_f^2}{Hm + M\rho - 2C\rho_f} \quad (A)$$

Here, s is the complex slowness. In this method complex valuables are designated by bold letters and real valuables by plane letters. The phase velocity V and the intrinsic attenuation $Q^{-1}$ of acoustic wave through the sediments are given as:

$$V=1/\text{Real}(s), \text{ and } Q^{-1}=2 \text{ Imag}(s)/\text{Real}(s) \quad (B)$$

In equation (A), m is the complex virtual mass given as:

$$m = m_r - im_i = \frac{(1 + C_a(1-\phi))\rho_f}{\phi^2} - i\frac{\mu}{k\omega} \quad (C)$$

where $C_a$ is the added mass coefficient of the skeletal frame, $\mu$ is the viscosity of pore fluid, k is the permeability, $\omega=2\pi f$, the angular frequency, f is frequency. H, M, and C are Biot's elastic coefficients given as:

$$H=(K_r-K)^2/(D_r-K)+K+4/3G \quad (D)$$

$$C=K_r(K_r-K)/(D_r-K) \quad (E)$$

$$M=K_r^2/(D_r-K) \quad (F)$$

$$D_r=K_r(1+((K_r/K_f-1))) \quad (G)$$

Here, $K_f$ is the bulk modulus of the pore fluid, $K_r$ is the bulk modulus of grain mineral, and K and G are the bulk modulus and shear modulus of the skeletal frame and φ is the porosity. Still in equation (1), p is the bulk density defined by:

$$\rho=\rho_r(1-\phi)+\rho_f\phi \quad (H)$$

in which $\rho_r$ is the density of grain, and $\rho_f$ is the density of pore fluid. The equation (A) generally predicts the acoustic wave propagation through soft and saturated sediments in which the bulk modulus of the frame is much smaller than that of the pore fluid, or $K<<K_f$. The Yamamoto et al. (1989) formula for shear modulus may be used to calculate the shear modulus field from the porosity field as:

$$G=A((1-\phi)/\phi)^{1.12}\sigma^{0.5} \quad (I)$$

in which $A=1.84\times 10_5$ $(Pa)^{0.5}$, and σ is the confining effective stress given by:

$$\sigma=2/3(\rho_r-\rho_f)g\int(1-\phi)dz \quad (J)$$

in which g is the acceleration of gravity and the depth integral is from the ground surface to the depth of burial of the sediment element, z. The bulk modulus of skeletal frame K is calculated from the shear modulus field assuming a constant Poisson's ratio n of the skeletal frame. A recommended value of Poisson's ratio is: n=0.287, which is the average of the fifty five values of Poisson's ratio which may be measured on fifty five sediment samples. The porosity and shear modulus fields within the sediments are calculated from measured velocity fields through equations (B), (E), and (F). A few iterations are sufficient to find the correct porosity and shear modulus fields.

Once the porosity and the shear modulus (and bulk modulus) fields have been determined from the measured acoustic velocity field, the permeability field can be determined from the imaginary part of the dispersion equation, which leads to the permeability equation:

$$\Omega^2-((1-1/v^2)/Q^{-1})\Omega+1/v^2=0 \quad (K)$$

in which the total dispersion v is the ratio of the high frequency velocity $V_\infty$ and the low frequency velocity $V_0$ as:

$$v=V_\infty/V_0 \quad (L)$$

The high frequency velocity $V_\infty$ is given from equations (F) and (G) when f tends to ∞ as:

$$V_\infty=((H\ m_r+M\rho-2C\rho_f)/(\rho m_r-\rho_f^2))^{0.5} \quad (M)$$

and $V_0$ is given by:

$$V_0=(H/\rho)^{0.5} \quad (N)$$

The permeability equation is a quadratic equation of the dimensionless frequency Ω defined as:

$$\Omega = \frac{\omega(\rho m_r - \rho_f^2)k}{\mu} \quad (O)$$

The permeability k is then given from the roots Ω of the permeability equation (K) as:

$$k = \frac{\rho\Omega}{\omega(\rho m_r - \rho_f^2)} \quad (P)$$

Figure 17:
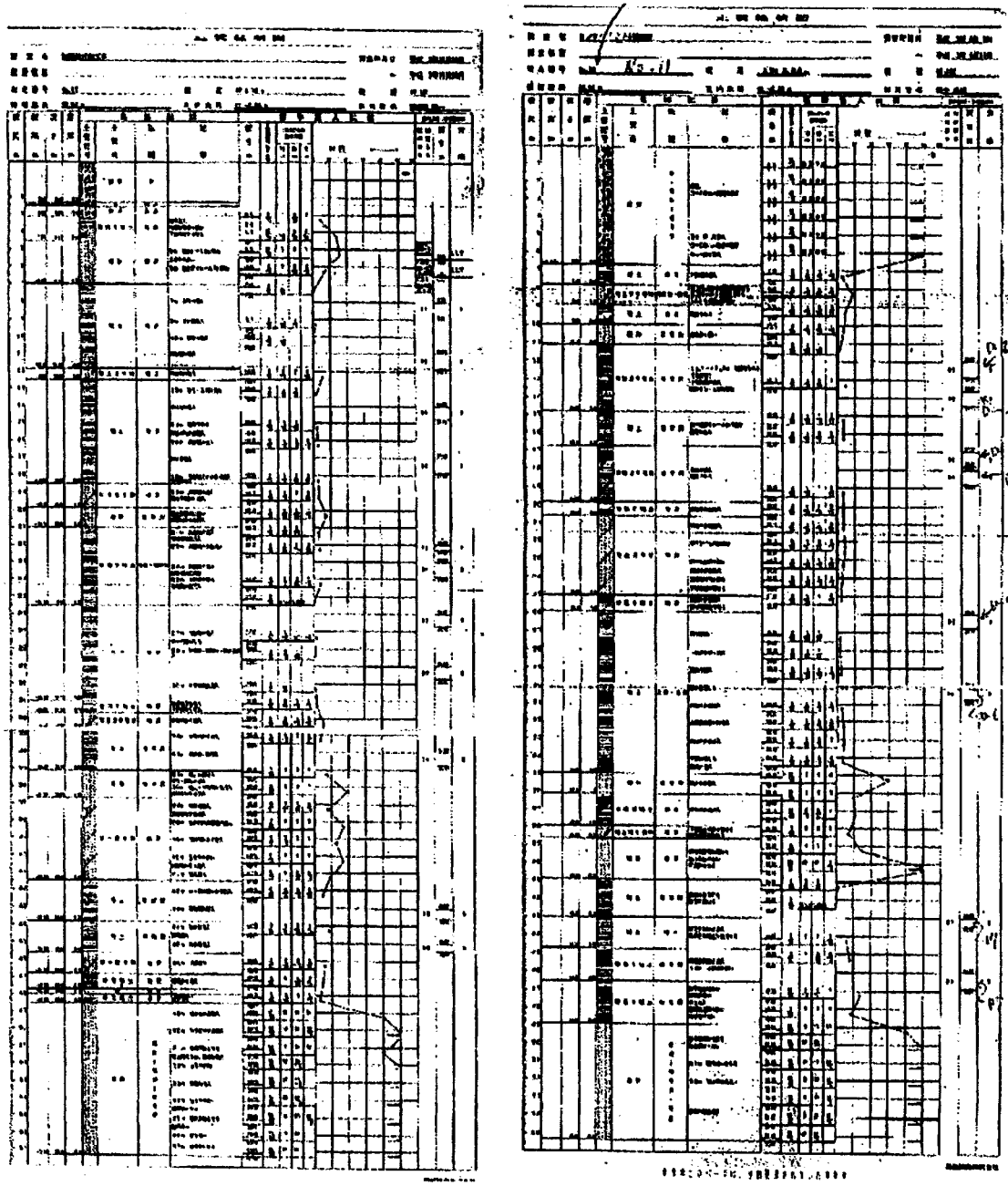
FIG. 17 is a showing of geological and engineering test logs for evaluation of porosity, shear modulus and permeability.

The cross-well tomography tests according to this invention were conducted at a recently created man-made island in the Kawasaki Steel Chiba Iron Foundry in 1991. The site had been consolidated by forming a 5 meter thick slag mound for a few years until the time of the work. Early experiments, data processing and the travel time inversion of the wave field data obtained from the experiments were all reported in the Yamamoto et al paper (1994), along with porosity and shear modulus (strength) images transformed from the velocity images using the Gassmann velocity equation and the Yamamoto shear modulus equation. The velocity, porosity and shear strength images for the cross-well sections 15–11 and 11–12 were favorably compared with the geological logs and engineering logs. The geological and engineering test logs for the well 11 are shown in FIG. 17 to evaluate the porosity, shear modulus and permeability structure images obtained from the present sturdy.

Figure 18:
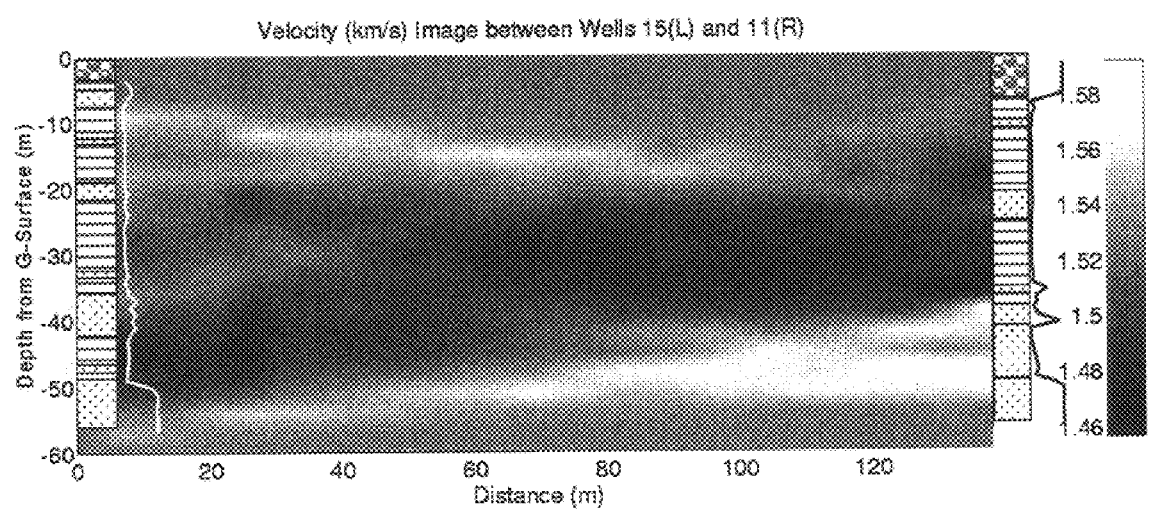
FIG. 18 represents a velocity image inverted from a wave source, showing relationship between velocity and distance between wells.

The velocity image for the cross-well section 15–11 is reproduced in FIG. 18 which is used as a source data for the new permeability-porosity inversions herein. The velocity image in FIG. 18 was inverted from the wave field measured using 30 source locations between depths 0 and 60 m with a vertical interval of 2 m in well-11, and 50 hydrophone locations between depths 0 and 60 m with a vertical interval of 1 m in well-15. The data quality were good to fair with signal-to-noise ratios of the order of 10 to 20 dB, as these data were obtained using the old PRBS cross-well tomography DSP system whose pulse compression capability was only 16000 pulses maximum. The PRBS DSP system has been dramatically improved in accordance with this invention. Nonetheless, the velocity image in FIG. 18 generally agrees with the stratigraphy and the standard penetration test logs which are also shown at both sides to the velocity image at the wells 15 and 11. The 5 m margins at the top and bottom of each image should be ignored because the ray coverage there is scarce. This is true for the velocity image and all other images shown for Cross-well section 15–11. The high velocity areas correspond to the sand layers at depths approximately 10, 20, 40 and below 48 m at well 15. The close examination of the geological logs in FIG. 17 indicates that the sand layer at depth 10 m was actually two thinner sand layers between which was a one meter thick clay layer at well 15. The local permeability structure of these three layers is a test for the permeability inversion to be shown shortly.

Results from Current Analysis of Near-Surface Segments

Figure 19:
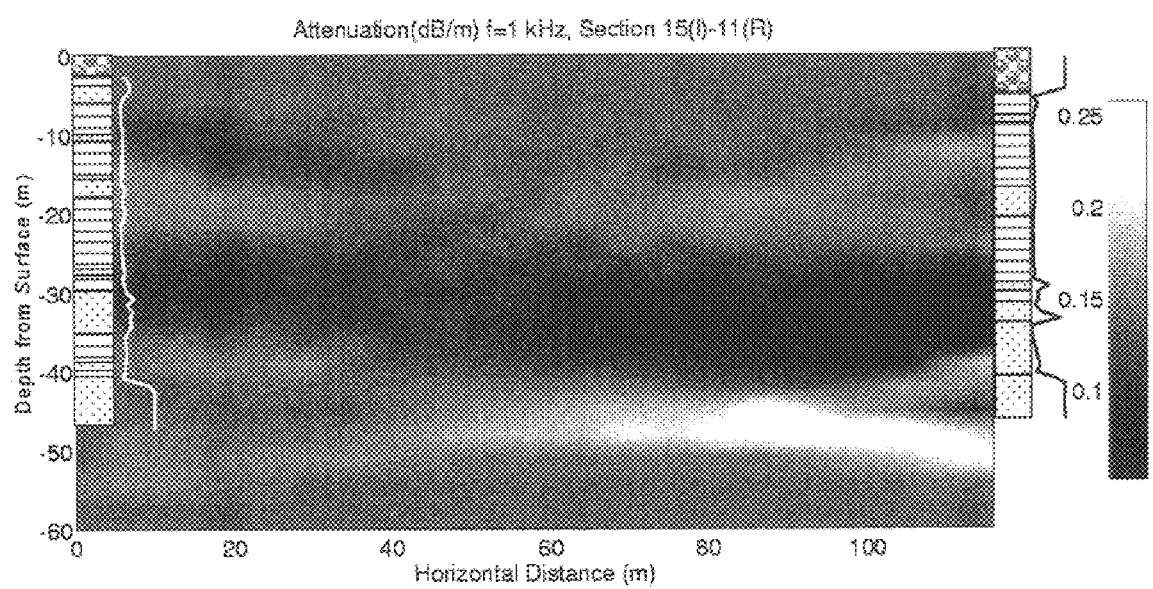
FIG. 19 represents a measured attenuation and its relationship between horizontal distance between wells and depth.

The measured attenuation coefficient a in dB/m is shown in FIG. 19. The specific attenuation $Q^{-1}$ and $\alpha$ is related by definition, $\alpha=(10\log_{10}e)Q^{-1}f/V$. The measured attenuation is not exactly the intrinsic attenuation that is needed for permeability conversion through the permeability inversion equation because it is contaminated by apparent energy loss mechanisms, such as borehole loss, loss due to scattering and loss due to P-to-S conversion. The borehole loss is negligibly small in this case because a PVC casing was used for the boreholes. A numerical study by Jackson and Ivakin (1998) showed that the P-to-S conversion is negligible in soft sediments. The apparent loss due to the scattering of acoustic energy from the velocity and density fluctuations within the sediment volume in soft sediments is not necessarily negligible as compared with the intrinsic attenuation. According to the Yamamoto (1996) theory, the apparent attenuation due to volume scattering is estimated at 0.05 dB/m at f=1000 Hz. Assuming the scattering loss is uniform in the sediment volume, a constant attenuation 0.05 dB/m is subtracted from the measured attenuation field imaged in FIG. 19 for the permeability calculations using equation (K).

Figure 20:
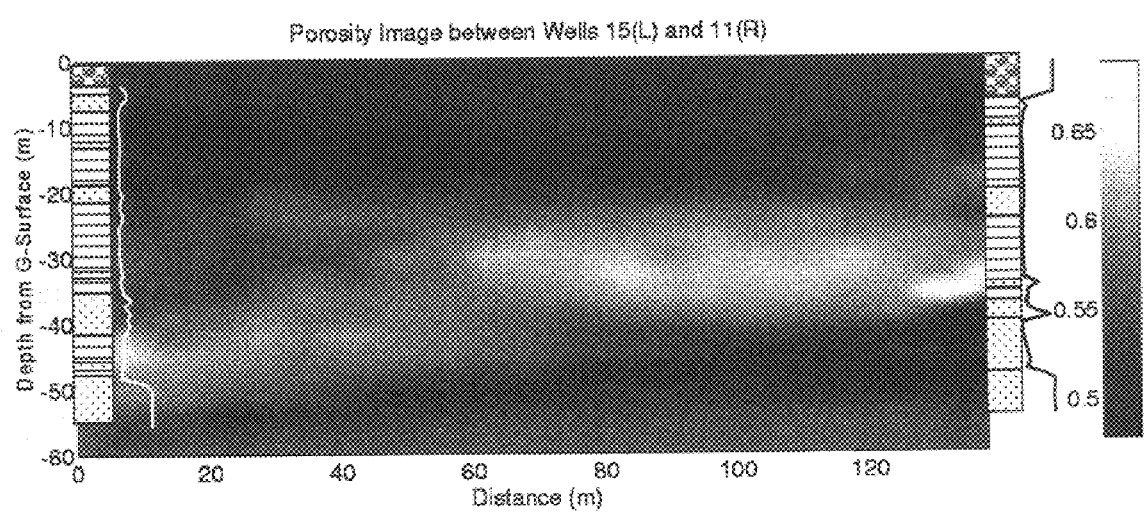
FIG. 20 represents porosity image in a porosity field at various depths.
Figure 21:
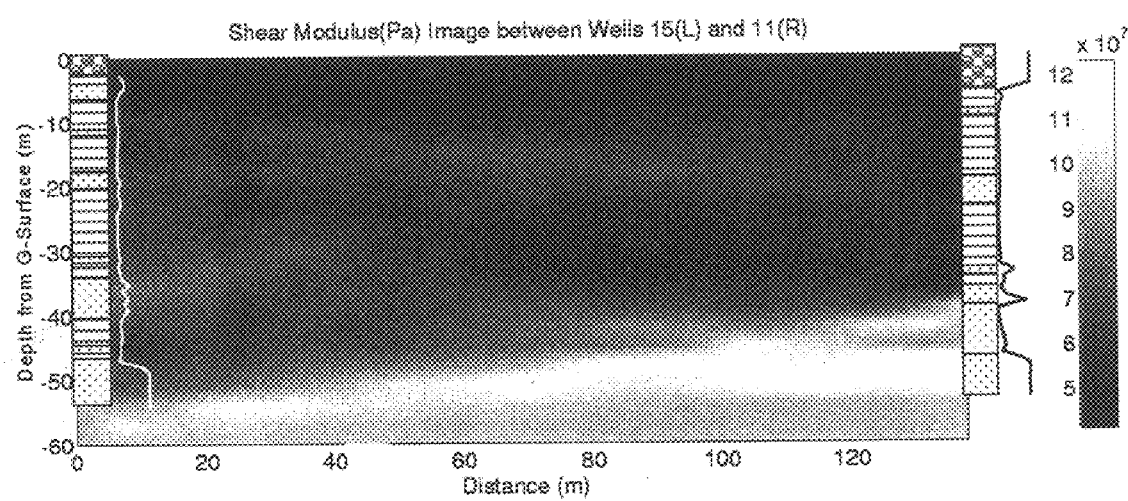
FIG. 21 represents a comparable shear modulus field.

From the measured velocity and attenuation fields given in FIGS. 18 and 19, the porosity field imaged in FIG. 20 and the shear modulus field imaged in FIG. 21 are calculated according to iteration inversion using equations (A), (E) and (F). The sediment strafigraphy at wells 15 and 11 are in good agreement with these images. The porosity and shear modulus structures imaged by the present more accurate inversion is generally in excellent agreement with those structures imaged by the earlier inversion using the Gassman equation shown in Yamamoto et al (1994). The fact that the two inversion methods agree indicates that the PRBS frequency f=1000 Hz, which is used in the cross-well experiment, falls into the low frequency limit of the Biot theory. There, the acoustic wave velocity using the Biot theory coincides with that by the Gassmann equation given by equation (N).

Figure 22:
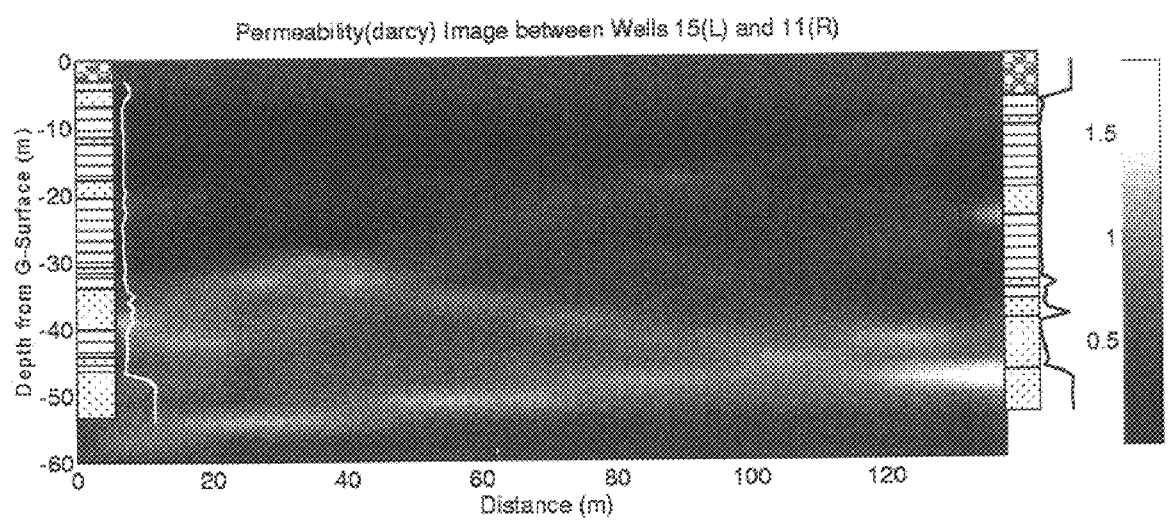
FIG. 22 represents an imaged permeability structure invented from the measured attenuation structure shown in FIG. 19.
Figure 23:
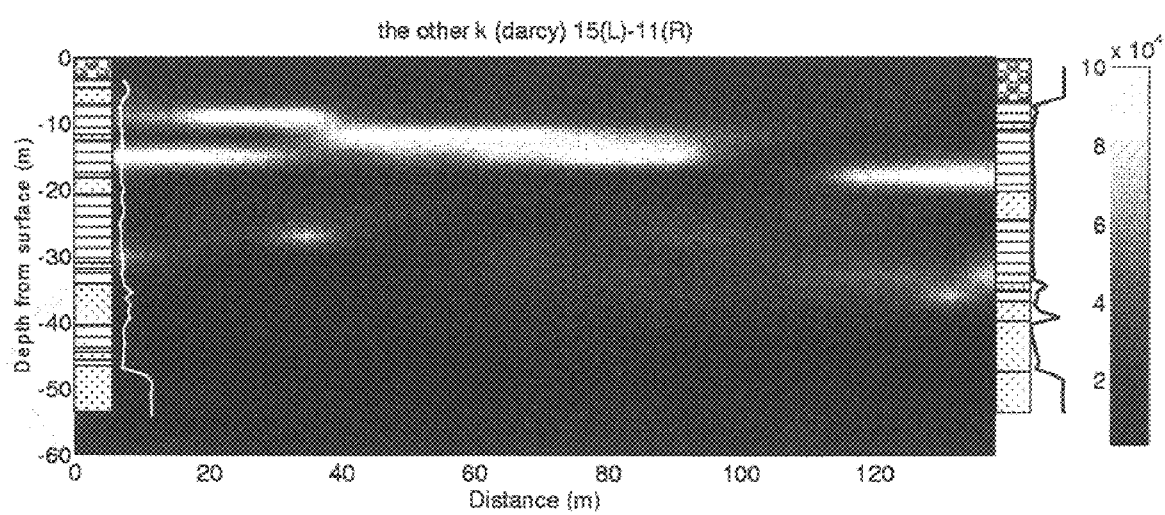
FIG. 23 represents graphically another of two possible permeability equations in accordance with the inversion calculation.

The permeability structure is imaged in FIG. 22 which is based upon the measured attenuation structure given in FIG. 19, less estimated scattering loss 0.05 dB/m, through the previously mentioned equations (K) and (M). The sand layers at depths about 10, and 20 at well 15 have permeability of approximately 1 darcy whereas the sand layers near depth 40 and 50 m at well 15 have higher permeability of nearly 2 darcy. The soils engineering logs show the upper sand layers are mixed with significant proportions of clay and silt, while the lower sand layers contain only small amounts of clay and silt. The standard penetration test logs show that the upper clayey sand layers have much smaller shear strength than those of the lower cleaner sand layers as shown in FIG. 17. These differences are clearly depicted in the permeability structure image in FIG. 22. These values of permeability are expected for the silty sands and the fine clean sands, respectively. The permeability structure image also shows complicated local structures near depth 10 m which the geological logs and the engineering logs show.

The sand layer near depth 10 m at well 15, imaged in FIG. 22, is not connected to well 11.

Theoretically, the quadratic permeability equation (O) has two roots, thus two permeability values for a given attenuation value. The other theoretical permeability structure image is shown for information in FIG. 21. The permeability values of this image are of the order of one thousand and ten thousand darcies which are not possible physically. Therefore, it is easy to reject this image as the permeability structure in the sediment. One can also determine the uniqueness of the permeability inversion by changing the PRBS frequencies as demonstrated for limestone formations by Yamamoto (1998).

Cross-well Tomography Imaging of the Permeability Structure Within a Sandstone Oil Field Turning now to another image of permeability structure within a sandstone oil reservoir. High quality data of acoustic cross-well tomography were obtained by a novel system applying the pseudo random binary sequence (PRBS) based cross-well tomography (U.S. Pat. No. 5,406,530). The velocity and attenuation images, measured with a 500 Hz PRBS, were inverted analytically based on the squirt flow theory. The acoustically imaged permeability image has been discovered to agree with the permeability information gathered through down hole logs and cores.

Imaging the permeability structure of the earth acoustically has been and is a challenge of geophysics. It requires a high quality acoustic image measurement method, physically consistent predictive models of acoustic wave propagation through earth, and accurate and stable inversion techniques.

Because the physics of acoustic wave propagation through earth is very complicated, there is no single theory that can accurately model the physics for all earth materials. It has been shown by Yamamoto et al (1994) that the Biot (1956) theory predicts the acoustic wave propagation through saturated, non-cemented sediments at frequencies between 1 and 10 kHz. For sandstone, the squirt flow theory by Mavko and Nur (1979) has been shown to predict adequately for the wave propagation at cross-well frequencies and ultrasonic frequencies. Dvorkin and Nur (1993) combined the Biot theory and the squirt flow theory. Yamamoto (1998) has developed a new poroelastic theory for very permeable limestone and accurately inverted the cross-well acoustic tomography data for permeability. Some other theories may be needed for fractured volcanic rock formations. All these theories require the rock properties as given input. Empirical equations (Han et al, 1986 for sandstone; Yamamoto et al., 1989 for non-cemented sediment; Yamamoto, 1998 for limestone) for bulk modulus and shear modulus of sediment frame are usually used for this purpose.

From the point of view of inversion calculations, the simpler the model the better. From this point of view, the BISQ (Biot and Squirt flow) model by Dvorkin and to Nur (1993) is too complicated to find the correct permeability inverse from measured acoustic data. It has been shown that the analytical super-k model of limestone (Yamamoto, 1998 a and b) is accurate and stable for permeability inversion for limestone. Similarly, it will be shown that the squirt flow model is accurate for inversion of acoustic data for the permeability image within sandstone.

Squirt Flow Theory

An analytical inverse model for permeability within a sandstone formation is built using the squirt flow theory. I refer to Mavko and Nur (1979); Dvorkin and Nur (1993); and Yamamoto (1998) for the physics and mathematics behind the theory. The acoustic wave slowness s is given by the squirt flow theory as $$s^2 = \frac{\rho}{M + F_{sq}\alpha^2/\phi} \quad (1)$$

where $\rho$ is the bulk density of the sediment, M is the uniaxial modulus of the frame, $\alpha$ is a Biot elastic coefficient, and $\phi$ is the porosity. In this paper, vectors and complex variables are expressed by bold letters. $F_{sq}$ is the squirt flow modulus of pore fluid given by:

$$F_{sq} = F\left[1 - \frac{2J_1(\lambda R)}{\lambda R J_0(\lambda R)}\right] \quad (2)$$

where F is the Biot elastic modulus of pore fluid stiffness, R is the squirt flow length, and $J_0$ and $J_1$ are the Bessel functions of the order zero and one. The squirt flow wave number $\lambda$ is given through the following nondimensional equation:

$$(\lambda R)^2 = i\frac{\omega\mu\phi R^2}{Fk} = i\Omega \quad (3)$$

where $\omega$ is the angular frequency $2\pi f$, f is the frequency, $\mu$ is the viscosity of pore fluid, and k is the permeability. The phase velocity $V_p$ and the intrinsic attenuation $Q^{-1}$ of the super-k medium are given as:

$V_p = 1/\text{Real}(s)$, and $Q^{-1} = 2 \text{Imag}(s)/\text{Real}(s) \quad (4)$ As mentioned earlier, the elastic module of the skeletal frame have to be estimated from the measured sound speed $V_p$. The empirical relation of Han et al. (1986) was used to estimate the shear modulus and bulk modulus of the skeletal frame. The values of clay content c were assumed for sandstone and shale. The Biot coefficient F and $\alpha$ are then calculated using the Biot (1956) equations.

Permeability Inverse

The permeability inverse for sandstone material is obtained through equations 1 through 4. First, the elastic module and porosity estimates are obtained from the measured velocity $V_p$ through the Han et al. (1986) sandstone formula. Then the permeability is inverted from the measured attenuation $Q^{-1}$. It should be noted that the attenuation and the velocity dispersion are only the function of a dimensionless, real, positive value parameter, $\Omega$. Therefore, if one finds the unique values of $\Omega$ that satisfy the equations 4, one can find the permeability through equation 3 as, $$k = \frac{\omega\mu\phi R^2}{F\Omega} \quad (5)$$

If the permeability is known from other measurements, the viscosity of the pore fluid is inverted as:

$$\mu = \frac{Fk\Omega}{\omega\phi R^2} \quad (6)$$

This analytical inversion is simple and very stable as will be shown in the following.

Cross-Well Acoustic Tomography

Figure 24:
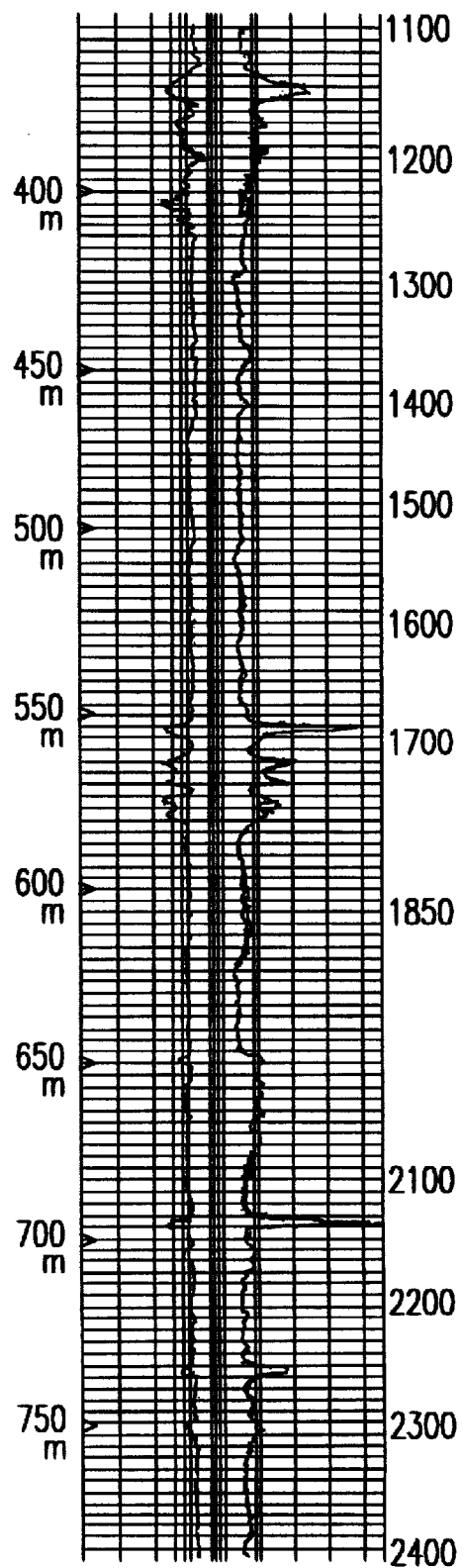
FIG. 24 represents resistivity logs taken in a cross-well tomography test.
Figure 25:
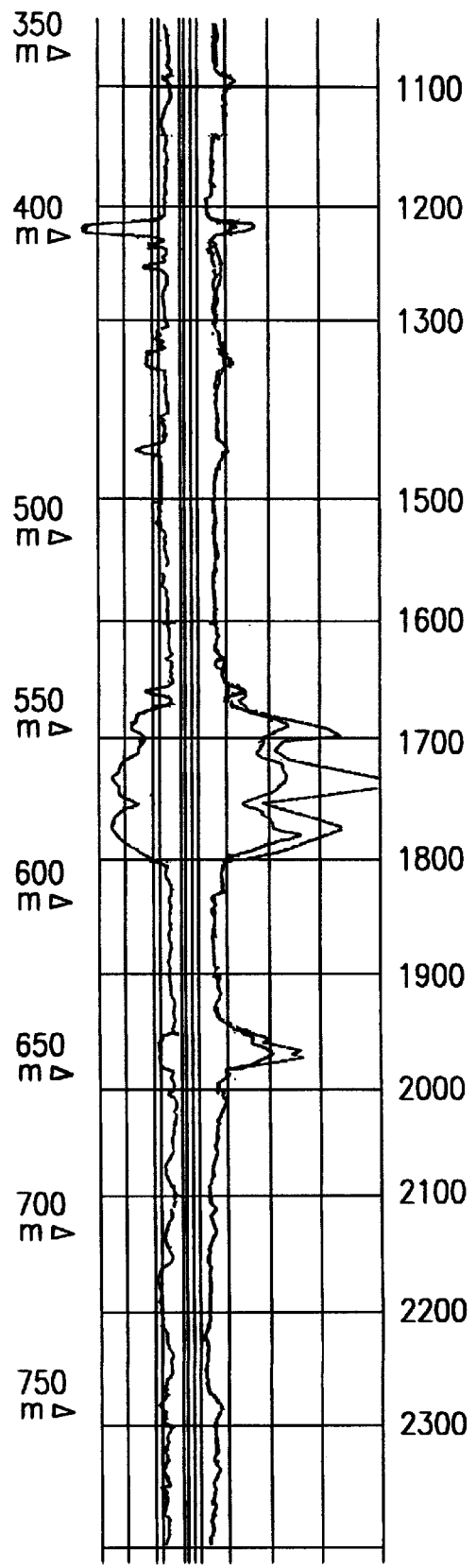
FIG. 25 represents gamma-ray logs taken in two wells.

Our cross-well tomography experimentation using the new system YEC2111 was conducted using wells MD15 and Q1 at an oil field of Trincan Oil Limited, Trinidad. The resistivity logs and gamma-ray logs of the two wells are reproduced in FIGS. 24 and 25. The two oil wells are separated by a horizontal distance of 125 m. The cross-section between the two wells and between the depths 350 m and 800 m was imaged at 500 Hz PRBS of 4095 cycles, with a source and receiver depth interval of 6 m. This produced a total of 60,000 source-receiver rays. The number of stacking or averages varied from 100 to 400, making total compression of up to 160,000 pulses. Due to the powerful source output of the new source ITC 6145 (180 dB at 500 Hz, 198 dB at 1000Hz, and 210 dB between 1500 and 5000 Hz), the test experiment of the new system YEC2111 went very smoothly and finished in 2 days once the experiment became ready.

Figure 26:
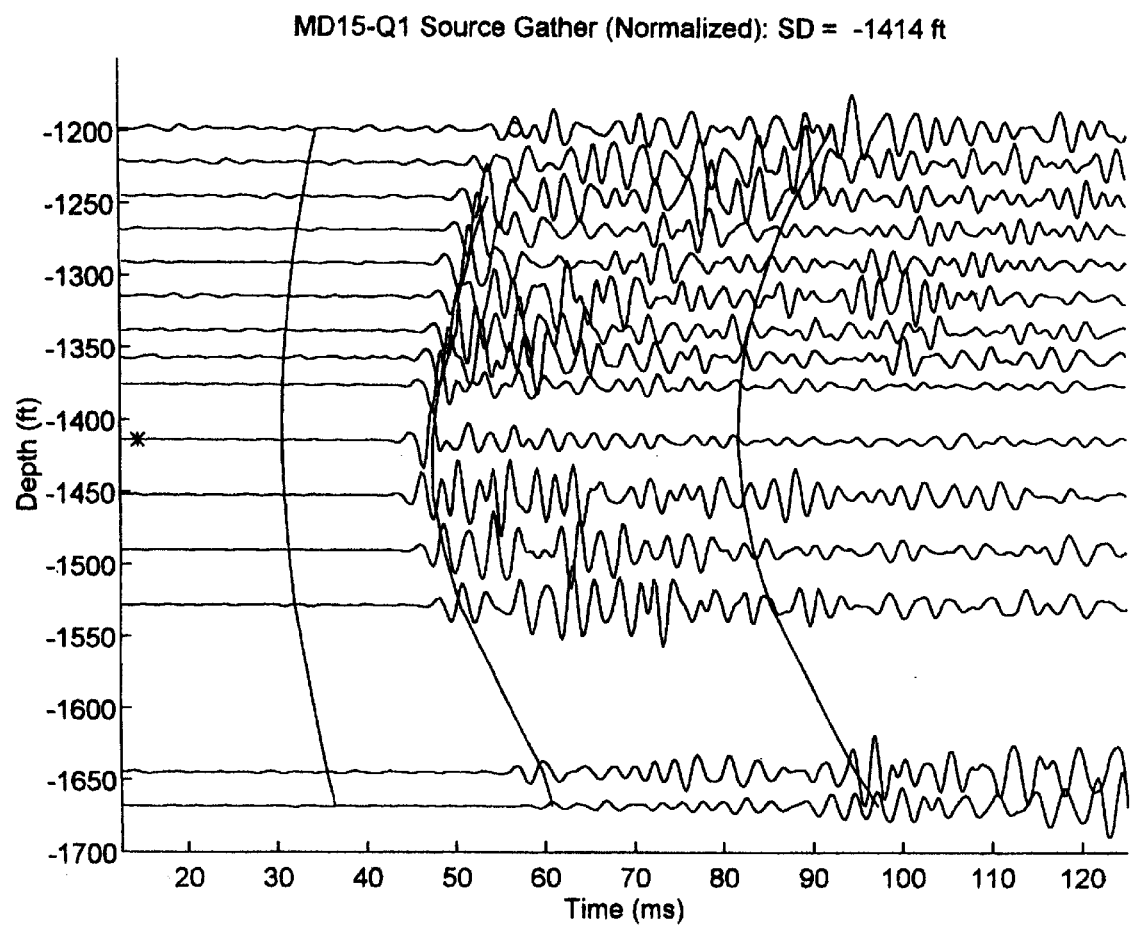
FIG. 26 represents a typical source gather after correlation of FIGS. 24 and 25.
Figure 27:
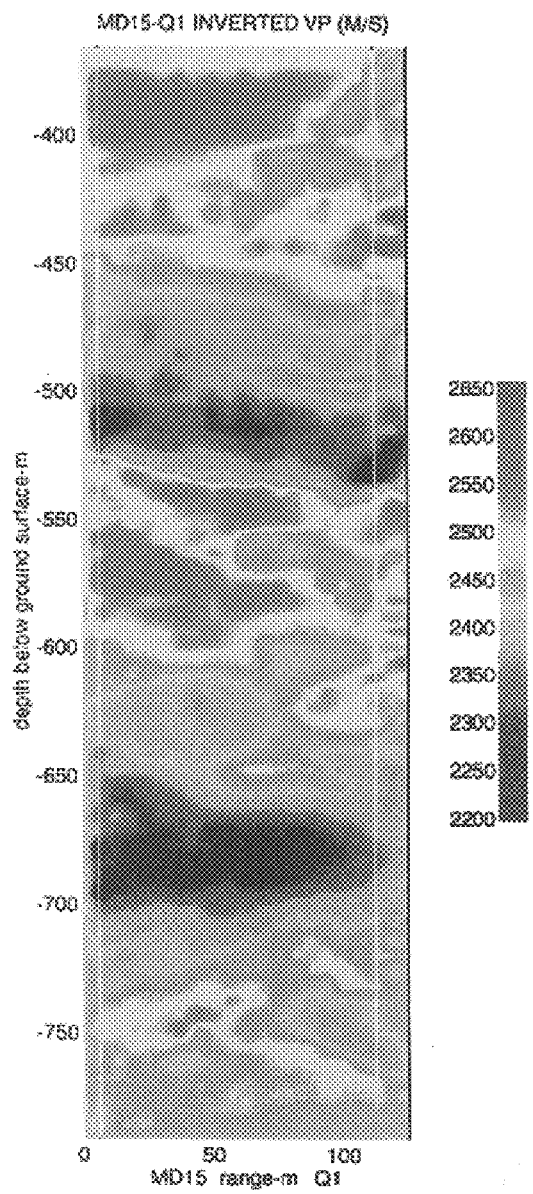
FIG. 27 represents velocity images obtained by the test work of FIGS. 24 and 25.
Figure 28:
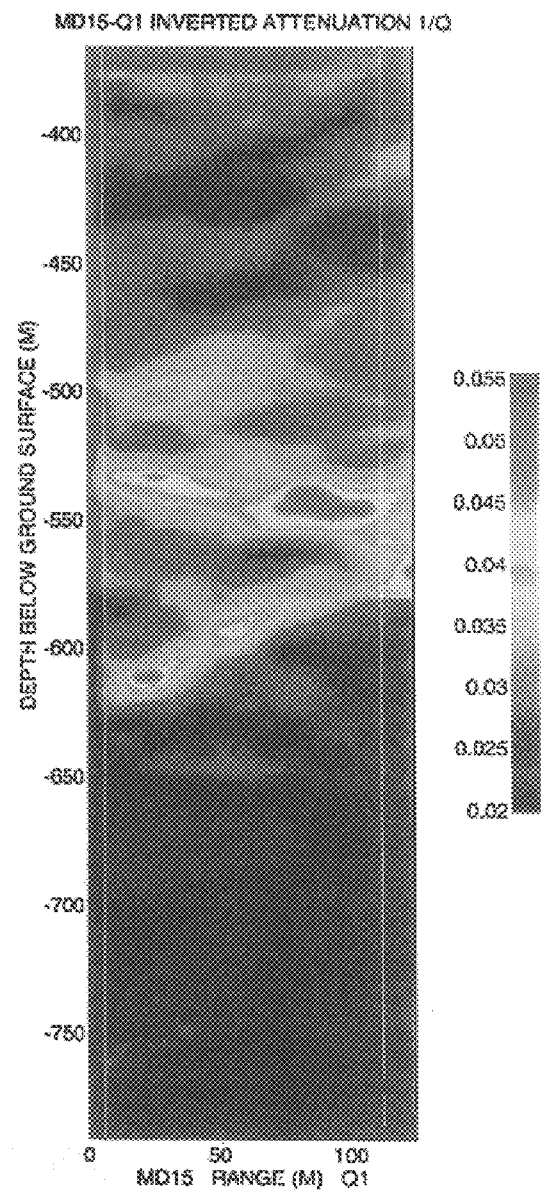
FIG. 28 represents attenuation images obtained by the test work of FIGS. 24 and 25.

95% of the 60,000 rays measured during the cross-well experiment were used in inversion analysis because of the extremely good quality of the wave data. A typical source gather after correlation is plotted in FIG. 26. Clear first arrival waves are easily recognizable from the source gather. Therefore, the inverted velocity and attenuation images were of high quality and a high degree confidence was associated with the inverted images. The least squares SVD (Singular Value Decomposition) inversion codes for velocity and attenuation by Bregman et al (1989) were used in the calculations. The pair of velocity and attenuation images are given in FIGS. 27 and 28. The examination of images clearly show that the imaged section can be roughly divided into four subsections: sand layer 350 to 450 m, shale layer 450 to 530 m, sand layer 530 to 650 m, and shale layer 650 to 800 m. These rough subdivisions of the section agree with the electric and gamma ray logs of the two wells. Actual geology of the section is much more complicated than these simplified divisions as will be seen in the permeability images.

Porosity Images

Figure 29:
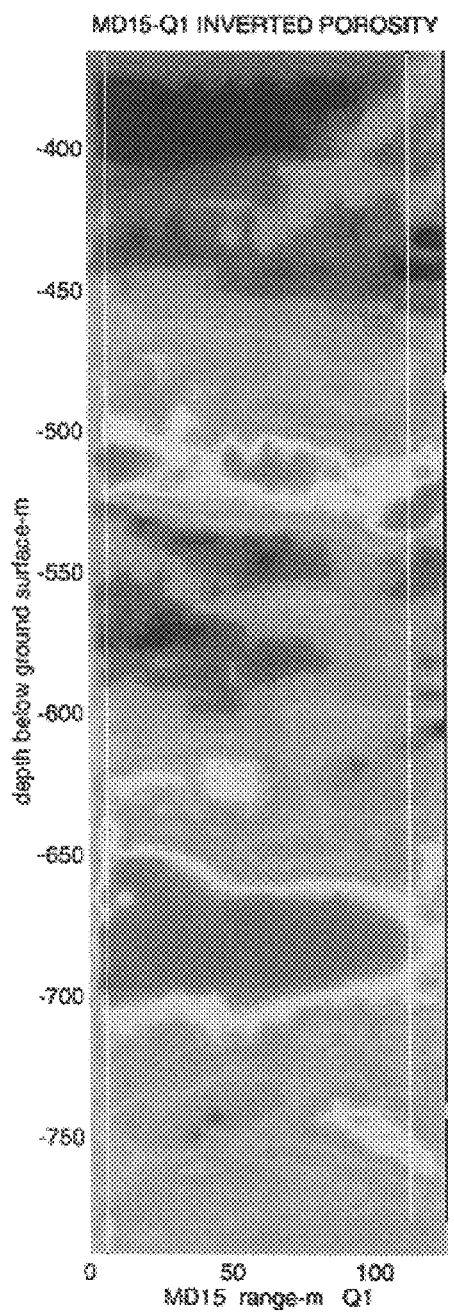
FIG. 29 represents sandstone porosity values extracted from the test work of FIGS. 24 and 25.
Figure 30:
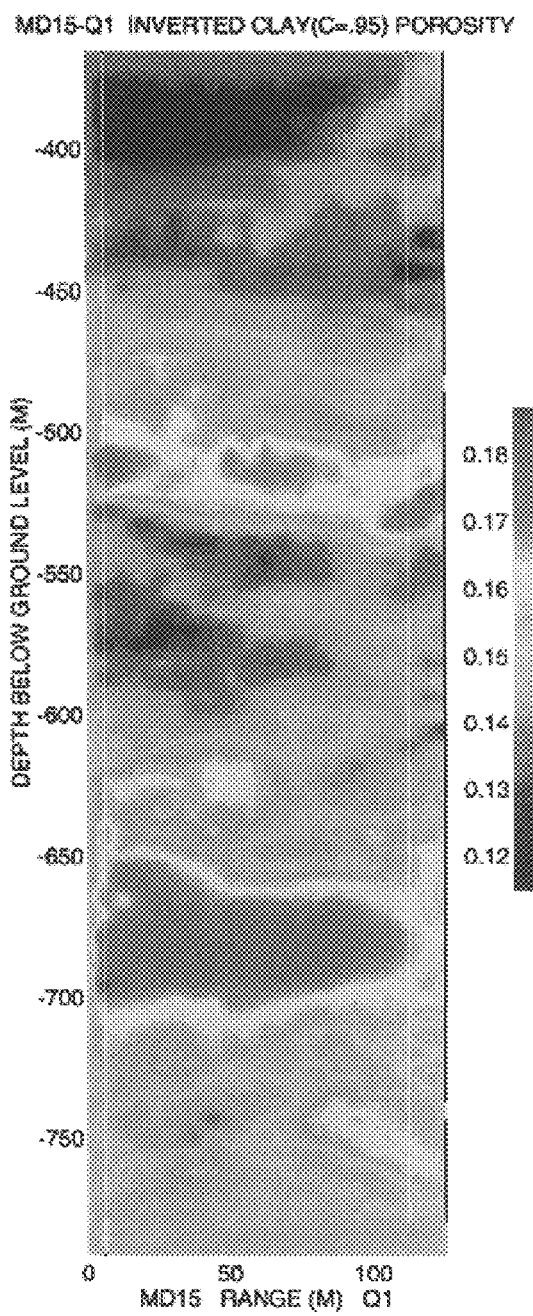
FIG. 30 represents shale porosity values extracted from the test work of FIGS. 24 and 25.

The proposed permeability inversions required the values of porosity, shear modulus and bulk modulus of skeletal frame, viscosity of pore fluid, and squirt flow length. The porosity, shear modulus and bulk modulus were estimated from the velocity image FIG. 27 using the Han et al (1986) empirical formula. The extraction procedure is presented in Yamamoto et al (1995). The sandstone porosity and the shale porosity images extracted by this procedure are shown in FIGS. 29 and 30. The clay content of the sandstone is assumed at 25% in the calculation and 95% for the shale. These porosity and elastic modulus values were used in the permeability inversions.

Measured Permeability Images

Figure 31:
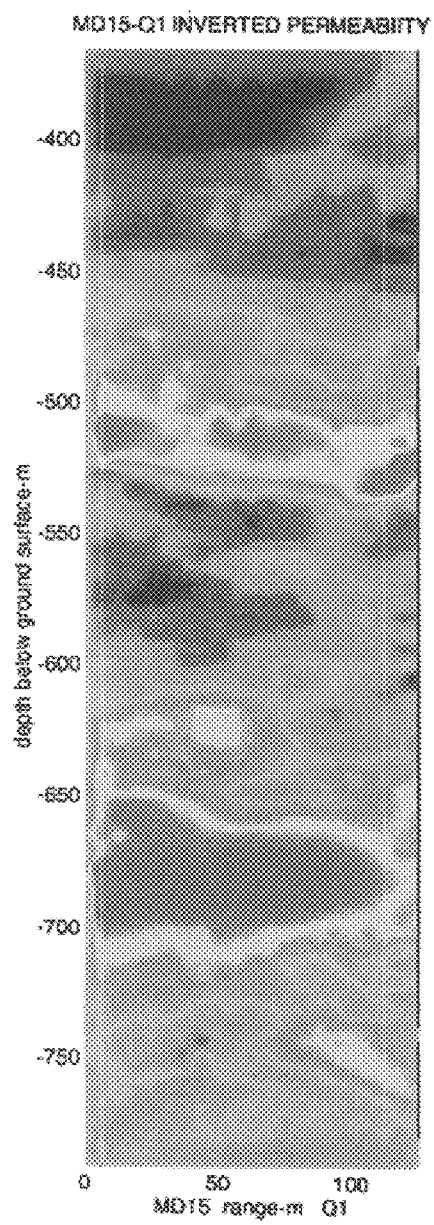
FIG. 31 represents permeability of sand layers inverted through the analytical inverse procedure of this invention.
Figure 32:
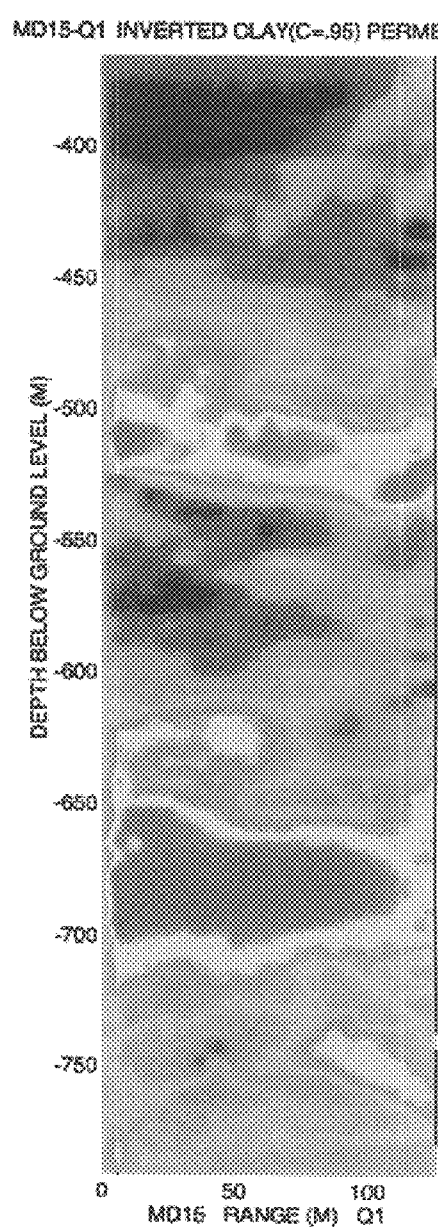
FIG. 32 represents permeability of shale layers inverted through the analytical inverse procedure of this invention.

The permeability images for the sand layers (350–450 m and 530–650 m) and the shale layers (450–530 m, and 650–800 m) were inverted through the analytical inverse procedure and shown in FIGS. 31 and 32. In the inversion calculations, a measured viscosity, 40 mPa s, of the oil from the two wells, and constant squirt flow lengths 500 μm for the sandstone and 20 μm for the shale were assumed. According to the analytical permeability inversion, the top sandstone layer at 350–450 m had a permeability between 180 and 200 md and the bottom sandstone layer at 530–650 m had a higher permeability between 205 and 220 md. These values agreed well with the core permeability order of 200 md. The permeability values of the two shale layers at 450–530 m and 650–800 m were very small and ranged between 65 and 80 μd. The two oil bearing sandstone reservoirs had good confining layers according to the permeability images.

The analytical permeability inversion method and the example permeability images within sandstone oil reservoirs were conducted. The velocity and attenuation images measured by the patented PRBS based acoustic cross-well tomography (U.S. Pat. No. 5,406,530). The method was proved to be very stable and accurate according to the core permeability results.

Multiple Frequency Permeability Imaging in Limestone

A newly developed method of permeability imaging is based on accurate measurements of sound speed and attenuation within limestone at one frequency. The UM empirical elasticity-porosity relation was incorporated into the BISQ model search of the solution space of the permeability-porosity pair for a given pair of measured sound speed attenuations. Usually more than one pair of permeability-porosity relationships are found in the solution space. The correct pair is selected by repeating the same process using the sound speed-attenuation measured at another frequency.

Figure 33:
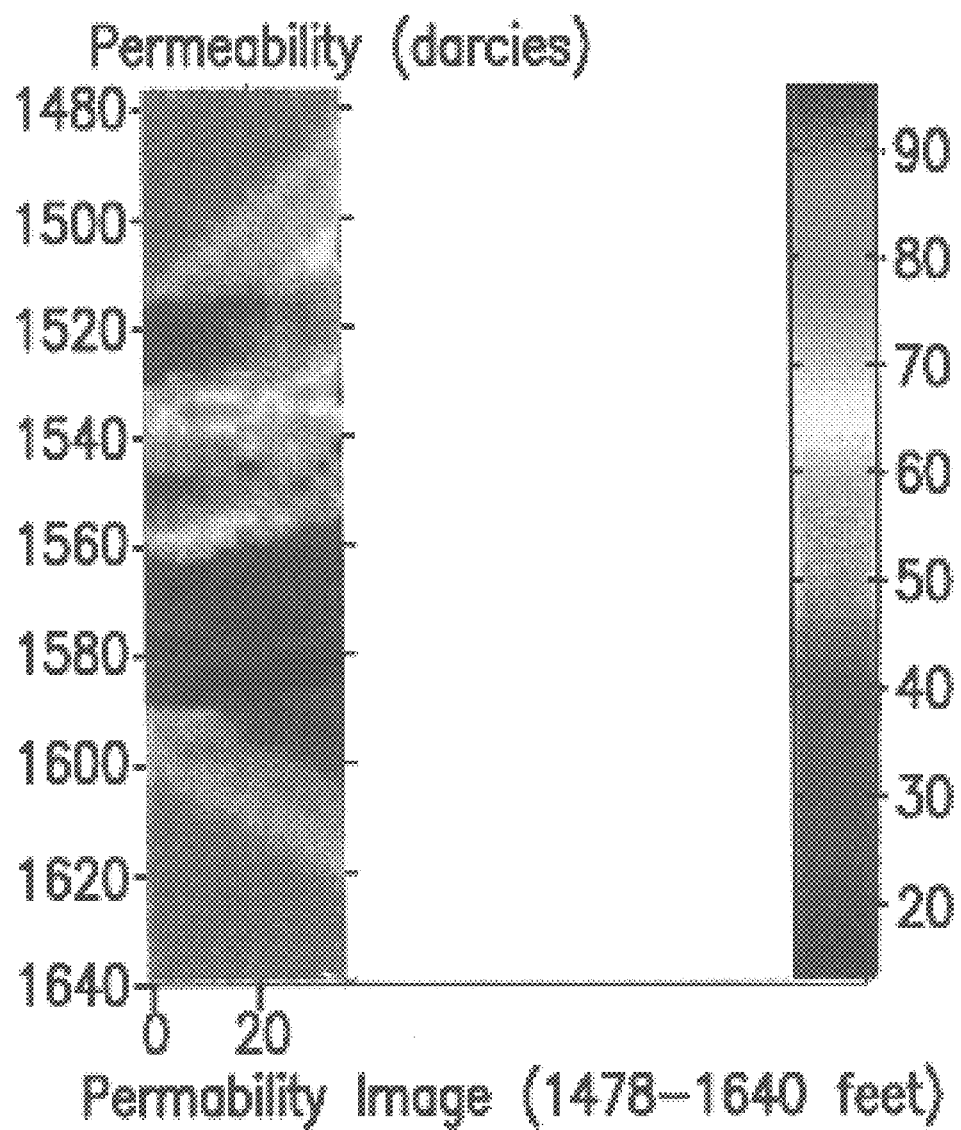
FIG. 33 represents a permeability range obtained from acoustic cross-well measurements.

Alternatively, if porosity is known from other independent measurements such as core measurement or downhole logs, the correct pair of permeability-porosity values can be selected from more than one of the solution pairs. As an example, a permeability image within a South Florida limestone formation (1500 to 1620 feet in depth), as obtained from acoustic cross-well measurements is shown in FIG. 33. The District pumping test showed 33 darcys permeability for the depth interval 1000 to 1500 feet. The permeability image for the entire depth section 1000 to 1600 feet imaged by acoustic tomography, has been verified by total of four pumping tests performed at four different depth intervals. Excellent agreements between the two methods for all four depth intervals confirm the accuracy of this acoustic imaging of permeability. Accordingly, an acoustical method to image the permeability structure within limestone formations has been developed using acoustic cross-well tomography measurements, an empirical relationship between frame elasticity and porosity, and the BISQ model. The results have been verified by pumping tests conducted at four different depth intervals.

It will accordingly be appreciated that, for a wide variety of media in the earth's crust this invention for the first time provides accurate cross-sectional spatial distribution or imaging of the medium's porosity and permeability structure within its segments, even when measured in a noisy environment. It readily measures and records sound velocity and attenuation without needing to measure at multiple frequencies, optionally using high frequencies not heretofore possible, and obtaining remarkably accurate conversion values with the use of limited frequencies.

The method comprises transforming a pair of acoustical velocity-attenuation images into a pair of corresponding electrical signals representing permeability-porosity images.

The electrical signal is conditioned, filtered, passed through audio-digital conversion, converted to real time in accordance with the chosen inversion concept and checked by comparison with a comparative model, which can be a theoretical or an actual model, and stored. Conversion to real time is critical to accurate imaging of both permeability of the medium and the fluid contents of its pores.

Although this invention has described in connection with specific forms thereof, it will be appreciated that a wide variety of equivalents may be substituted for the specific elements described herein without departing from the spirit and scope of the invention as described in the appended claims. For example, computer 1 may be comprised of and configured with any number of electronic processing devices known to those of ordinary skill the art such as personal computers, notebook or laptop computers, and pre-programmed large scale integrated chips, etc. Piezoelectric source 9 may be replaced with a number of similar electro-mechanical transducers for generating the acoustical signal. The computer programming code operating computer 1 may be stored in temporary storage 6, mass storage 7, some other storage device, or in real time processor 4 itself.

what is claimed is:

1. In a non-destructive method of measuring a physical characteristic selected from the group consisting of permeability and porosity of a geological sediment, the steps which comprise:
   (a) generating a pseudo-random code;
   (b) generating a pseudo-random acoustic signal based upon said pseudo-random code;
   (c) transmitting said pseudo-random acoustic signal into and through said sediment;
   (d) receiving said pseudo-random acoustic signal from said sediment;
   (e) processing said pseudo-random acoustic signal to obtain an image of the velocity and attenuation of said pseudo-random acoustic signal after traveling through said sediment; and
   (f) inverting said image in accordance with an inversion equation to obtain an image that represents said physical characteristics of said medium.

2. The method defined in claim 1 wherein said image of the velocity and attenuation of said pseudo-random acoustic signal is inverted by determining a universal geoacoustic model of said medium that corresponds substantially to a set of measured data; solving said model for said measured data to obtain a pair of results for said physical characteristics; and determining the one of said pair of said results which is correctly indicative of said physical characteristics of said medium.

3. The method defined in claim 2 wherein said measured data comprises compression wave velocity and compression wave frequency.

4. The method defined in claim 2 wherein said measured data comprises compression wave attenuation.

5. The method defined in claim 2 wherein said measured data comprises compression wave frequency.

6. The method defined in claim 1 including the step wherein said acoustic signal is generated and transmitted using at least one piezoelectric transducer.

7. The method defined in claim 1 including the step of receiving said acoustic signal by a plurality of hydrophones.

8. The method defined in claim 5, wherein said hydrophones are equally spaced apart from each other.

9. The method defined in claim 1 wherein said frequency is selected from the group consisting of about 1, 2, 4, 8 and 12 kHz.

10. The method defined in claim 1 wherein, of said steps (a) through (f), at least steps (e) and (f) are conducted by a computer.

11. In a non-destructive method of measuring physical characteristics of a medium, the steps which comprise:

(a) generating a pseudo-random code;
(b) generating a pseudo-random acoustic signal based upon said pseudo-random code;
(c) transmitting said pseudo-random acoustic signal into said medium;
(d) receiving said pseudo-random acoustic signal;
(e) processing said pseudo-random acoustic signal to obtain an image of the velocity and attenuation of said acoustic signal;
(f) determining a relevant geoacoustic model of said medium for a set of measured data;
(g) solving said model for said measured data to obtain a pair of physical characteristic results; and
(h) determining the one of said pair of said physical characteristics results which is correctly indicative of said physical characteristics of said medium.

12. In a non-destructive method of measuring physical characteristics of a medium, the steps which comprise:
(a) generating a pseudo-random code;
(b) generating a pseudo-random acoustic signal based upon said pseudo-random code;
(c) transmitting said pseudo-random acoustic signal into said medium;
(d) receiving said pseudo-random acoustic signal;
(e) processing said pseudo-random acoustic signal to obtain an image of the velocity and attenuation of said acoustic signal;
(f) determining a geoacoustic model of said medium for measured data, said measured data comprising velocity, attenuation, and frequency of said acoustic signal;
(g) solving said model for said set of measured data to obtain a resulting pair of permeability-porosity results for said medium; and
(h) determining the one of said pair of permeability-porosity results which is correctly indicative of said physical characteristics of said medium.

13. The method defined in claim 11 wherein said pseudo-random acoustic signal is transmitted at a single frequency selected from the group consisting of 1, 2, 4, 8, and 12 kHz.

14. The method defined in claim 12 wherein said pseudo-random acoustic signal is transmitted at a single frequency selected from the group consisting of 1, 2, 4, 8, and 12 kHz.

15. The method defined in claim 11, wherein said measured data comprises compression wave velocity.

16. The method defined in claim 11, wherein said measured data comprises compression wave attenuation.

17. The method defined in claim 11, wherein said measured data comprises compression wave frequency.

18. The method defined in claim 12, wherein said measured data comprises compression wave velocity.

19. The method defined in claim 12, wherein said measured data comprises compression wave attenuation.

20. The method defined in claim 12, wherein said measured data comprises compression wave frequency.

21. In a method of acoustically measuring cross-sectional spatial distribution or imaging of the porosity and permeability within a segment of a geological medium using an acoustic signal, the steps which comprise:
(a) measuring and recording velocity and attenuation of said acoustical signal at a single PRBS frequency of frequency less than about 4 kHz;
(b) generating a pair of corresponding electrical signals from said recording that are representative of said velocity and attenuation,
(c) creating a comparative theoretical or actual model based upon said geological medium,
(d) inverting said electrical signals according to an inversion equation, in real time, to generate a signal indicative of porosity and permeability.

22. The method defined in claim 21, wherein said geological medium is selected from the group consisting of limestone and sandstone, and wherein said inversion equation is based substantially upon the dimensionless frequency-permeability parameter $\phi$, wherein $\phi$ is $$\Phi = \frac{\mu \phi^2}{\rho_{fk}\omega} = \frac{\omega_0}{\omega}.$$

23. The method defined in claim 22, wherein said electrical signals are inverted into a single signal indicative of permeability by solving and determining for a given attenuation measured at a given frequency the parabolic equation:

$$\Phi^2 - \rho_2{}^2/(\rho \rho_f Q^{-1})\Phi + (\rho_2 + \rho_a)(\rho_1 \rho_2 + \rho_a \rho)/(\rho_f{}^2 \rho) = 0$$

wherein $\phi$ represents a dimensionless frequency-permeability parameter, where $\rho$, $\rho_1$, $\rho_2$, $\rho_a$ and $\rho_f$ represent density factors which are functions only of porosity $\phi$ with a constant value of added mass coefficient $C_a$, and locating the correct inverse by repeating the inversion for $Q^{-1}$ measured at a plurality of different frequencies.

24. The method defined in claim 21, wherein verification of said porosity and permeability is performed by a downhole test.

25. The method defined in claim 21, wherein said geological medium is selected from the group consisting of sandstone and a near-surface segment, and said equation is a quadratic equation having a clearly correct answer and a clearly incorrect answer.

26. The method defined in claim 21, wherein permeability and porosity are determined from said PRBS signal by use of the squirt flow theory using acoustic wave slowness s, substantially from the equation $$s^2 = \frac{\rho}{M + F_{sq}\alpha^2/\phi} \quad (1)$$

wherein $\rho$ represents density, M represents the uniaxial modulus of the frame, $F_{sq}$ represents the squirt flow modulus of the pore liquid, $\alpha$ represents a Biot elastic coefficient and $\phi$ represents the porosity of the medium.

27. The method defined in claim 21, wherein said geological medium is sandstone and said signal representative of permeability is inverted from the following equations (1) through (4):

$$s^2 = \frac{\rho}{M + F_{sq}\alpha^2/\phi} \quad (1)$$

$$F_{sq} = F\left[1 - \frac{2J_1(\lambda R)}{\lambda R J_0(\lambda R)}\right] \quad (2)$$

$$(\lambda R)^2 = i\frac{\omega \mu \phi R^2}{Fk} = i\Omega \quad (3)$$

$V_P = 1/\text{Real}(s)$, and $Q^{-1} = 2 \text{ Imag}(s)/\text{Real}(s) \quad (4)$ where s represents the acoustic wave slowness, $\rho$ represents the bulk density of the segment, M represents the uniaxial modulus of the frame, $\alpha$ represents the Biot elastic coefficient, and $\phi$ represents the porosity.

* * * * *

UNITED STATES PATENT AND TRADEMARK OFFICE
CERTIFICATE OF CORRECTION

PATENT NO. : 6,289,284 B1
DATED : September 11, 2001
INVENTOR(S) : Yamamoto

It is certified that error appears in the above-identified patent and that said Letters Patent is hereby corrected as shown below:

Column 15,
Line 3, please change "$p\,^2_f$" to -- $p_f^{\,2}$ --; and
Line 49, please change "$10_5$" to -- $10^5$ --.

Column 16,
Line 21, please change "$p\,^2_f$" to -- $p_f^{\,2}$ --; and
Line 29, please change "$p\,^2_f$" to -- $p_f^{\,2}$ --.

Signed and Sealed this

Twelfth Day of March, 2002

Attest:

*Attesting Officer*

JAMES E. ROGAN
*Director of the United States Patent and Trademark Office*